US012552810B2

(12) United States Patent
Iyemperumal et al.

(10) Patent No.: US 12,552,810 B2
(45) Date of Patent: Feb. 17, 2026

(54) CRYSTALLINE FORMS OF CFTR MODULATORS

(71) Applicant: Vertex Pharmaceuticals Incorporated, Boston, MA (US)

(72) Inventors: Satish Kumar Iyemperumal, Reading (GB); Andrey Peresypkin, Newton, MA (US); Yi Shi, Natick, MA (US); Muna Shrestha, Belmont, MA (US)

(73) Assignee: Vertex Pharmaceuticals Incorporated, Boston, MA (US)

( * ) Notice: Subject to any disclaimer, the term of this patent is extended or adjusted under 35 U.S.C. 154(b) by 491 days.

(21) Appl. No.: 18/020,802

(22) PCT Filed: Aug. 12, 2021

(86) PCT No.: PCT/US2021/045691
§ 371 (c)(1),
(2) Date: Feb. 10, 2023

(87) PCT Pub. No.: WO2022/036060
PCT Pub. Date: Jul. 17, 2022

(65) Prior Publication Data
US 2023/0303589 A1    Sep. 28, 2023

Related U.S. Application Data

(60) Provisional application No. 63/065,057, filed on Aug. 13, 2020.

(51) Int. Cl.
C07D 513/22   (2006.01)
A61P 11/00    (2006.01)

(52) U.S. Cl.
CPC ............ *C07D 513/22* (2013.01); *A61P 11/00* (2018.01); *C07B 2200/13* (2013.01)

(58) Field of Classification Search
CPC .................... C07D 513/22; C07B 2200/13
See application file for complete search history.

(56) References Cited

U.S. PATENT DOCUMENTS

| | | |
|---|---|---|
| 7,332,612 B2 | 2/2008 | Dolitzky et al. |
| 8,865,902 B2 | 10/2014 | Morgan |
| 9,663,508 B2 | 5/2017 | Bregman et al. |
| 9,782,408 B2 | 10/2017 | Miller et al. |
| 9,981,910 B2 | 5/2018 | Altenbach et al. |
| 10,118,916 B2 | 11/2018 | Altenbach et al. |
| 10,131,670 B2 | 11/2018 | Strohbach et al. |
| 10,138,227 B2 | 11/2018 | Altenbach et al. |
| 10,208,053 B2 | 2/2019 | Strohbach et al. |
| 10,258,624 B2 | 4/2019 | Miller et al. |
| 10,570,115 B2 | 2/2020 | Alcacio et al. |
| 10,654,829 B2 | 5/2020 | Dhamankar et al. |
| 10,738,030 B2 | 8/2020 | Bear et al. |
| 10,758,534 B2 | 9/2020 | Miller et al. |
| 10,793,547 B2 | 10/2020 | Abela et al. |
| 11,066,417 B2 | 7/2021 | Clemens et al. |
| 11,179,367 B2 | 11/2021 | Chu et al. |
| 11,584,761 B2 | 2/2023 | Angell et al. |
| 11,591,350 B2 | 2/2023 | Anderson et al. |
| 11,873,300 B2 | 1/2024 | Shi et al. |
| 2013/0317000 A1 | 11/2013 | Chowdhury et al. |
| 2013/0317001 A1 | 11/2013 | Andrez et al. |
| 2018/0099932 A1 | 4/2018 | Altenbach et al. |
| 2018/0141954 A1 | 5/2018 | Strohbach et al. |
| 2018/0170938 A1 | 6/2018 | Strohbach et al. |
| 2018/0244611 A1 | 8/2018 | Altenbach et al. |
| 2018/0244640 A1 | 8/2018 | Altenbach et al. |
| 2019/0077784 A1 | 3/2019 | Altenbach et al. |
| 2019/0153000 A1 | 5/2019 | Munoz et al. |
| 2022/0041621 A1 | 2/2022 | Clemens et al. |
| 2022/0047564 A1 | 2/2022 | Altshuler et al. |
| 2022/0106331 A1 | 4/2022 | Clemens et al. |
| 2022/0127247 A1 | 4/2022 | Azimioara et al. |
| 2022/0184049 A1 | 6/2022 | Borek et al. |
| 2022/0313698 A1 | 10/2022 | Abela et al. |
| 2022/0372047 A1 | 11/2022 | Abela et al. |

FOREIGN PATENT DOCUMENTS

| | | |
|---|---|---|
| CL | 2019002734 A1 | 1/2020 |
| CL | 2020000856 A1 | 8/2020 |
| CO | 12038470 | 3/2012 |
| JP | 2014-526500 A | 10/2014 |
| NC | 2018/0000413 | 1/2018 |
| NC | 2018/0012171 | 11/2018 |
| TW | 201811766 A | 1/2018 |
| WO | WO 2005/049018 A1 | 6/2005 |
| WO | WO 2005/075435 A1 | 8/2005 |
| WO | WO 2006/002421 A2 | 1/2006 |
| WO | WO 2007/021982 A2 | 2/2007 |
| WO | WO 2007/053641 A2 | 5/2007 |

(Continued)

OTHER PUBLICATIONS

Bastin, Richard J., et al. (2000), "Salt selection and optimization procedures for pharmaceutical new chemical entities," Org. Pro. Res. Dev. 4(5), 427-435.

Borhade, Sanjay R., et al. (2013), "Synthesis of Novel Aryl and Heteroaryl Acyl Sulfonimidamides via Pd-Catalyzed Carbonylation Using a Nongaseous Precursor," Organic Letters, 15(5): 1056-1059.

Cherepakha, Artem Yu., et al. (2018), "Hetaryl Bromides Bearing the SO2F Group—Versatile Substrates for Palladium-Catalyzed C—C Coupling Reactions," Eur J Org Chem, 47: 6682-6692.

Donaldson, S.H. et al. (2017) "Tezacaftor/Ivacaftor in Subjects with Cystic Fibrosis and F508del/F508del-CFTR or F508del/G551D-CFTR", *Am. J. Respir. Crit. Care Med.*, 197(2): 214-224.

(Continued)

*Primary Examiner* — Susanna Moore

(74) *Attorney, Agent, or Firm* — Finnegan, Henderson, Farabow, Garrett & Dunner, LLP

(57) ABSTRACT

Crystalline forms of salts of Compound I are disclosed. Pharmaceutical compositions comprising the same, methods of treating cystic fibrosis using the same, and methods for making the same are also disclosed.

13 Claims, 13 Drawing Sheets

(56) References Cited

FOREIGN PATENT DOCUMENTS

| | | |
|---|---|---|
| WO | WO 2007/075946 A1 | 7/2007 |
| WO | WO 2007/079139 A2 | 7/2007 |
| WO | WO 2007/087066 A2 | 8/2007 |
| WO | WO 2007/117715 A2 | 10/2007 |
| WO | WO 2007/134279 A2 | 11/2007 |
| WO | WO 2008/127399 A2 | 10/2008 |
| WO | WO 2009/006315 A1 | 1/2009 |
| WO | WO 2009/038683 A2 | 3/2009 |
| WO | WO 2009/073757 A1 | 6/2009 |
| WO | WO 2009/076142 A2 | 6/2009 |
| WO | WO 2009/108657 A2 | 9/2009 |
| WO | WO 2010/019239 A2 | 2/2010 |
| WO | WO 2010/048526 A2 | 4/2010 |
| WO | WO 2010/053471 A1 | 5/2010 |
| WO | WO 2010/054138 A2 | 5/2010 |
| WO | WO 2010/108162 A1 | 9/2010 |
| WO | WO 2011/019413 A1 | 2/2011 |
| WO | WO 2011/029059 A1 | 3/2011 |
| WO | WO 2011/072241 A1 | 6/2011 |
| WO | WO 2011/116397 A1 | 9/2011 |
| WO | WO 2011/119984 A1 | 9/2011 |
| WO | WO 2011/127241 A2 | 10/2011 |
| WO | WO 2011/127290 A2 | 10/2011 |
| WO | WO 2011/133751 A2 | 10/2011 |
| WO | WO 2011/133951 A1 | 10/2011 |
| WO | WO 2012/027247 A2 | 3/2012 |
| WO | WO 2012/027731 A2 | 3/2012 |
| WO | WO 2012/158885 A1 | 11/2012 |
| WO | WO 2012/170061 A1 | 12/2012 |
| WO | WO 2013/038386 A1 | 3/2013 |
| WO | WO 2013/070961 A1 | 5/2013 |
| WO | WO 2013/112804 A1 | 8/2013 |
| WO | WO 2013/130669 A1 | 9/2013 |
| WO | WO 2013/158121 A1 | 10/2013 |
| WO | WO 2013/185112 A1 | 12/2013 |
| WO | WO 2014/014841 A1 | 1/2014 |
| WO | WO 2014/071122 A1 | 5/2014 |
| WO | WO 2014/078842 A1 | 5/2014 |
| WO | WO 2015/073231 A1 | 7/2015 |
| WO | WO 2015/160787 A1 | 10/2015 |
| WO | WO 2016/057572 A1 | 4/2016 |
| WO | WO 2016/057730 A1 | 4/2016 |
| WO | WO 2016/081556 A1 | 5/2016 |
| WO | WO 2016/160945 A1 | 10/2016 |
| WO | WO 2017/009804 A1 | 1/2017 |
| WO | WO 2017/053455 A1 | 3/2017 |
| WO | WO 2017/053711 A2 | 3/2017 |
| WO | WO 2017/172802 A1 | 10/2017 |
| WO | WO 2017/173274 A1 | 10/2017 |
| WO | WO 2017/177124 A1 | 10/2017 |
| WO | WO 2017/187321 A1 | 11/2017 |
| WO | WO 2017/208115 A1 | 12/2017 |
| WO | WO 2017/223188 A1 | 12/2017 |
| WO | WO 2018/064632 A1 | 4/2018 |
| WO | WO 2018/080591 A1 | 5/2018 |
| WO | WO 2018/081377 A1 | 5/2018 |
| WO | WO 2018/081378 A1 | 5/2018 |
| WO | WO 2018/081381 A1 | 5/2018 |
| WO | WO 2018/107100 A1 | 6/2018 |
| WO | WO 2018/116185 A1 | 6/2018 |
| WO | WO 2018/127130 A1 | 7/2018 |
| WO | WO 2018/183367 A1 | 10/2018 |
| WO | WO 2018/183964 A1 | 10/2018 |
| WO | WO 2018/201126 A1 | 11/2018 |
| WO | WO 2018/227049 A1 | 12/2018 |
| WO | WO 2019/010092 A1 | 1/2019 |
| WO | WO 2019/014352 A1 | 1/2019 |
| WO | WO 2019/018353 A1 | 1/2019 |
| WO | WO 2019/018395 A1 | 1/2019 |
| WO | WO 2019/028228 A1 | 2/2019 |
| WO | WO 2019/071078 A1 | 4/2019 |
| WO | WO 2019/079760 A1 | 4/2019 |
| WO | WO 2019/109021 A1 | 6/2019 |
| WO | WO 2019/113089 A1 | 6/2019 |
| WO | WO 2019/113476 A2 | 6/2019 |
| WO | WO 2019/152940 A1 | 8/2019 |
| WO | WO 2019/161078 A1 | 8/2019 |
| WO | WO 2019/191620 A1 | 10/2019 |
| WO | WO 2019/195739 A1 | 10/2019 |
| WO | WO 2019/200246 A1 | 10/2019 |
| WO | WO 2020/102346 A1 | 5/2020 |
| WO | WO 2020/128925 A1 | 6/2020 |
| WO | WO 2020/206080 A1 | 10/2020 |
| WO | WO 2020/214921 A1 | 10/2020 |
| WO | WO 2020/242935 A1 | 12/2020 |
| WO | WO 2021/030552 A1 | 2/2021 |
| WO | WO 2021/030554 A1 | 2/2021 |
| WO | WO 2021/030555 A1 | 2/2021 |
| WO | WO 2021/030556 A1 | 2/2021 |
| WO | WO 2021/097054 A1 | 5/2021 |
| WO | WO 2022/032068 A1 | 2/2022 |
| WO | WO 2022/036060 A1 | 2/2022 |
| WO | WO 2022/076620 A2 | 4/2022 |
| WO | WO 2022/076621 A2 | 4/2022 |
| WO | WO 2022/076622 A2 | 4/2022 |
| WO | WO 2022/076624 A2 | 4/2022 |
| WO | WO 2022/076625 A2 | 4/2022 |
| WO | WO 2022/076626 A2 | 4/2022 |

OTHER PUBLICATIONS

International Patent Application No. PCT/US2021/045691: International Search Report and Written Opinion, mailed Dec. 23, 2021 (16 pages).

Newkome, George R., et al. (1979), "Nicotinic Acid Crown Ethers. Synthesis, Reactions, and Complexation of Nicotinonitrile Macrocycles," J Org Chem, 44(15): 2639-2697.

Nishida, Haruyuki, et al. (2017), "Exploration of pyrrole derivatives to find an effective potassium competitive acid blocker with moderately long-lasting suppression of gastric acid secretion," Bioorg Med Chem, 25(13): 3447-3460.

"A phase 1/2 study of VX-121 in healthy subjects and in subjects with cystic fibrosis", EU Clinical Trials Register, May 3, 2019 (May 3, 2019) A Phase 1/2 Study of VX-121 in Healthy Subjects and in Subjects with Cystic Fibrosis, EU Clinical Trials Register, May 3, 2019 (May 3, 2019), XP055903414, Retrieved from the Internet: URL:https://www.clinicaltrialsregister.eu/ctr-search/trial/2018-000126-55/NL [retrieved on Mar. 21, 2022].5-03), XP055903414, Retrieved from the Internet: URL:https://www.clinicaltrialsregister.eu/ctr-search/trial/2018-000126-55/NL [retrieved on Mar. 21, 2022].

"A Phase 2 Study to Evaluate Efficacy and Safety of VX-561 in Subjects Aged 18 Years and Older With Cystic Fibrosis," ClinicatTials.gov, Apr. 11, 2019 (Apr. 11, 2019), XP055903562, Retrieved from the Internet: URL:https://clinicaltrials.gov/ct2/show/NCT03911713 [retrieved on Mar. 21, 2022].

Prashantha, Gunaga, et al. (2017), "Selective IKur Inhibitors for the Potential Treatment of Atrial Fibrillation: Optimization of the Phenyl Quinazoline Series Leading to Clinical Candidate 5 [5-Phenyl-4-(pyridin-2-ylmethylamino)quinazolin-2-yl]pyridine-3-sulfonamide," J Med Chem, 60(9): 3795-3803.

Rewcastle, Gordon W., et al. (1996), "Tyrosine Kinase Inhibitors. 10. Isomeric 4-[(3-Bromophenyl)amino]pyrido[d]-pyrimidines Are Potent ATP Binding Site Inhibitors of the Tyrosine Kinase Function of the Epidermal Growth Factor Receptor," J Med Chem, 39(9): 1823-1835.

"A Study to Evaluate the Safety and Efficacy of VX-121 Combination Therapy in Subjects with Cystic Fibrosis," ClinicalTrials.gov, Apr. 30, 2019 (Apr. 30, 2019), XP55903330, Retrieved from the Internet: URL:https://clinicaltrials.gov/ct2/show/NCT03912233 [retrieved on Mar. 21, 2022].

"Symdeko in Cystic Fibrosis Patients", ClinicalTrials.gov, Jul. 23, 2018 (Apr. 23, 2018), XP055661778, Retrieved from the Internet: URL:https://clinicaltrials.gov/ct2/show/record/NCT03506061 [retrieved on Jan. 24, 2020].

U.S. Appl. No. 18/493,667, filed Oct. 24, 2023, by Shi et al.

CRYSTALLINE FORMS OF CFTR MODULATORS

This application claims the benefit of U.S. Provisional Application No. 63/065,057, filed on Aug. 13, 2020, the contents of which are incorporated by reference in its entirety.

Disclosed herein are modulators of Cystic Fibrosis Transmembrane Conductance Regulator (CFTR), pharmaceutical compositions containing those modulators, methods of treating cystic fibrosis with those modulators and compositions, and processes for making the modulators.

Cystic fibrosis (CF) is a recessive genetic disease that affects approximately 70,000 children and adults worldwide. Despite progress in the treatment of CF, there is no cure.

In patients with CF, mutations in CFTR endogenously expressed in respiratory epithelia lead to reduced apical anion secretion, causing an imbalance in ion and fluid transport. The resulting decrease in anion transport contributes to excess mucus accumulation in the lung and accompanying microbial infections that ultimately cause death in CF patients. In addition to respiratory disease, CF patients typically suffer from gastrointestinal problems and pancreatic insufficiency that, if left untreated, result in death. In addition, the majority of males with cystic fibrosis are infertile, and fertility is reduced among females with cystic fibrosis.

Sequence analysis of the CFTR gene has revealed a variety of disease causing mutations (Cutting, G. R. et al. (1990) Nature 346:366-369; Dean, M. et al. (1990) Cell 61:863:870; and Kerem, B-S. et al. (1989) Science 245: 1073-1080; Kerem, B-S et al. (1990) Proc. Natl. Acad. Sci. USA 87:8447-8451). To date, greater than 2000 mutations in the CF gene have been identified; currently, the CFTR2 database contains information on only 412 of these identified mutations, with sufficient evidence to define 346 mutations as disease-causing. The most prevalent disease-causing mutation is a deletion of phenylalanine at position 508 of the CFTR amino acid sequence, and is commonly referred to as the F508del mutation. This mutation occurs in approximately many of the cases of cystic fibrosis and is associated with severe disease.

The deletion of residue 508 in CFTR prevents the nascent protein from folding correctly. This results in the inability of the mutant protein to exit the endoplasmic reticulum (ER) and traffic to the plasma membrane. As a result, the number of CFTR channels for anion transport present in the membrane is far less than observed in cells expressing wild-type CFTR, i.e., CFTR having no mutations. In addition to impaired trafficking, the F508del mutation results in defective channel gating. Together, the reduced number of channels in the membrane and the defective gating lead to reduced anion and fluid transport across epithelia. (Quinton, P. M. (1990), FASEB J. 4:2709-2727). The channels that are defective because of the F508del mutation are still functional, albeit less functional than wild-type CFTR channels. (Dalemans et al. (1991), Nature Lond. 354:526-528; Pasyk and Foskett (1995), J. Cell. Biochem. 270:12347-50). In addition to F508del, other disease-causing mutations in CFTR that result in defective trafficking, synthesis, and/or channel gating could be up- or down-regulated to alter anion secretion and modify disease progression and/or severity.

CFTR is a cAMP/ATP-mediated anion channel that is expressed in a variety of cell types, including absorptive and secretory epithelia cells, where it regulates anion flux across the membrane, as well as the activity of other ion channels and proteins. In epithelial cells, normal functioning of CFTR is critical for the maintenance of electrolyte transport throughout the body, including respiratory and digestive tissue. CFTR is composed of 1480 amino acids that encode a protein which is made up of a tandem repeat of transmembrane domains, each containing six transmembrane helices and a nucleotide binding domain. The two transmembrane domains are linked by a large, polar, regulatory (R)-domain with multiple phosphorylation sites that regulate channel activity and cellular trafficking.

Chloride transport takes place by the coordinated activity of ENAC and CFTR present on the apical membrane and the $Na^+$—$K^+$-ATPase pump and Cl-channels expressed on the basolateral surface of the cell. Secondary active transport of chloride from the luminal side leads to the accumulation of intracellular chloride, which can then passively leave the cell via $Cl^-$ channels, resulting in a vectorial transport. Arrangement of $Na^+/2Cl^-/K^+$ co-transporter, $Na^+$—$K^+$-ATPase pump and the basolateral membrane K" channels on the basolateral surface and CFTR on the luminal side coordinate the secretion of chloride via CFTR on the luminal side. Because water is probably never actively transported itself, its flow across epithelia depends on tiny transepithelial osmotic gradients generated by the bulk flow of sodium and chloride.

A number of CFTR-modulating compounds have recently been identified. However, compounds that can treat or reduce the severity of the cystic fibrosis and other CFTR-mediated diseases, and particularly the more severe forms of these diseases, are still needed.

Thus, one aspect of the disclosure provides solid forms of a CFTR-modulating compound (14S)-8-[3-(2-{Dispiro [2.0.2.1]heptan-7-yl}ethoxy)-1H-pyrazol-1-yl]-12,12-dimethyl-2λ6-thia-3,9,11,18,23-pentaazatetracyclo[17.3.1.111, 14.05,10]tetracosa-1(22),5,7,9,19(23),20-hexaene-2,2,4-trione (Compound I) and pharmaceutically acceptable salts thereof. Compound I can be depicted as having the following structure:

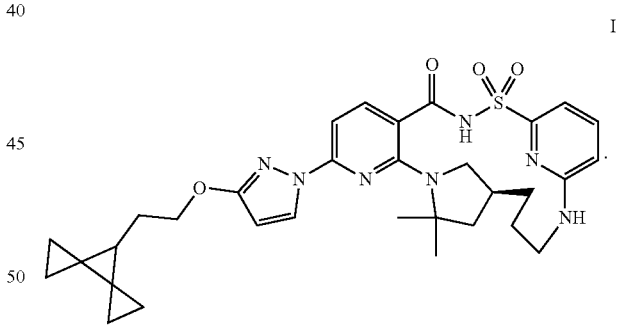

I

Compound I was first described in WO 2019/161078 (incorporated herein by reference) as an amorphous (free form) solid, and as amorphous calcium, sodium, and potassium salts.

Crystalline forms are of interest in the pharmaceutical industry, where the control of the crystalline form(s) of the active ingredient may be desirable or even required. Reproducible processes for producing a compound with a particular crystalline form in high purity may be desirable for compounds intended to be used in pharmaceuticals, as different crystalline forms may possess different properties. For example, different crystalline forms may possess different chemical, physical, and/or pharmaceutical properties. In some embodiments, one or more crystalline forms disclosed herein may exhibit a higher level of purity, chemical stability, and/or physical stability compared to the forms produced in WO 2019/161078. Certain crystalline forms (e.g., crystalline free form, crystalline salt, crystalline salt solvate, and crystalline salt hydrate forms of Compound I (collectively referred to as "crystalline forms")) may exhibit lower hygroscopicity than the forms produced in WO 2019/161078. Thus, the crystalline forms of this disclosure may provide advantages during drug substance manufacturing, storage, and handling over the amorphous forms produced in WO 2019/161078. Thus, pharmaceutically acceptable crystalline forms of Compound I may be particularly useful for the production of drugs for the treatment of CFTR-mediated diseases.

In some embodiments, the crystalline form of Compound I is Compound I benzene sulfonic Form A. In some embodiments, the crystalline form of Compound I is Compound I benzene sulfonic Form B. In some embodiments, the crystalline form of Compound I is Compound I benzene sulfonic Form C. In some embodiments, the crystalline form of Compound I is Compound I p-toluenesulfonic acid Form A. In some embodiments, the crystalline form of Compound I is Compound I magnesium salt Form A.

Other aspects of the disclosure provide pharmaceutical compositions comprising Compound I in any of the pharmaceutically acceptable crystalline forms disclosed herein, which compositions may further include at least one additional active pharmaceutical ingredient and/or at least one carrier. Yet other aspects of the disclosure are methods of treating the CFTR-mediated disease cystic fibrosis comprising administering Compound I in any of the pharmaceutically acceptable crystalline forms disclosed herein, optionally as part of a pharmaceutical composition comprising at least one additional component (such as a carrier or additional active agent), to a subject in need thereof. A further aspect of the disclosure provides processes of making the crystalline forms of Compound I disclosed herein.

One embodiment provides a method of treating the CFTR-mediated disease cystic fibrosis comprising administering (14S)-8-[3-(2-{Dispiro[2.0.2.1]heptan-7-yl}ethoxy)-1H-pyrazol-1-yl]-12,12-dimethyl-2λ6-thia-3,9,11,18,23-pentaazatetracyclo [17.3.1.111,14.05,10]tetracosa-1(22),5,7,9,19(23),20-hexaene-2,2,4-trione (Compound I) as one of the pharmaceutically acceptable crystalline forms disclosed herein, alone or in combination with (R)-1-(2,2-difluorobenzo[d][1,3]dioxol-5-yl)-N-(1-(2,3-dihydroxypropyl)-6-fluoro-2-(1-hydroxy-2-methylpropan-2-yl)-1H-indol-5-yl)cyclopropanecarboxamide (Compound II), and/or N-[2,4-bis(1,1-dimethylethyl)-5-hydroxyphenyl]-1,4-dihydro-4-oxoquinoline-3-carboxamide (Compound III) or N-(2-(tert-butyl)-5-hydroxy-4-(2-(methyl-d3)propan-2-yl-1,1,1,3,3,3-d6) phenyl)-4-oxo-1,4-dihydroquinoline-3-carboxamide (Compound III-d).

In certain embodiments, the method of treating the CFTR-mediated disease cystic fibrosis comprises administering Compound I in one of the pharmaceutically acceptable crystalline forms disclosed herein, in combination with Compound III or III-d.

In some embodiments, Compound I in one of the pharmaceutically acceptable crystalline forms disclosed herein, is administered in the same composition with Compound II and Compound III. In some embodiments, Compound I in one of the pharmaceutically acceptable crystalline forms disclosed herein, is administered in the same composition with Compound II and Compound III-d.

In some embodiments, a composition comprising Compound I in one of the pharmaceutically acceptable crystalline forms disclosed herein is co-administered with a separate composition comprising Compound II and/or Compound III. In some embodiments, a composition comprising Compound I in one of the pharmaceutically acceptable crystalline forms disclosed herein is co-administered with a separate composition comprising Compound II and/or Compound III-d.

DEFINITIONS

Figure 1:
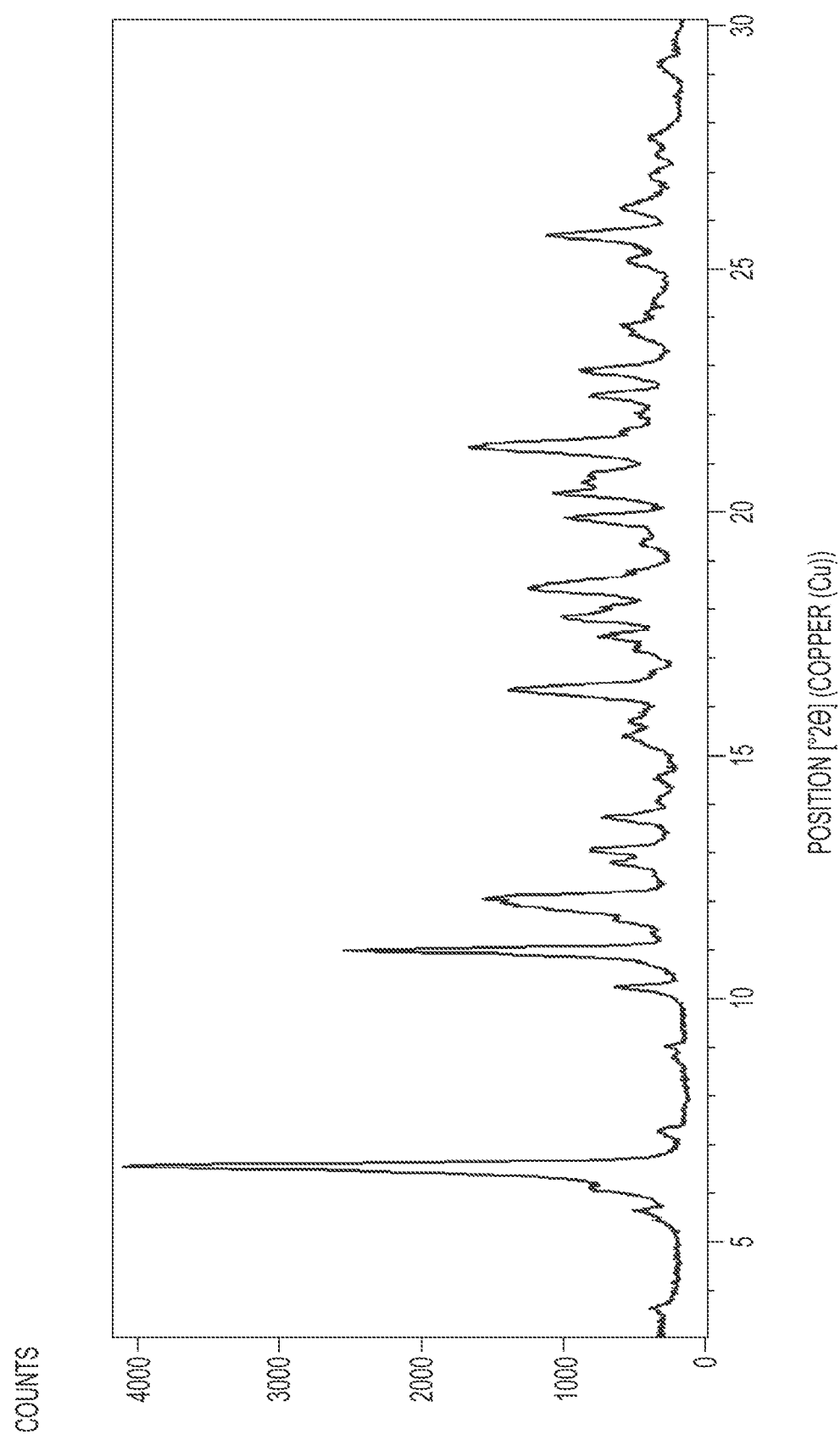
FIG. 1 provides an XRPD pattern of crystalline Compound I benzenesulfonic acid Form A.

"Compound I" as used throughout this disclosure refers to (14S)-8-[3-(2-{Dispiro[2.0.2.1]heptan-7-yl}ethoxy)-1H-pyrazol-1-yl]-12,12-dimethyl-2λ6-thia-3,9,11,18,23-pentaazatetracyclo[17.3.1.111,14.05,10]tetracosa-1 (22),5,7,9, 19 (23),20-hexaene-2,2,4-trione, which can be depicted as having the following structure:

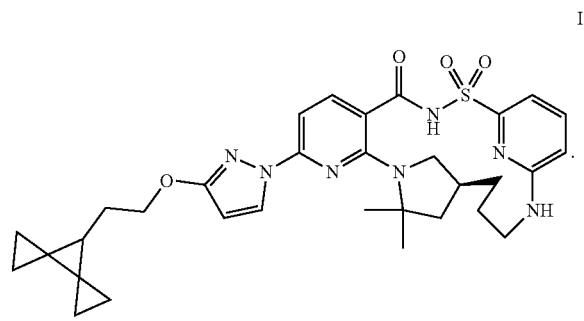 [SMILES: CC1(C)C[C@@H]2CCCNc3cccc(n3)S(=O)(=O)NC(=O)c3ccc(-n4ccc(OCCC5C6(CC6)C56CC6)n4)nc3N1C2]

Compound I may be a racemic mixture or an enantioenriched (e.g., >90% ee, >95% ee, >98% ee) mixture of isomers. Compound I may be in the form of a pharmaceutically acceptable salt, solvate, and/or hydrate. Compound I and methods for making and using Compound I are disclosed in PCT/US2019/018042, incorporated herein by reference.

"Compound II" as used throughout this disclosure refers to (R)-1-(2,2-difluorobenzo[d][1,3]dioxol-5-yl)-N-(1-(2,3-dihydroxypropyl)-6-fluoro-2-(1-hydroxy-2-methylpropan-2-yl)-1H-indol-5-yl) cyclopropanecarboxamide, which can be depicted as having the following structure:

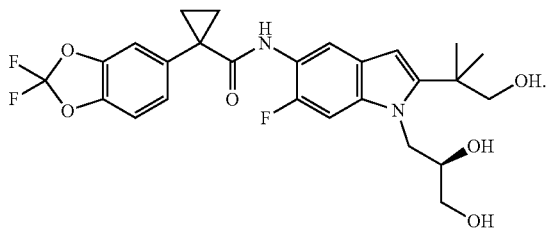

II

Compound II may be in the form of a pharmaceutically acceptable salt. Compound II and methods of making and using Compound II are disclosed in WO 2010/053471, WO 2011/119984, and WO 2015/160787, each incorporated herein by reference.

"Compound III" as used throughout this disclosure refers to N-[2,4-bis(1,1-dimethylethyl)-5-hydroxyphenyl]-1,4-dihydro-4-oxoquinoline-3-carboxamide (also known as N-(5-hydroxy-2,4-di-tert-butyl-phenyl)-4-oxo-1H-quinoline-3-carboxamide) which can be depicted as having the following structure:

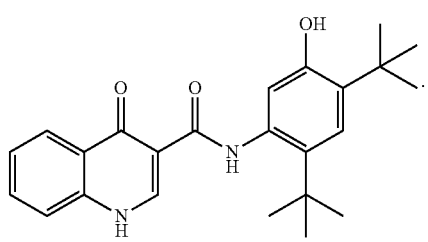

III

Compound III may also be in the form of a pharmaceutically acceptable salt. Compound III and methods of making and using Compound III are disclosed in WO 2006/002421, WO 2007/079139, and WO 2010/019239, each incorporated herein by reference.

In some embodiments, a deuterated derivative of Compound III (Compound III-d) is employed in the compositions and methods disclosed herein. A chemical name for Compound III-d is N-(2-(tert-butyl)-5-hydroxy-4-(2-(methyl-d3)propan-2-yl-1,1,1,3,3,3-d6) phenyl)-4-oxo-1,4-dihydroquinoline-3-carboxamide, which can be depicted as having the following structure:

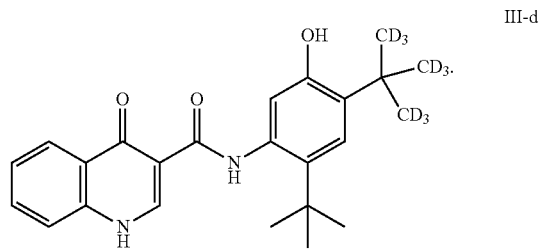 [SMILES: [2H]C([2H])([2H])C(c1cc(C(C)(C)C)c(NC(=O)c2c[nH]c3ccccc3c2=O)cc1O)(C([2H])([2H])[2H])C([2H])([2H])[2H]]

III-d

Compound III-d may be in the form of a pharmaceutically acceptable salt. Compound III-d and methods of making and using Compound III-d are disclosed in WO 2012/158885 and WO 2014/078842, incorporated herein by reference.

As used herein, "CFTR" means cystic fibrosis transmembrane conductance regulator.

As used herein, the terms "CFTR modulator" and "CFTR modulating compound" interchangeably refer to a compound that increases the activity of CFTR. The increase in activity resulting from a CFTR modulator includes but is not limited to compounds that correct, potentiate, stabilize, and/or amplify CFTR.

As used herein, the term "CFTR corrector" refers to a compound that facilitates the processing and trafficking of CFTR to increase the amount of CFTR at the cell surface. Compounds I and II disclosed herein are CFTR correctors.

As used herein, the term "CFTR potentiator" refers to a compound that increases the channel activity of CFTR protein located at the cell surface, resulting in enhanced ion transport. Compound III and III-d disclosed herein are CFTR potentiators. It will be appreciated that when a description of a combination of Compound I and other specified CFTR modulating agents is provided herein, reference to "Compound III or III-d" in connection with the combination means that either Compound III or Compound III-d, but not both, is included in the combination.

As used herein, the term "active pharmaceutical ingredient" or "therapeutic agent" ("API") refers to a biologically active compound.

As used herein, the term "pharmaceutically acceptable crystalline form" refers to a crystalline form of Compound I of this disclosure wherein the crystalline form (e.g., crystalline free form, crystalline salt, crystalline salt solvate, and crystalline salt hydrate) of Compound I is nontoxic and suitable for use in pharmaceutical compositions.

The terms "patient" and "subject" are used interchangeably and refer to an animal including humans.

As used herein, the terms "treatment," "treating," and the like generally mean the improvement of CF or one or more of its symptoms or lessening the severity of CF or one or more of its symptoms in a subject. "Treatment," as used herein, includes, but is not limited to, the following: increased growth of the subject, increased weight gain, reduction of mucus in the lungs, improved pancreatic and/or liver function, reduction of chest infections, and/or reductions in coughing or shortness of breath. Improvements in or lessening the severity of any of these symptoms can be readily assessed according to standard methods and techniques known in the art.

As used herein, the term "in combination with," when referring to two or more compounds, agents, or additional active pharmaceutical ingredients, means the administration of two or more compounds, agents, or active pharmaceutical ingredients to the patient prior to, concurrently with, or subsequent to each other.

The terms "about" and "approximately," when used in connection with doses, amounts, or weight percents of ingredients of a composition or a dosage form, include the value of a specified dose, amount, or weight percent or a range of the dose, amount, or weight percent that is recognized by one of ordinary skill in the art to provide a pharmacological effect equivalent to that obtained from the specified dose, amount, or weight percent. The terms "about" and "approximately" may refer to an acceptable error for a particular value as determined by one of skill in the art, which depends in part on how the values is measured or determined. In some embodiments, the terms "about" and "approximately" mean within 15%, 10%, 5%, 4%, 3%, 2%, 1%, or 0.5% of a given value or range.

As used herein, the term "amorphous" refers to a solid material having no long-range order in the position of its molecules. Amorphous solids are generally supercooled liquids in which the molecules are arranged in a random manner so that there is no well-defined arrangement, e.g., molecular packing, and no long-range order. Amorphous solids are generally isotropic, i.e., exhibit similar properties in all directions and do not have definite melting points. For example, an amorphous material is a solid material having no sharp characteristic crystalline peak(s) in its X-ray power diffraction (XRPD) pattern (i.e., is not crystalline as determined by XRPD). Instead, one or several broad peaks (e.g., halos) appear in its XRPD pattern. Broad peaks are characteristic of an amorphous solid. See, US 2004/0006237 for a comparison of XRPDs of an amorphous material and crystalline material. In some embodiments, a solid material may comprise an amorphous compound, and the material may, for example, be characterized by a lack of sharp characteristic crystalline peak(s) in its XRPD spectrum (i.e., the material is not crystalline, but is amorphous, as determined by XRPD). Instead, one or several broad peaks (e.g., halos) may appear in the XRPD pattern of the material. See US 2004/0006237 for a comparison of XRPDs of an amorphous material and crystalline material. A solid material, comprising an amorphous compound, may be characterized by, for example, a wider temperature range for the melting of the solid material, as compared to the range for the melting of a pure crystalline solid. Other techniques, such as, for example, solid state NMR may also be used to characterize crystalline or amorphous forms.

As used herein, the terms "crystal form," "crystalline form," and "Form" interchangeably refer to a crystal structure (or polymorph) having a particular molecular packing arrangement in the crystal lattice. Crystalline forms can be identified and distinguished from each other by one or more characterization techniques including, for example, X-ray powder diffraction (XRPD), single crystal X-ray diffraction, and $^{13}C$ solid state nuclear magnetic resonance ($^{13}C$ ssNMR). Accordingly, as used herein, the terms "crystalline Form [X] of Compound (I)" and "crystalline Form [C] potassium salt of Compound (I)" refer to unique crystalline forms that can be identified and distinguished from each other by one or more characterization techniques including, for example, XRPD, single crystal X-ray diffraction, and $^{13}C$ ssNMR. In some embodiments, the novel crystalline forms are characterized by an X-ray powder diffractogram having one or more signals at one or more specified two-theta values (°2θ).

As used herein, the term "free form" refers to a non-ionized version of the compound in the solid state. Examples of free forms include free bases and free acids.

As used herein, the term "solvate" refers to a crystal form comprising one or more molecules of a compound of the present disclosure and, incorporated into the crystal lattice, one or more molecules of a solvent or solvents in stoichiometric or nonstoichiometric amounts. When the solvent is water, the solvate is referred to as a "hydrate."

In some embodiments, a solid material may comprise a mixture of crystalline solids and amorphous solids. A solid material comprising an amorphous compound may also, for example, contain up to 30% of a crystalline solid. In some embodiments, a solid material prepared to comprise an amorphous compound may also, for example, contain up to 25%, 20%, 15%, 10%, 5%, or 2% of a crystalline solid. In embodiments wherein the solid material contains a mixture of crystalline solids and amorphous solids, the characterizing data, such as XRPD, may contain indicators of both crystalline and amorphous solids. In some embodiments, a crystalline form of this disclosure may contain up to 30% amorphous compound. In some embodiments, a crystalline preparation of Compound I may contain up to 25%, 20%, 15%, 10%, 5%, or 2% of an amorphous solid.

As used herein, the term "substantially amorphous" refers to a solid material having little or no long-range order in the position of its molecules. For example, substantially amorphous materials have less than 15% crystallinity (e.g., less than 10% crystallinity, less than 5% crystallinity, or less than 2% crystallinity). It is also noted that the term "substantially amorphous" includes the descriptor, "amorphous," which refers to materials having no (0%) crystallinity.

As used herein, the term "substantially crystalline" refers to a solid material having little or no amorphous molecules. For example, substantially crystalline materials have less than 15% amorphous molecules (e.g., less than 10% amorphous molecules, less than 5% amorphous molecules, or less than 2% amorphous molecules). It is also noted that the term "substantially crystalline" includes the descriptor "crystalline," which refers to materials that are 100% crystalline form.

As used herein, a crystalline form is "substantially pure" when it accounts for an amount by weight equal to or greater than 90% of the sum of all solid form(s) in a sample as determined by a method in accordance with the art, such as quantitative XRPD. In some embodiments, the solid form is "substantially pure" when it accounts for an amount by weight equal to or greater than 95% of the sum of all solid form(s) in a sample. In some embodiments, the solid form is "substantially pure" when it accounts for an amount by weight equal to or greater than 99% of the sum of all solid form(s) in a sample.

As used herein, the term "XRPD" refers to the analytical characterization method of X-ray powder diffraction. XRPD patterns disclosed herein were recorded at ambient conditions in transmission or reflection geometry using a diffractometer.

As used herein, the term "ambient conditions" means room temperature, open air condition and uncontrolled humidity condition. The terms "room temperature" and "ambient temperature" mean 15° C. to 30° C.

As used herein, the terms "X-ray powder diffractogram," "X-ray powder diffraction pattern," "XRPD pattern," "XRPD spectrum" interchangeably refer to an experimentally obtained pattern plotting signal positions (on the abscissa) versus signal intensities (on the ordinate). For an amorphous material, an X-ray powder diffractogram may include one or more broad signals; and for a crystalline material, an X-ray powder diffractogram may include one or more signals, each identified by its angular value as measured in degrees 2θ (°2θ), depicted on the abscissa of an X-ray powder diffractogram, which may be expressed as "a signal at . . . degrees two-theta," "a signal at [a] two-theta value(s) of . . . " and/or "a signal at at least . . . two-theta value(s) selected from . . . ."

A "signal" or "peak" as used herein refers to a point in the XRPD pattern where the intensity as measured in counts is at a local maximum. One of ordinary skill in the art would recognize that one or more signals (or peaks) in an XRPD pattern may overlap and may, for example, not be apparent to the naked eye. Indeed, one of ordinary skill in the art would recognize that some art-recognized methods are capable of and suitable for determining whether a signal exists in a pattern, such as Rietveld refinement.

As used herein, "a signal at . . . degrees two-theta" refer to X-ray reflection positions as measured and observed in X-ray powder diffraction experiments (° 2θ).

The repeatability of the measured angular values is in the range of ±0.2° 2θ, i.e., the angular value can be at the recited angular value +0.2 degrees two-theta, the angular value −0.2 degrees two-theta, or any value between those two end points (angular value +0.2 degrees two-theta and angular value-0.2 degrees two-theta).

The terms "signal intensities" and "peak intensities" interchangeably refer to relative signal intensities within a given X-ray powder diffractogram. Factors that can affect the relative signal or peak intensities include sample thickness and preferred orientation (e.g., the crystalline particles are not distributed randomly).

As used herein, an X-ray powder diffractogram is "substantially similar to that in [a particular] Figure" when at least 90%, such as at least 95%, at least 98%, or at least 99%, of the signals in the two diffractograms overlap. In determining "substantial similarity," one of ordinary skill in the art will understand that there may be variation in the intensities and/or signal positions in XRPD diffractograms even for the same crystalline form. Thus, those of ordinary skill in the art will understand that the signal maximum values in XRPD diffractograms (in degrees two-theta) generally mean that value is identified as ±0.2 degrees two-theta of the reported value, an art-recognized variance.

The term "X-ray powder diffractogram having a signal at . . . two-theta values" as used herein refers to an XRPD pattern that contains X-ray reflection positions as measured and observed in X-ray powder diffraction experiments (° two-theta).

As used herein, the term "TGA" refers to thermogravimetric analysis and "TGA/DSC" refers to thermogravimetric analysis and differential scanning calorimetry.

As used herein, the term "DSC" refers to the analytical method of differential scanning calorimetry.

As used herein, the term "solvent" refers to any liquid in which the product is at least partially soluble (solubility of product >1 g/l).

As used herein, the term "dispersion" refers to a disperse system in which one substance, the dispersed phase, is distributed, in discrete units, throughout a second substance (the continuous phase or vehicle). The size of the dispersed phase can vary considerably (e.g., colloidal particles of nanometer dimension, to multiple microns in size). In general, the dispersed phases can be solids, liquids, or gases. In the case of a solid dispersion, the dispersed and continuous phases are both solids. In pharmaceutical applications, a solid dispersion can include a crystalline drug (dispersed phase) in an amorphous polymer (continuous phase); or alternatively, an amorphous drug (dispersed phase) in an amorphous polymer (continuous phase). In some embodiments, a solid dispersion includes the polymer constituting the dispersed phase, and the drug constitute the continuous phase. Or, a solid dispersion includes the drug constituting the dispersed phase, and the polymer constituting the continuous phase.

Compound I Benzenesulfonic Acid Form A

In some embodiments, the invention provides crystalline Compound I benzenesulfonic acid Form A. FIG. 1 provides an X-ray powder diffractogram of Compound I benzenesulfonic acid Form A.

In some embodiments, Compound I is substantially pure crystalline Compound I benzenesulfonic acid Form A. In some embodiments, Compound I is substantially crystalline Compound I benzenesulfonic acid Form A. In some embodiments, Compound I benzenesulfonic acid Form A is characterized by an X-ray powder diffractogram generated by an X-ray powder diffraction analysis with an incident beam of Cu Kα radiation.

In some embodiments, Compound I benzenesulfonic acid Form A is characterized by an X-ray powder diffractogram having a signal at one or more of 6.6±0.2 degrees theta, 11.0±0.2 degrees theta, and 16.4±0.2 degrees theta. In some embodiments, Compound I benzenesulfonic acid Form A is characterized by an X-ray powder diffractogram having a signal at two or more of 6.6±0.2 degrees theta, 11.0±0.2 degrees theta, 16.4±0.2 degrees theta, and 22.4±0.2 degrees theta. In some embodiments, Compound I benzenesulfonic acid Form A is characterized by an X-ray powder diffractogram having signals at 6.6±0.2 degrees theta, 11.0±0.2 degrees theta, and 16.4±0.2 degrees theta. In some embodiments, Compound I benzenesulfonic acid Form A is characterized by an X-ray powder diffractogram having signals at 6.6±0.2 degrees theta, 11.0±0.2 degrees theta, 16.4±0.2 degrees theta, and 22.4±0.2 degrees theta.

In some embodiments, Compound I benzenesulfonic acid Form A is characterized by an X-ray powder diffractogram having (a) a signal at one or more of 6.6±0.2 degrees theta, 11.0±0.2 degrees theta, 16.4±0.2 degrees theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta. In some embodiments, Compound I benzenesulfonic acid Form A is characterized by an X-ray powder diffractogram having (a) a signal at two or more of 6.6±0.2 degrees theta, 11.0±0.2 degrees theta, 16.4±0.2 degrees theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta. In some embodiments, Compound I benzenesulfonic acid Form A is characterized by an X-ray powder diffractogram having (a) a signal at three or more of 6.6±0.2 degrees theta, 11.0±0.2 degrees theta, 16.4±0.2 degrees theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.

In some embodiments, Compound I benzenesulfonic acid Form A is characterized by an X-ray powder diffractogram having (a) signals at 6.6±0.2 degrees theta, 11.0±0.2 degrees theta, 16.4±0.2 degrees theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta. In some embodiments, Compound I benzenesulfonic acid Form A is characterized by an X-ray powder diffractogram having (a) signals at 6.6±0.2 degrees theta, 11.0±0.2 degrees theta, 16.4±0.2 degrees theta, and 22.4±0.2 degrees theta; and (b) a signal at two or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta. In some embodiments, Compound I benzenesulfonic acid Form A is characterized by an X-ray powder diffractogram having (a) signals at 6.6±0.2 degrees theta, 11.0±0.2 degrees theta, 16.4±0.2 degrees theta, and 22.4±0.2 degrees theta; and (b) a signal at three or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.

In some embodiments, Compound I benzenesulfonic acid Form A is characterized by an X-ray powder diffractogram having signals at 6.6±0.2 degrees theta, 10.3±0.2 degrees theta, 11.0±0.2 degrees theta, 12.1±0.2 degrees theta, 13.7±0.2 degrees theta, 16.4±0.2 degrees theta, 17.5±0.2 degrees theta, 20.8±0.2 degrees theta, 22.4±0.2 degrees theta, and 25.7±0.2 degrees theta.

In some embodiments, crystalline Compound I benzenesulfonic acid Form A is characterized by an X-ray powder diffractogram substantially similar to FIG. 1.

Other aspects of the invention provide methods of making Compound I benzenesulfonic acid crystalline Form A comprising bead milling Compound I free acid with benzenesulfonic acid in ethanol and drying under vacuum to provide Compound I benzenesulfonic acid crystalline Form A.

Compound I Benzenesulfonic Acid Form B

Figure 4:
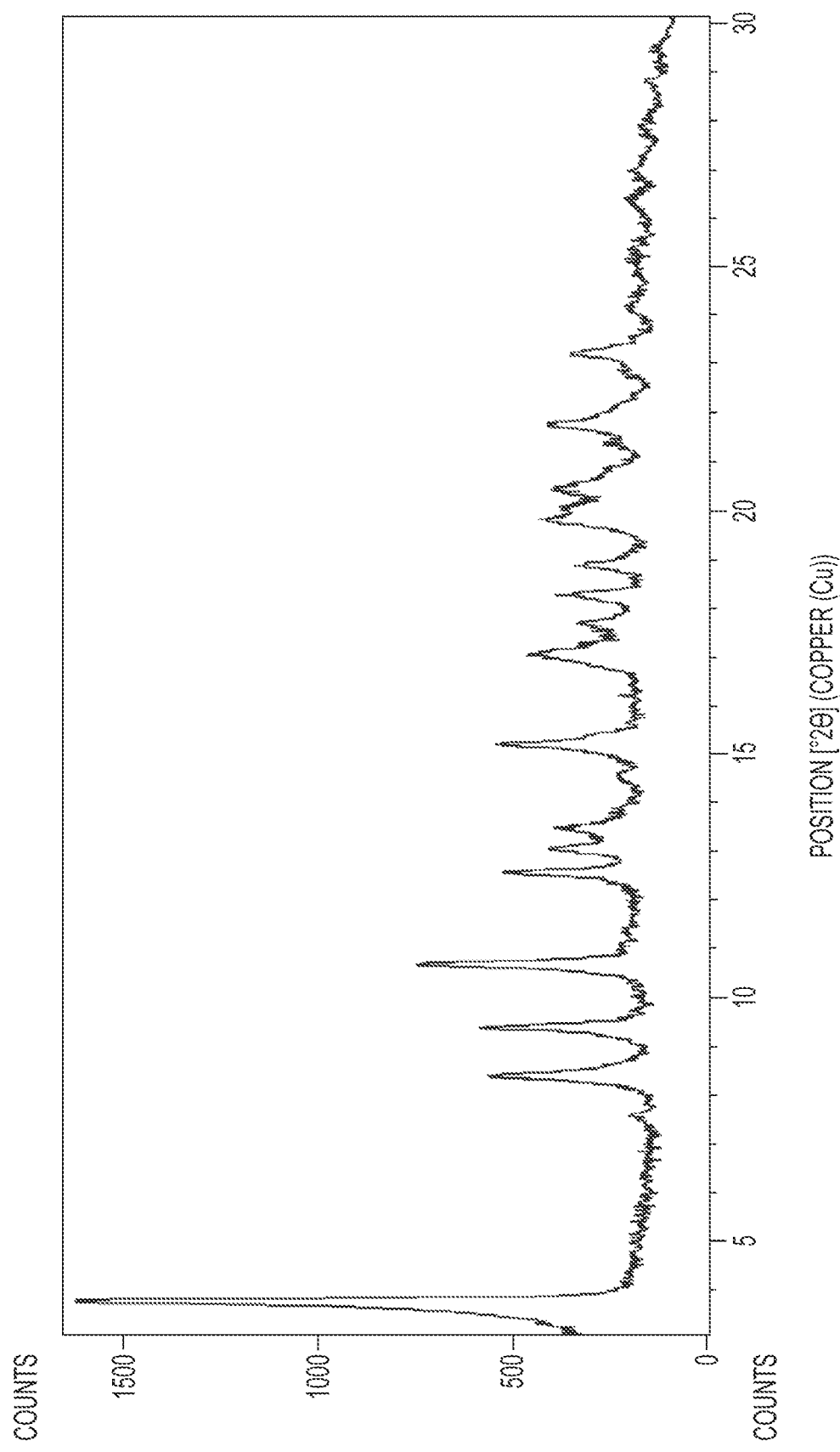
FIG. 4 provides an XRPD pattern of crystalline Compound I benzenesulfonic acid Form B.

In some embodiments, the invention provides crystalline Compound I benzenesulfonic acid Form B. FIG. 4 provides an X-ray powder diffractogram of Compound I benzenesulfonic acid Form B.

In some embodiments, Compound I is substantially pure crystalline Compound I benzenesulfonic acid Form B. In some embodiments, Compound I is substantially crystalline Compound I benzenesulfonic acid Form B. In some embodiments, Compound I benzenesulfonic acid Form B is characterized by an X-ray powder diffractogram generated by an X-ray powder diffraction analysis with an incident beam of Cu Kα radiation.

In some embodiments, Compound I benzenesulfonic acid Form B is characterized by an X-ray powder diffractogram having a signal at one or more of 8.4±0.2 degrees theta, 9.4±0.2 degrees theta, 12.6±0.2 degrees theta, and 15.2±0.2 degrees theta. In some embodiments, Compound I benzenesulfonic acid Form B is characterized by an X-ray powder diffractogram having a signal at two or more of 8.4±0.2 degrees theta, 9.4±0.2 degrees theta, 12.6±0.2 degrees theta, and 15.2±0.2 degrees theta. In some embodiments, Compound I benzenesulfonic acid Form B is characterized by an X-ray powder diffractogram having a signal at three or more of 8.4±0.2 degrees theta, 9.4±0.2 degrees theta, 12.6±0.2 degrees theta, and 15.2±0.2 degrees theta. In some embodiments, Compound I benzenesulfonic acid Form B is characterized by an X-ray powder diffractogram having signals at 8.4±0.2 degrees theta, 9.4±0.2 degrees theta, 12.6±0.2 degrees theta, and 15.2±0.2 degrees theta.

In some embodiments, Compound I benzenesulfonic acid Form B is characterized by an X-ray powder diffractogram having (a) a signal at one or more of 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta. In some embodiments, Compound I benzenesulfonic acid Form B is characterized by an X-ray powder diffractogram having (a) a signal at two or more of 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta. In some embodiments, Compound I benzenesulfonic acid Form B is characterized by an X-ray powder diffractogram having (a) a signal at three or more of 8.4±0.2 degrees theta, 9.4±0.2 degrees theta, 12.6±0.2 degrees theta, and 15.2±0.2 degrees theta; and (b a signal at one or more of 3.8±0.2 degrees theta, 10.7±0.2 degrees theta, 17.1±0.2 degrees theta, and 23.2±0.2 degrees theta. In some embodiments, Compound I benzenesulfonic acid Form B is characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

In some embodiments, Compound I benzenesulfonic acid Form B is characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at two or more of 3.8±0.2 degrees theta, 10.7±0.2 degrees theta, 17.1±0.2 degrees theta, and 23.2±0.2 degrees theta. In some embodiments, Compound I benzenesulfonic acid Form B is characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at three or more of 3.8±0.2 degrees theta, 10.7±0.2 degrees theta, 17.1±0.2 degrees theta, and 23.2±0.2 degrees theta.

In some embodiments, Compound I benzenesulfonic acid Form B is characterized by an X-ray powder diffractogram having signals at 3.8±0.2 degrees theta, 8.4±0.2 degrees theta, 9.4±0.2 degrees theta, 10.7±0.2 degrees theta, 12.6±0.2 degrees theta, 15.2±0.2 degrees theta, 17.1±0.2 degrees theta, and 23.2±0.2 degrees theta.

In some embodiments, crystalline Compound I benzenesulfonic acid Form B is characterized by an X-ray powder diffractogram substantially similar to FIG. 4.

Other aspects of the invention provide methods of making Compound I benzenesulfonic acid crystalline Form B comprising bead milling Compound I free acid and benzenesulfonic acid in tetrahydrofuran to provide Compound I benzenesulfonic acid crystalline Form B.

Compound I Benzenesulfonic Acid Form C

Figure 6:
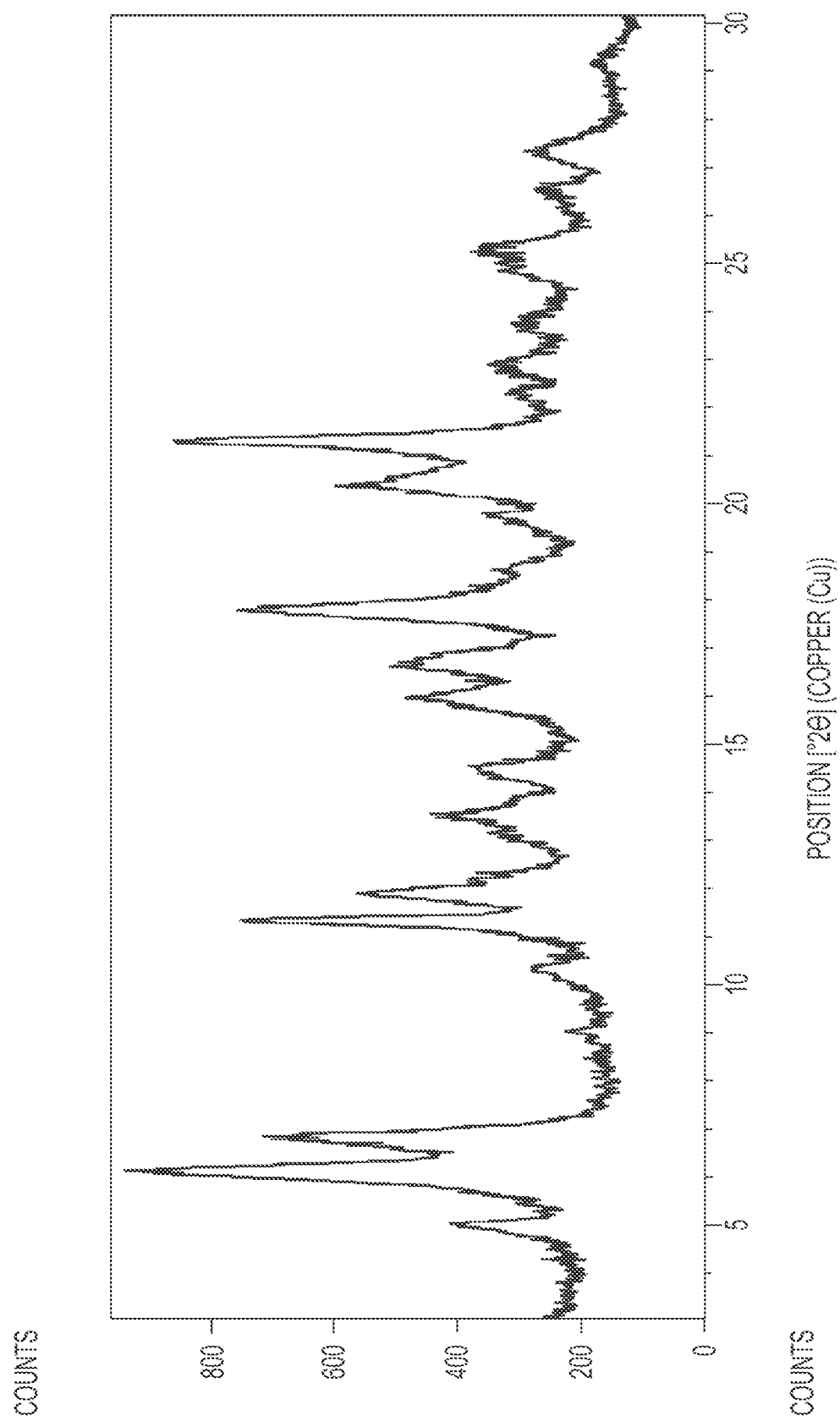
FIG. 6 provides an XRPD pattern of crystalline Compound I benzenesulfonic acid Form C.

In some embodiments, the invention provides crystalline Compound I benzenesulfonic acid Form C. FIG. 6 provides an X-ray powder diffractogram of Compound I benzenesulfonic acid Form C.

In some embodiments, Compound I is substantially pure crystalline Compound I benzenesulfonic acid Form C. In some embodiments, Compound I is substantially crystalline Compound I benzenesulfonic acid Form C. In some embodiments, Compound I benzenesulfonic acid Form C is characterized by an X-ray powder diffractogram generated by an X-ray powder diffraction analysis with an incident beam of Cu Kα radiation.

In some embodiments, Compound I benzenesulfonic acid Form C is characterized by an X-ray powder diffractogram having a signal at one or more of 5.0±0.2 degrees theta, 14.6±0.2 degrees theta, 24.9±0.2 degrees theta, and 26.6±0.2 degrees theta. In some embodiments, Compound I benzenesulfonic acid Form C is characterized by an X-ray powder diffractogram having a signal at two or more of 5.0±0.2 degrees theta, 14.6±0.2 degrees theta, 24.9±0.2 degrees theta, and 26.6±0.2 degrees theta. In some embodiments, Compound I benzenesulfonic acid Form C is characterized by an X-ray powder diffractogram having a signal at three or more of 5.0±0.2 degrees theta, 14.6±0.2 degrees theta, 24.9±0.2 degrees theta, and 26.6±0.2 degrees theta. In some embodiments, Compound I benzenesulfonic acid Form C is characterized by an X-ray powder diffractogram having signals at 5.0±0.2 degrees theta, 14.6±0.2 degrees theta, 24.9±0.2 degrees theta, and 26.6±0.2 degrees theta.

In some embodiments, Compound I benzenesulfonic acid Form C is characterized by an X-ray powder diffractogram having (a) a signal at one or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta. In some embodiments, Compound I benzenesulfonic acid Form C is characterized by an X-ray powder diffractogram having (a) a signal at two or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta. In some embodiments, Compound I benzenesulfonic acid Form C is characterized by an X-ray powder diffractogram having (a) a signal at three or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

In some embodiments, Compound I benzenesulfonic acid Form C is characterized by an X-ray powder diffractogram having (a) signals at 5.0±0.2 degrees theta, 14.6±0.2 degrees theta, 24.9±0.2 degrees theta, and 26.6±0.2 degrees theta; and (b) a signal at two or more of 6.8±0.2 degrees theta, 11.4±0.2 degrees theta, 16.6±0.2 degrees theta, and 27.3±0.2 degrees theta. In some embodiments, Compound I benzenesulfonic acid Form C is characterized by an X-ray powder diffractogram having (a) signals at 5.0±0.2 degrees theta, 14.6±0.2 degrees theta, 24.9±0.2 degrees theta, and 26.6±0.2 degrees theta; and (b) a signal at three or more of 6.8±0.2 degrees theta, 11.4±0.2 degrees theta, 16.6±0.2 degrees theta, and 27.3±0.2 degrees theta.

In some embodiments, Compound I benzenesulfonic acid Form C is characterized by an X-ray powder diffractogram having signals at 5.0±0.2 degrees theta, 6.8±0.2 degrees theta, 11.4±0.2 degrees theta, 14.6±0.2 degrees theta, 16.6±0.2 degrees theta, 24.9±0.2 degrees theta, 26.6±0.2 degrees theta, and 27.3±0.2 degrees theta.

In some embodiments, crystalline Compound I benzenesulfonic acid Form C is characterized by an X-ray powder diffractogram substantially similar to FIG. 6.

Other aspects of the invention provide methods of making Compound I benzenesulfonic acid crystalline Form C comprising bead milling Compound I free acid and benezenesulfonic acid in isopropyl acetate to provide Compound I benzenesulfonic acid crystalline Form C.

Compound I p-Toluenesulfonic Acid Form A

Figure 8:
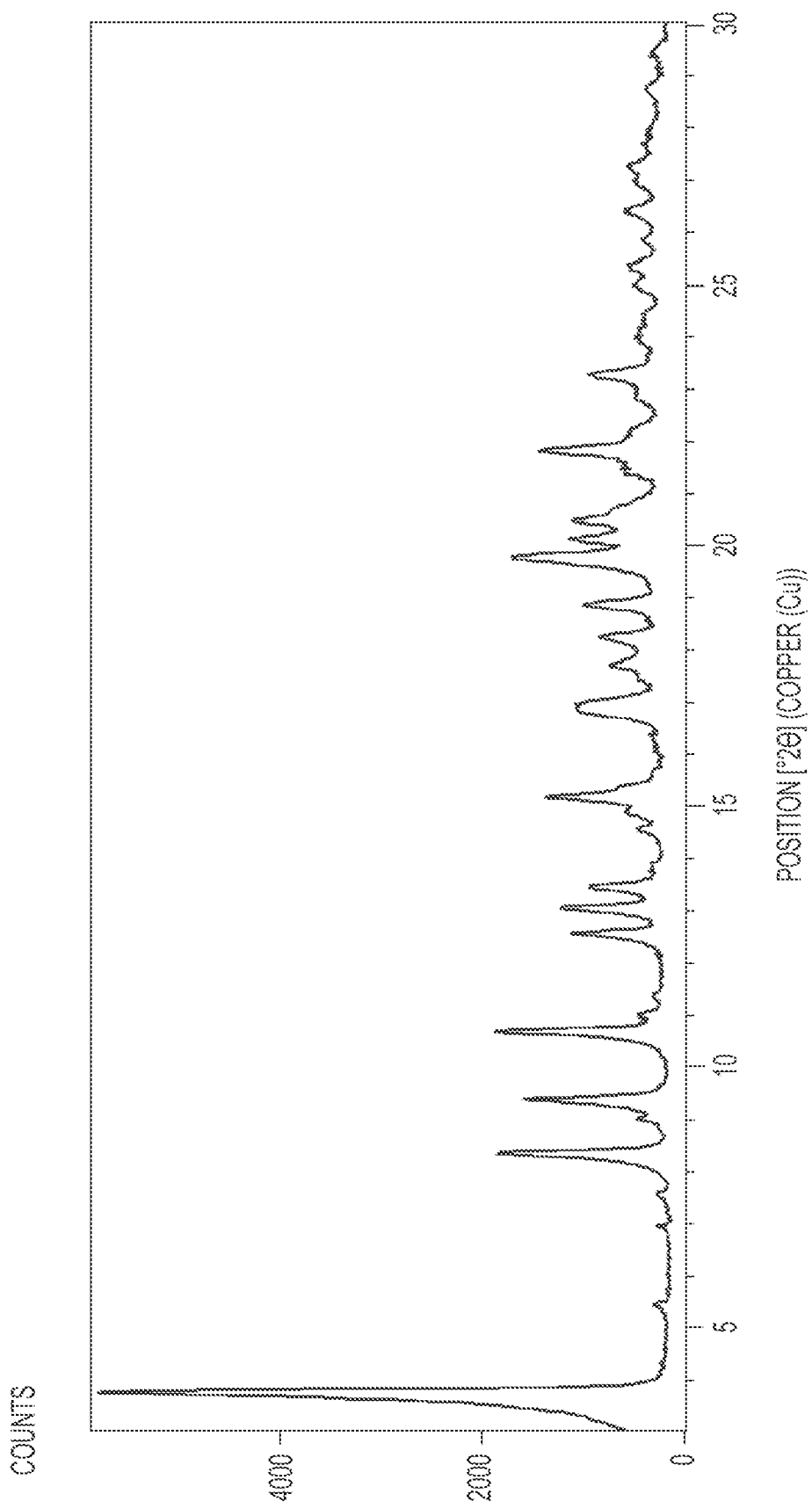
FIG. 8 provides an XRPD pattern of crystalline Compound Ip-toluenesulfonic acid Form A.

In some embodiments, the invention provides crystalline Compound I p-toluenesulfonic acid Form A. FIG. 8 provides an X-ray powder diffractogram of Compound I p-toluenesulfonic acid Form A.

In some embodiments, Compound I is substantially pure Compound I p-toluenesulfonic acid Form A. In some embodiments, Compound I is substantially crystalline Compound I p-toluenesulfonic acid Form A. In some embodiments, Compound I p-toluenesulfonic acid Form A is characterized by an X-ray powder diffractogram generated by an X-ray powder diffraction analysis with an incident beam of Cu Kα radiation.

In some embodiments, Compound I p-toluenesulfonic acid Form A is characterized by an X-ray powder diffractogram having a signal at one or more of 3.8±0.2 degrees theta, 8.4±0.2 degrees theta, and 10.7±0.2 degrees theta. In some embodiments, Compound I p-toluenesulfonic acid Form A is characterized by an X-ray powder diffractogram having a signal at two or more of 3.8±0.2 degrees theta, 8.4±0.2 degrees theta, and 10.7±0.2 degrees theta. In some embodiments, Compound I p-toluenesulfonic acid Form A is characterized by an X-ray powder diffractogram having signals at 3.8±0.2 degrees theta, 8.4±0.2 degrees theta, and 10.7±0.2 degrees theta.

In some embodiments, Compound I p-toluenesulfonic acid Form A is characterized by an X-ray powder diffractogram having (a) signals at 3.8±0.2 degrees theta, 8.4±0.2 degrees theta, and 10.7±0.2 degrees theta; and (b) a signal at one or more of 9.4±0.2 degrees theta, 18.9±0.2 degrees theta, 19.8±0.2 degrees theta, and 20.1±0.2 degrees theta. In some embodiments, Compound I p-toluenesulfonic acid Form A is characterized by an X-ray powder diffractogram having (a) signals at 3.8±0.2 degrees theta, 8.4±0.2 degrees theta, and 10.7±0.2 degrees theta; and (b) a signal at two or more of 9.4±0.2 degrees theta, 18.9±0.2 degrees theta, 19.8±0.2 degrees theta, and 20.1±0.2 degrees theta. In some embodiments, Compound I p-toluenesulfonic acid Form A is characterized by an X-ray powder diffractogram having (a) signals at 3.8±0.2 degrees theta, 8.4±0.2 degrees theta, and 10.7±0.2 degrees theta; and (b) a signal at three or more of 9.4±0.2 degrees theta, 18.9±0.2 degrees theta, 19.8±0.2 degrees theta, and 20.1±0.2 degrees theta.

In some embodiments, Compound I p-toluenesulfonic acid Form A is characterized by an X-ray powder diffractogram having signals at 3.8±0.2 degrees theta, 8.4±0.2 degrees theta, 9.4±0.2 degrees theta, 10.7±0.2 degrees theta, 18.9±0.2 degrees theta, 19.8±0.2 degrees theta, and 20.1±0.2 degrees theta.

In some embodiments, crystalline Compound I p-toluenesulfonic acid Form A is characterized by an X-ray powder diffractogram substantially similar to FIG. 8.

Other aspects of the invention provide methods of making Compound I p-toluenesulfonic acid Form A comprising bead milling Compound I free acid and p-toluenesulfonic acid in isopropyl acetate and drying under vacuum to provide Compound I p-toluenesulfonic acid Form A.

Compound I Magnesium Salt Form A

Figure 11:
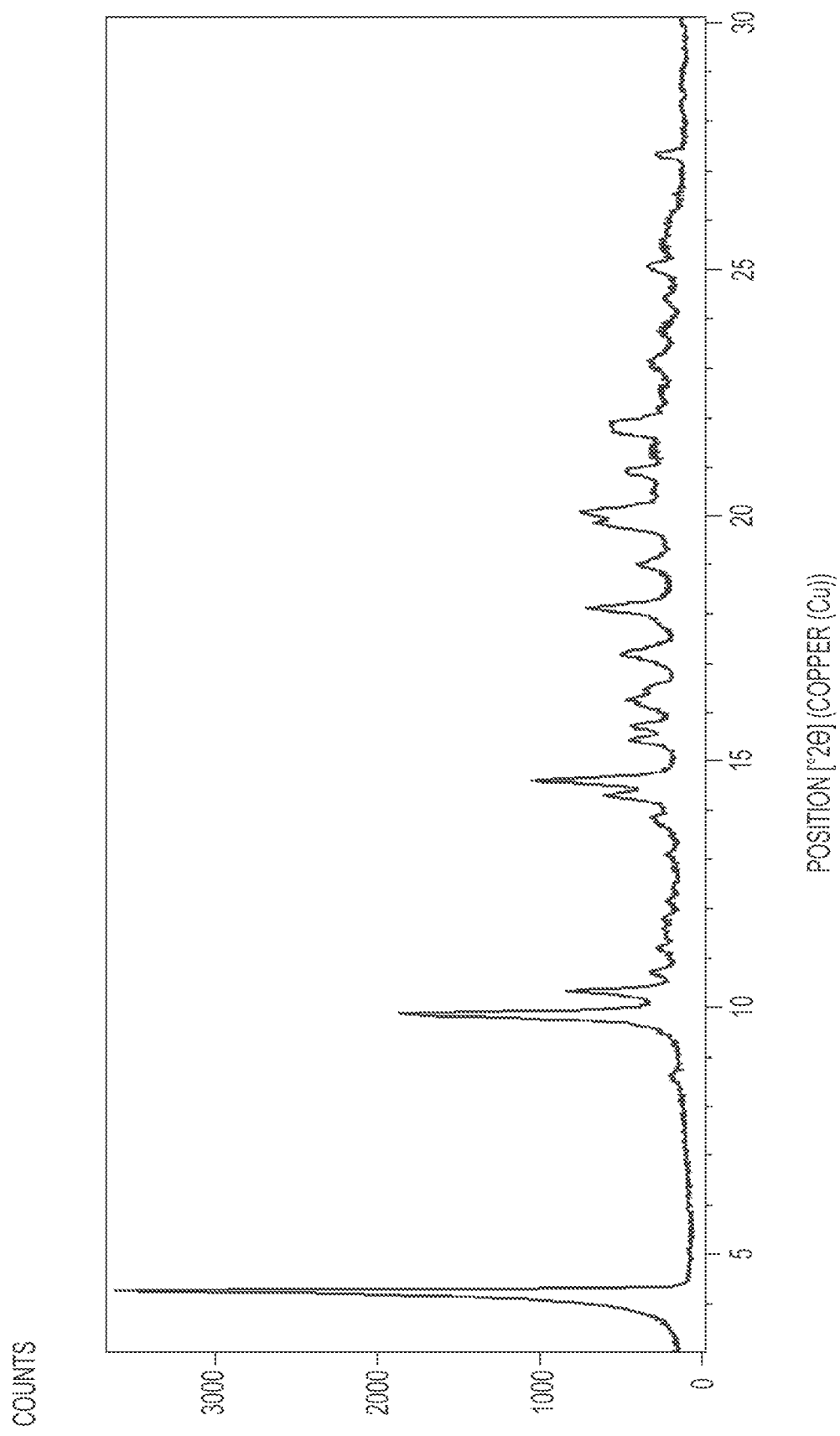
FIG. 11 provides an XRPD pattern of crystalline Compound I magnesium salt Form A.

In some embodiments, the invention provides crystalline Compound I magnesium salt Form A. FIG. 11 provides an X-ray powder diffractogram of Compound I magnesium salt Form A.

In some embodiments, Compound I is substantially pure Compound I magnesium salt Form A. In some embodiments, Compound I is substantially crystalline Compound I magnesium salt Form A. In some embodiments, Compound I magnesium salt Form A is characterized by an X-ray powder diffractogram generated by an X-ray powder diffraction analysis with an incident beam of Cu Kα radiation.

In some embodiments, Compound I magnesium salt Form A is characterized by an X-ray powder diffractogram having a signal at one or more of 4.3±0.2 degrees theta, 9.9±0.2 degrees theta, and 14.6±0.2 degrees theta. In some embodiments, Compound I magnesium salt Form A is characterized by an X-ray powder diffractogram having a signal at two or more of 4.3±0.2 degrees theta, 9.9±0.2 degrees theta, and 14.6±0.2 degrees theta. In some embodiments, Compound I magnesium salt Form A is characterized by an X-ray powder diffractogram having signals at 4.3±0.2 degrees theta, 9.9±0.2 degrees theta, and 14.6±0.2 degrees theta.

In some embodiments, Compound I magnesium salt Form A is characterized by an X-ray powder diffractogram having (a) signals at 4.3±0.2 degrees theta, 9.9±0.2 degrees theta, and 14.6±0.2 degrees theta; and (b) a signal at one or more of 10.4±0.2 degrees theta, 14.3±0.2 degrees theta, 18.1±0.2 degrees theta, 19.8±0.2 degrees theta, and 20.1±0.2 degrees theta. In some embodiments, Compound I magnesium salt Form A is characterized by an X-ray powder diffractogram having (a) signals at 4.3±0.2 degrees theta, 9.9±0.2 degrees theta, and 14.6±0.2 degrees theta; and (b) a signal at two or more of 10.4±0.2 degrees theta, 14.3±0.2 degrees theta, 18.1±0.2 degrees theta, 19.8±0.2 degrees theta, and 20.1±0.2 degrees theta. In some embodiments, Compound I magnesium salt Form A is characterized by an X-ray powder diffractogram having (a) signals at 4.3±0.2 degrees theta, 9.9±0.2 degrees theta, and 14.6±0.2 degrees theta; and (b) a signal at three or more of 10.4±0.2 degrees theta, 14.3±0.2 degrees theta, 18.1±0.2 degrees theta, 19.8±0.2 degrees theta, and 20.1±0.2 degrees theta. In some embodiments, Compound I magnesium salt Form A is characterized by an X-ray powder diffractogram having (a) signals at 4.3±0.2 degrees theta, 9.9±0.2 degrees theta, and 14.6±0.2 degrees theta; and (b) a signal at four or more of 10.4±0.2 degrees theta, 14.3±0.2 degrees theta, 18.1±0.2 degrees theta, 19.8±0.2 degrees theta, and 20.1±0.2 degrees theta.

In some embodiments, Compound I magnesium salt Form A is characterized by an X-ray powder diffractogram having signals at 4.3±0.2 degrees theta, 9.9±0.2 degrees theta, 10.4±0.2 degrees theta, 14.3±0.2 degrees theta, 14.6±0.2 degrees theta, 18.1±0.2 degrees theta, 19.8±0.2 degrees theta, and 20.1±0.2 degrees theta.

In some embodiments, crystalline Compound I magnesium salt Form A is characterized by an X-ray powder diffractogram substantially similar to FIG. 11.

Other aspects of the invention provide methods of making Compound I magnesium salt Form A comprising slurrying Compound I free acid with magnesium chloride and sodium hydroxide in water, adding 1,4-dioxane, freeze drying the mixture, adding acetone and water to form a slurry, temperature cycling the mixture between ambient temperature and 40° C., filtering the solids, and drying under vacuum to provide Compound I magnesium salt Form A.

Methods of Treatment

Compound I, in any one of the pharmaceutically acceptable crystalline forms disclosed herein, acts as a CFTR modulator, i.e., it modulates CFTR activity in the body. Individuals suffering from a mutation in the gene encoding CFTR may benefit from receiving a CFTR modulator. A CFTR mutation may affect the CFTR quantity, i.e., the number of CFTR channels at the cell surface, or it may impact CFTR function, i.e., the functional ability of each channel to open and transport ions. Mutations affecting CFTR quantity include mutations that cause defective synthesis (Class I defect), mutations that cause defective processing and trafficking (Class II defect), mutations that cause reduced synthesis of CFTR (Class V defect), and mutations that reduce the surface stability of CFTR (Class VI defect). Mutations that affect CFTR function include mutations that cause defective gating (Class III defect) and mutations that cause defective conductance (Class IV defect). Some CFTR mutations exhibit characteristics of multiple classes. Certain mutations in the CFTR gene result in cystic fibrosis.

Thus, in some embodiments, the invention provides methods of treating, lessening the severity of, or symptomatically treating cystic fibrosis in a patient comprising administering to the patient an effective amount of Compound I in any one of the pharmaceutically acceptable crystalline forms disclosed herein, alone or in combination with another active ingredient, such as another CFTR modulating agent. In some embodiments, the patient has an F508del/minimal function (MF) genotype, F508del/F508del genotype (homozygous for the F508del mutation), F508del/gating genotype, or F508del/residual function (RF) genotype. In some embodiments the patient is heterozygous and has one F508del mutation. In some embodiments the patient is homozygous for the N1303K mutation.

In some embodiments, the patient is heterozygous and has an F508del mutation on one allele and a mutation on the other allele selected from Table 1:

TABLE 1

CFTR Mutations

| Mutation | | | | |
|---|---|---|---|---|
| Q2X | L218X | Q525X | R792X | E1104X |
| S4X | Q220X | G542X | E822X | W1145X |
| W19X | Y275X | G550X | W882X | R1158X |
| G27X | C276X | Q552X | W846X | R1162X |
| Q39X | Q290X | R553X | Y849X | S1196X |
| W57X | G330X | E585X | R851X | W1204X |
| E60X | W401X | G673X | Q890X | L1254X |
| R75X | Q414X | Q685X | S912X | S1255X |
| L88X | S434X | R709X | Y913X | W1282X |
| E92X | S466X | K710X | Q1042X | Q1313X |
| Q98X | S489X | Q715X | W1089X | Q1330X |
| Y122X | Q493X | L732X | Y1092X | E1371X |
| E193X | W496X | R764X | W1098X | Q1382X |
| W216X | C524X | R785X | R1102X | Q1411X |
| 185 + 1G→T | 711 + 5G→A | 1717 − 8G→A | 2622 + 1G→A | 3 +− 1G→A |
| 296 + 1G→A | 712 − 1G→T | 1717 − 1G→A | 2790 − 1G→C | 3500 − 2A→G |
| 296 + 1G→T | 1248 + 1G→A | 1811 + 1G→C | 3040G→C | 3600 + 2insT |
| 405 + 1G→A | 1249 − 1G→A | 1811 + 1.6 kbA→G | (G970R) | 3850 − 1G→A |
| 405 + 3A→C | 1341 + 1G→A | 1811 + 1643G→T | 3120G→A | 4005 + 1G→A |
| 406 − 1G→A | 1525 − 2A→G | 1812 − 1G→A | 3120 + 1G→A | 4374 + 1G→T |
| 621 + 1G→T | 1525 − 1G→A | 1898 + 1G→A | 3121 − 2A→G | |
| 711 + 1G→T | | 1898 + 1G→C | | |
| 182delT | 1078delT | 1677delTA | 2711delT | 3737delA |
| 306insA | 1119delA | 1782delA | 2732insA | 3791delC |
| 306delTAGA | 1138insG | 1824delA | 2869insG | 3821delT |
| 365-366insT | 1154insTC | 1833delT | 2896insAG | 3876delA |
| 394delTT | 1161delC | 2043delG | 2942insT | 3878delG |
| 442delA | 1213delT | 2143delT | 2957delT | 3905insT |
| 444delA | 1259insA | 2183AA→G | 3007delG | 4016insT |
| 457TAT→G | 1288insTA | 2184delA | 3028delA | 4021dupT |
| 541delC | 1343delG | 2184insA | 3171delC | 4022insT |
| 574delA | 1471delA | 2307insA | 3171insC | 4040delA |
| 663delT | 1497delGG | 2347delG | 3271delGG | 4279insA |
| 849delG | 1548delG | 2585delT | 3349insT | 4326delTC |

TABLE 1-continued

CFTR Mutations

Mutation

| | | | |
|---|---|---|---|
| 935delA | 1609del CA | 2594delGT | 3659delC |
| CFTRdele1 | | CFTRdele16-17b | 1461ins4 |
| CFTRdele2 | | CFTRdele17a, 17b | 1924del7 |
| CFTRdele2, 3 | | CFTRdele17a-18 | 2055de19→A |
| CFTRdele2-4 | | CFTRdele19 | 2105-2117del13insAGAAA |
| CFTRdele3-10, 14b-16 | | CFTRdele19-21 | 2372de18 |
| CFTRdele4-7 | | CFTRdele21 | 2721del11 |
| CFTRdele4-11 | | CFTRdele22-24 | 2991del32 |
| CFTR50kbdel | | CFTRdele22, 23 | 3667ins4 |
| CFTRdup6b-10 | | 124del23bp | 4010de14 |
| CFTRdele11 | | 602del14 | 4209TGTT→AA |
| CFTRdele13, 14a | | 852del22 | |
| CFTRdele14b-17b | | 991del5 | |
| A46D | V520F | Y569D | N1303K |
| G85E | A559T | L1065P | |
| R347P | R560T | R1066C | |
| L467P | R560S | L1077P | |
| I507del | A561E | M1101K | |

In some embodiments, the invention provides methods of treating, lessening the severity of, or symptomatically treating cystic fibrosis in a patient comprising administering to the patient an effective amount of Compound I as crystalline Compound I benzenesulfonic Form A. In some embodiments, the method employs crystalline Compound I benzenesulfonic Form B. In some embodiments, the method of treating, lessening the severity of, or symptomatically treating cystic fibrosis in a patient comprises administering to the patient an effective amount of Compound I as crystalline Compound I benzenesulfonic Form C.

In some embodiments, the method of treating, lessening the severity of, or symptomatically treating cystic fibrosis in a patient comprises administering to the patient an effective amount of Compound I as crystalline Compound Ip-toluenesulfonic acid Form A. In some embodiments, the method employs Compound I as crystalline Compound I magnesium salt Form A.

Combination Therapies

One aspect disclosed herein provides methods of treating cystic fibrosis and other CFTR-mediated diseases with Compound I in any one of the pharmaceutically acceptable crystalline forms disclosed herein, in combination with other pharmaceutically active agents, including CFTR modulating agents. In some embodiments, Compound I in any one of the pharmaceutically acceptable crystalline forms disclosed herein, can be administered in combination with at least one additional active pharmaceutical ingredient, such as, e.g., a CFTR modulating agent. In some embodiments, the at least one additional active pharmaceutical ingredient is selected from (a) Compound II and pharmaceutically acceptable salts thereof; and (b) Compound III or Compound III-d and pharmaceutically acceptable salts of Compound III or Compound III-d. Thus, in some embodiments, the combination therapies provided herein comprise Compound I in any one of the pharmaceutically acceptable crystalline forms disclosed herein, and at least one compound selected from Compound II, (Compound III or III-d), and pharmaceutically acceptable salts thereof. In some embodiments, the combination therapies provided herein comprise at least one compound selected from Compound I in any one of the pharmaceutically acceptable crystalline forms disclosed herein and at least one compound selected from (Compound III or III-d), and/or pharmaceutically acceptable salts thereof.

In some embodiments, at least one compound selected from Compound I in any one of the pharmaceutically acceptable crystalline forms disclosed herein, is administered in combination with at least one compound selected from Compound II and pharmaceutically acceptable salts thereof. In some embodiments, at least one compound selected from Compound I in any one of the pharmaceutically acceptable crystalline forms disclosed herein is administered in combination with at least one compound selected from Compound III and pharmaceutically acceptable salts thereof. In some embodiments, at least one compound selected from Compound I in any one of the pharmaceutically acceptable crystalline forms disclosed herein is administered in combination with at least one compound selected from Compound III-d and pharmaceutically acceptable salts thereof. In some embodiments, at least one compound selected from Compound I in any one of the pharmaceutically acceptable crystalline forms disclosed herein, is administered in combination with Compounds II or a pharmaceutically acceptable salt thereof and at least one compound selected from Compound III and pharmaceutically acceptable salts thereof. In some embodiments, at least one compound selected from Compound I in any one of the pharmaceutically acceptable crystalline forms disclosed herein, is administered in combination with at least one compound selected from Compound II and pharmaceutically acceptable salts thereof and at least one compound selected from Compound III-d and pharmaceutically acceptable salts thereof.

Each of Compounds I, II, and III or III-d, and their pharmaceutically acceptable salts thereof independently can be administered once daily, twice daily, or three times daily. In some embodiments, at least one compound selected from Compound I and pharmaceutically acceptable salts thereof is administered once daily. In some embodiments, at least one compound selected from Compound I in any one of the pharmaceutically acceptable crystalline forms disclosed herein is administered twice daily. In some embodiments, at least one compound selected from Compound I in any one of the pharmaceutically acceptable crystalline forms disclosed herein and at least one compound selected from Compound II and pharmaceutically acceptable salts thereof are administered once daily. In some embodiments, at least one compound selected from Compound I in any one of the pharmaceutically acceptable crystalline forms disclosed herein and at least one compound selected from Compound II and pharmaceutically acceptable salts thereof are administered twice daily. In some embodiments, at least one compound selected from Compound I in any one of the pharmaceutically acceptable crystalline forms disclosed herein and at least one compound selected from Compound III or III-d and pharmaceutically acceptable salts thereof are administered once daily. In some embodiments, at least one compound selected from Compound I in any one of the pharmaceutically acceptable crystalline forms disclosed herein and at least one compound selected from Compound III or III-d and pharmaceutically acceptable salts thereof are administered twice daily.

In some embodiments, at least one compound selected from Compound I in any one of the pharmaceutically acceptable crystalline forms disclosed herein, at least one compound selected from Compound II and pharmaceutically acceptable salts thereof, and at least one compound selected from Compound III or III-d and pharmaceutically acceptable salts thereof are administered once daily. In some embodiments, at least one compound selected from Compound I in any one of the pharmaceutically acceptable crystalline forms disclosed herein, at least one compound selected from Compound III or III-d and pharmaceutically acceptable salts thereof, are administered once daily. In some embodiments, at least one compound selected from Compound I in any one of the pharmaceutically acceptable crystalline forms disclosed herein, at least one compound selected from Compound II and pharmaceutically acceptable salts thereof, and at least one compound selected from Compound III or III-d and pharmaceutically acceptable salts thereof are administered twice daily. In some embodiments, at least one compound selected from Compound I in any one of the pharmaceutically acceptable crystalline forms disclosed herein, at least one compound selected from Compound III or III-d and pharmaceutically acceptable salts thereof, are administered twice daily.

In some embodiments, at least one compound selected from Compound I in any one of the pharmaceutically acceptable crystalline forms disclosed herein and at least one compound selected from Compound II and pharmaceutically acceptable salts thereof, are administered once daily and at least one compound selected from Compound III-d and pharmaceutically acceptable salts thereof, are administered twice daily.

In some embodiments, at least one compound selected from Compound I in any one of the pharmaceutically acceptable crystalline forms disclosed herein is administered in an amount of 5 mg to 100 mg. In some embodiments, at least one compound selected from Compound I in any one of the pharmaceutically acceptable crystalline forms disclosed herein is administered in an amount of 5 mg to 60 mg daily.

Compounds I, II, (III or III-d), and their pharmaceutically acceptable salts thereof can be administered in a single pharmaceutical composition or separate pharmaceutical compositions. Such pharmaceutical compositions can be administered once daily or multiple times daily, such as twice daily. As used herein, the phrase that a given amount of API (e.g., Compound I, II, (III, III-d), or a pharmaceutically acceptable salt thereof) is administered once or twice daily or per day means that said given amount is administered per dosing once or twice daily. For example, the phrase that 50 mg of Compound II or a pharmaceutically acceptable salt thereof is administered twice daily or per day means that 50 mg of Compound II or an equivalent amount of a pharmaceutically acceptable salt thereof is administered per dosing twice per day (e.g., 50 mg of Compound II or an equivalent amount of a pharmaceutically acceptable salt thereof is administered in the morning and 50 mg of Compound II or an equivalent amount of a pharmaceutically acceptable salt thereof is administered in the evening).

In some embodiments, at least one compound selected from Compound I in any one of the pharmaceutically acceptable crystalline forms disclosed herein is administered in a first pharmaceutical composition; at least one compound selected from Compound II and pharmaceutically acceptable salts thereof is administered in a second pharmaceutical composition; and at least one compound selected from Compound III and pharmaceutically acceptable salts thereof is administered in a third pharmaceutical composition.

In some embodiments, at least one compound selected from Compound I in any one of the pharmaceutically acceptable crystalline forms disclosed herein is administered in a first pharmaceutical composition; at least one compound selected from Compound II and pharmaceutically acceptable salts thereof is administered in a second pharmaceutical composition; at least one compound selected from Compound III-d and pharmaceutically acceptable salts thereof is administered in a third pharmaceutical composition.

In some embodiments, at least one compound selected from Compound I in any one of the pharmaceutically acceptable crystalline forms disclosed herein is administered in a first pharmaceutical composition; at least one compound selected from Compound III or III-d and pharmaceutically acceptable salts thereof is administered in a second pharmaceutical composition.

In some embodiments, at least one compound selected from Compound I in any one of the pharmaceutically acceptable crystalline forms disclosed herein is administered in a first pharmaceutical composition; and at least one compound selected from Compound II and pharmaceutically acceptable salts thereof and at least one compound selected from Compound III or III-d, and pharmaceutically acceptable salts thereof are administered in a second pharmaceutical composition. In some embodiments, the second pharmaceutical composition comprises a half of a daily dose of said at least one compound selected from Compound III, III-d, and pharmaceutically acceptable salts thereof, and the other half of said at least one compound selected from Compound III, III-d, and pharmaceutically acceptable salts thereof is administered in a third pharmaceutical composition.

In some embodiments, at least one compound selected from Compound I in any one of the pharmaceutically acceptable crystalline forms disclosed herein; at least one compound selected from Compound II and pharmaceutically acceptable salts thereof and at least one compound selected from Compound III, III-d, and pharmaceutically acceptable salts thereof are administered in a first pharmaceutical composition. In some embodiments, the first pharmaceutical composition is administered to the patient twice daily. In some embodiments the first pharmaceutical composition is administered once daily. In some embodiments the first pharmaceutical composition is administered once daily and a second composition comprising only Compound III is administered once daily.

Any suitable pharmaceutical formulations can be used for Compound I (in any one of the pharmaceutically acceptable crystalline forms disclosed herein), Compound II, Compound III, Compound III-d, and pharmaceutically acceptable salts thereof. Some exemplary pharmaceutical compositions for Compound I are described in the Examples. Some exemplary pharmaceutical compositions for Compound II and its pharmaceutically acceptable salts can be found in WO 2011/119984 and WO 2014/014841, incorporated herein by reference. Some exemplary pharmaceutical compositions for Compound III and its pharmaceutically acceptable salts can be found in WO 2007/134279, WO 2010/019239, WO 2011/019413, WO 2012/027731, and WO 2013/130669, and some exemplary pharmaceutical compositions for Compound III-d and its pharmaceutically acceptable salts can be found in U.S. Pat. Nos. 8,865,902, 9,181,192, 9,512,079, WO 2017/053455, and WO 2018/080591, all of which are incorporated herein by reference.

In some embodiments, the crystalline form of Compound I used in the combination therapies of the invention is Compound I benzene sulfonic Form A . . . . In some embodiments, the combination therapy employs crystalline Compound I benzene sulfonic Form B. In some embodiments, combination therapy employs crystalline Compound I benzene sulfonic Form C. In some embodiments, the crystalline form of Compound I is Compound I benzene sulfonic Form A. In some embodiments, the crystalline form of Compound I used in the combination therapies of the invention is Compound I p-toluenesulfonic acid Form A. In some embodiments, the crystalline form of Compound I used in the combination therapies of the invention is Compound I magnesium salt Form A.

Pharmaceutical Compositions

Another aspect of the invention provides pharmaceutical compositions comprising Compound I as any one of the pharmaceutically acceptable crystalline forms disclosed herein. In some embodiments, the invention provides pharmaceutical compositions comprising Compound I as any one of the pharmaceutically acceptable crystalline forms disclosed herein in combination with at least one additional active pharmaceutical ingredient. In some embodiments, the at least one additional active pharmaceutical ingredient is a CFTR modulator. In some embodiments, the at least one additional active pharmaceutical ingredient is a CFTR corrector. In some embodiments, the at least one additional active pharmaceutical ingredient is a CFTR potentiator. In some embodiments, the pharmaceutical composition comprises Compound I as any one of the pharmaceutically acceptable crystalline forms disclosed herein and at least two additional active pharmaceutical ingredients, one of which is a CFTR corrector and one of which is a CFTR potentiator.

In some embodiments, at least one additional active pharmaceutical ingredient is selected from mucolytic agents, bronchodilators, antibiotics, anti-infective agents, and anti-inflammatory agents.

In some embodiments, the invention provides a pharmaceutical composition comprising at least one compound selected from Compound I as any one of the pharmaceutically acceptable crystalline forms disclosed herein, and at least one pharmaceutically acceptable carrier.

In some embodiments, the invention provides a pharmaceutical composition comprising (a) 5 mg to 60 mg of Compound I, wherein Compound I is any one of the pharmaceutically acceptable crystalline forms disclosed herein, (b) at least one compound selected from Compound II and pharmaceutically acceptable salts thereof, and (c) at least one pharmaceutically acceptable carrier.

In some embodiments, the disclosure provides a pharmaceutical composition comprising (a) 5 mg to 60 mg of Compound I, wherein Compound I is any one of the pharmaceutically acceptable crystalline forms disclosed herein, (b) at least one compound selected from Compound III, III-d, and pharmaceutically acceptable salts thereof, and (c) at least one pharmaceutically acceptable carrier.

In some embodiments, the disclosure provides a pharmaceutical composition comprising (a) 5 mg to 60 mg of Compound I, wherein Compound I is any one of the pharmaceutically acceptable crystalline forms disclosed herein, (b) at least one compound selected from Compound II and pharmaceutically acceptable salts thereof, (c) at least one compound selected from Compound III and pharmaceutically acceptable salts thereof, and (d) at least one pharmaceutically acceptable carrier.

In some embodiments, the disclosure provides a pharmaceutical composition comprising (a) 5 mg to 60 mg of Compound I, wherein Compound I is any one of the pharmaceutically acceptable crystalline forms disclosed herein, (b) at least one compound selected from Compound II and pharmaceutically acceptable salts thereof, (c) at least one compound selected from Compound III-d and pharmaceutically acceptable salts thereof, and (d) at least one pharmaceutically acceptable carrier.

Any pharmaceutical composition disclosed herein may comprise at least one pharmaceutically acceptable carrier. In some embodiments, the at least one pharmaceutically acceptable carrier is selected from pharmaceutically acceptable vehicles and pharmaceutically acceptable adjuvants. In some embodiments, the at least one pharmaceutically acceptable is selected from pharmaceutically acceptable fillers, disintegrants, surfactants, binders, lubricants.

In some embodiments, the crystalline form of Compound I used in the pharmaceutical compositions of the invention is Compound I benzene sulfonic Form A . . . . In some embodiments, the combination therapy employs crystalline Compound I benzene sulfonic Form B. In some embodiments, combination therapy employs crystalline Compound I benzene sulfonic Form C. In some embodiments, the crystalline form of Compound I is Compound I benzene sulfonic Form A. In some embodiments, the crystalline form of Compound I used in the pharmaceutical compositions of the invention is Compound Ip-toluenesulfonic acid Form A. I In some embodiments, the crystalline form of Compound I used in the pharmaceutical compositions of the invention is Compound I magnesium salt Form A.

The pharmaceutical compositions described herein are useful for treating cystic fibrosis and other CFTR-mediated diseases.

As described above, pharmaceutical compositions disclosed herein may optionally further comprise at least one pharmaceutically acceptable carrier. The at least one pharmaceutically acceptable carrier may be selected from adjuvants and vehicles. The at least one pharmaceutically acceptable carrier, as used herein, includes any and all solvents, diluents, other liquid vehicles, dispersion aids, suspension aids, surface active agents, isotonic agents, thickening agents, emulsifying agents, preservatives, solid binders, and lubricants, as suited to the particular dosage form desired. Remington: *The Science and Practice of Pharmacy,* 21st edition, 2005, ed. D. B. Troy, Lippincott Williams & Wilkins, Philadelphia, and *Encyclopedia of Pharmaceutical Technology,* eds. J. Swarbrick and J. C. Boylan, 1988-1999, Marcel Dekker, New York discloses various carriers used in formulating pharmaceutical compositions and known techniques for the preparation thereof. Except insofar as any conventional carrier is incompatible with the compounds of this disclosure, such as by producing any undesirable biological effect or otherwise interacting in a deleterious manner with any other component(s) of the pharmaceutical composition, its use is contemplated to be within the scope of this disclosure. Non-limiting examples of suitable pharmaceutically acceptable carriers include, but are not limited to, ion exchangers, alumina, aluminum stearate, lecithin, serum proteins (such as human serum albumin), buffer substances (such as phosphates, glycine, sorbic acid, and potassium sorbate), partial glyceride mixtures of saturated vegetable fatty acids, water, salts, and electrolytes (such as protamine sulfate, disodium hydrogen phosphate, potassium hydrogen phosphate, sodium chloride, and zinc salts), colloidal silica, magnesium trisilicate, polyvinyl pyrrolidone, polyacrylates, waxes, polyethylene-polyoxypropylene-block polymers, wool fat, sugars (such as lactose, glucose and sucrose), starches (such as corn starch and potato starch), cellulose and its derivatives (such as sodium carboxymethyl cellulose, ethyl cellulose and cellulose acetate), powdered tragacanth, malt, gelatin, talc, excipients (such as cocoa butter and suppository waxes), oils (such as peanut oil, cottonseed oil, safflower oil, sesame oil, olive oil, corn oil and soybean oil), glycols (such as propylene glycol and polyethylene glycol), esters (such as ethyl oleate and ethyl laurate), agar, buffering agents (such as magnesium hydroxide and aluminum hydroxide), alginic acid, pyrogen-free water, isotonic saline, Ringer's solution, ethyl alcohol, phosphate buffer solutions, non-toxic compatible lubricants (such as sodium lauryl sulfate and magnesium stearate), coloring agents, releasing agents, coating agents, sweetening agents, flavoring agents, perfuming agents, preservatives, and antioxidants.

Non-Limiting List of Exemplary Embodiments
  1. Compound I

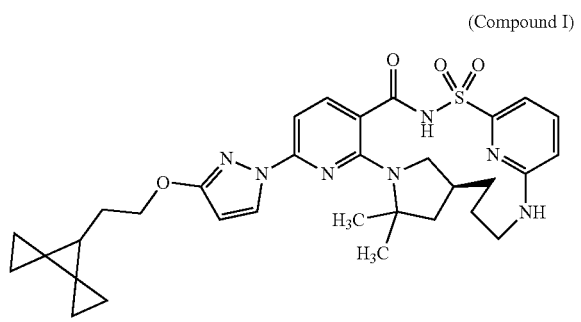 [SMILES: CC1(C)C[C@@H]2CCCNc3cccc(n3)S(=O)(=O)NC(=O)c3ccc(-n4ccc(OCCC5C6(CC6)C56CC6)n4)nc3N1C2]

(Compound I)

as substantially crystalline Compound I benzenesulfonic acid Form A (i.e., wherein less than 15% of Compound I is in amorphous form, wherein less than 10% of Compound I is in amorphous form, wherein less than 5% of Compound I is in amorphous form).
  2. The Compound I of Embodiment 1, wherein Compound I is 100% crystalline Compound I benzenesulfonic acid Form A.
  3. Substantially pure Compound I benzenesulfonic acid Form A.
  4. The Compound I benzenesulfonic acid Form A of any one of Embodiments 1 to 3, characterized by an X-ray powder diffractogram having a signal at 6.6±0.2 degrees two-theta, 11.0±0.2 degrees two-theta, and/or 16.4±0.2 degrees two-theta.
  5. The Compound I benzenesulfonic acid Form A of any one of Embodiments 1 to 3, characterized by an X-ray powder diffractogram having a signal at 6.6±0.2 degrees two-theta, 11.0±0.2 degrees two-theta, and 16.4±0.2 degrees two-theta.
  6. The Compound I benzenesulfonic acid Form A of any one of Embodiments 1 to 3, characterized by an X-ray powder diffractogram having a signal at two or more of 6.6±0.2 degrees two-theta, 11.0±0.2 degrees two-theta, 16.4±0.2 degrees two-theta, and 22.4±0.2 degrees theta.
  7. The Compound I benzenesulfonic acid Form A of any one of Embodiments 1 to 3, characterized by an X-ray powder diffractogram having a signal at 6.6±0.2 degrees two-theta, 11.0±0.2 degrees two-theta, 16.4±0.2 degrees two-theta, and 22.4±0.2 degrees theta.
  8. The Compound I benzenesulfonic acid Form A of any one of Embodiments 1 to 3, characterized by an X-ray powder diffractogram having (a) a signal at one or more of 6.6±0.2 degrees two-theta, 11.0±0.2 degrees two-theta, 16.4±0.2 degrees two-theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  9. The Compound I benzenesulfonic acid Form A of any one of Embodiments 1 to 3, characterized by an X-ray powder diffractogram having (a) a signal at two or more of 6.6±0.2 degrees two-theta, 11.0±0.2 degrees two-theta, 16.4±0.2 degrees two-theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  10. The Compound I benzenesulfonic acid Form A of any one of Embodiments 1 to 3, characterized by an X-ray powder diffractogram having (a) a signal at three or more of 6.6±0.2 degrees two-theta, 11.0±0.2 degrees two-theta, 16.4±0.2 degrees two-theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  11. The Compound I benzenesulfonic acid Form A of any one of Embodiments 1 to 3, characterized by an X-ray powder diffractogram having (a) signals at 6.6±0.2 degrees two-theta, 11.0±0.2 degrees two-theta, 16.4±0.2 degrees two-theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  12. The Compound I benzenesulfonic acid Form A of any one of Embodiments 1 to 3, is characterized by an X-ray powder diffractogram having (a) signals at 6.6±0.2 degrees two-theta, 11.0±0.2 degrees two-theta, 16.4±0.2 degrees two-theta, and 22.4±0.2 degrees theta; and (b) a signal at one or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  13. The Compound I benzenesulfonic acid Form A of any one of Embodiments 1 to 3, characterized by an X-ray powder diffractogram having (a) signals at 6.6±0.2 degrees two-theta, 11.0±0.2 degrees two-theta, 16.4±0.2 degrees two-theta, and 22.4±0.2 degrees theta; and (b) a signal at two or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.
  14. The Compound I benzenesulfonic acid Form A of any one of Embodiments 1 to 3, characterized by an X-ray powder diffractogram having (a) signals at 6.6±0.2 degrees two-theta, 11.0±0.2 degrees two-theta, 16.4±0.2 degrees two-theta, and 22.4±0.2 degrees theta; and (b) a signal at three or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.

15. The Compound I benzenesulfonic acid Form A of any one of Embodiments 1 to 3, characterized by an X-ray powder diffractogram having (a) signals at 6.6±0.2 degrees two-theta, 11.0±0.2 degrees two-theta, 16.4±0.2 degrees two-theta, and 22.4±0.2 degrees theta; and (b) a signal at four or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.

16. The Compound I benzenesulfonic acid Form A of any one of Embodiments 1 to 3, characterized by an X-ray powder diffractogram having (a) signals at 6.6±0.2 degrees two-theta, 11.0±0.2 degrees two-theta, 16.4±0.2 degrees two-theta, and 22.4±0.2 degrees theta; and (b) a signal at five or more of 10.3±0.2 degrees theta, 12.1±0.2 degrees theta, 13.7±0.2 degrees theta, 17.5±0.2 degrees theta, 20.8±0.2 degrees theta, and 25.7±0.2 degrees theta.

17. The Compound I benzenesulfonic acid Form A of any one of Embodiments 1 to 3, characterized by an X-ray powder diffractogram having signals at 6.6±0.2 degrees theta, 10.3±0.2 degrees theta, 11.0±0.2 degrees theta, 12.1±0.2 degrees theta, 13.7±0.2 degrees theta, 16.4±0.2 degrees theta, 17.5±0.2 degrees theta, 20.8±0.2 degrees theta, 22.4±0.2 degrees theta, and 25.7±0.2 degrees theta.

18. The Compound I benzenesulfonic acid Form A of any one of Embodiments 1 to 3, characterized by an X-ray powder diffractogram substantially similar to FIG. 1.

19. The Compound I benzenesulfonic acid Form A of any one of Embodiments 1 to 18, characterized by TGA data substantially similar to FIG. 2.

20. The Compound I benzenesulfonic acid Form A of any one of Embodiments 1 to 19, characterized by a DSC analysis substantially similar to FIG. 3.

21. The Compound I benzenesulfonic acid Form A of any one of Embodiments 1 to 20, prepared by a process comprising bead milling Compound I free acid with benzenesulfonic acid in ethanol and drying under vacuum to provide Compound I benzenesulfonic acid crystalline Form A.

22. A pharmaceutical composition comprising the Compound I benzenesulfonic acid Form A of any one of Embodiments 1 to 21, and optionally further comprising one or more additional CFTR modulating compounds.

23. The pharmaceutical composition of Embodiment 22, wherein the one or more additional CFTR modulating compounds are
   a. (a) Compound III or Compound III-d; or
   b. (i) Compound II and (ii) Compound III or Compound III-d.

24. The Compound I benzenesulfonic acid Form A of any one of Embodiments 1 to 21 or the pharmaceutical composition of Embodiment 22 or Embodiment 23 for use in the treatment of cystic fibrosis.

25. Use of the Compound I benzenesulfonic acid Form A of any one of Embodiments 1 to 21 or the compositions of Embodiment 22 or Embodiment 23 in the manufacture of a medicament for the treatment of cystic fibrosis.

26. A method of treating cystic fibrosis comprising administering the Compound I benzenesulfonic acid Form A of any one of Embodiments 1 to 21 or the pharmaceutical composition of Embodiment 22 or Embodiment 23 to a subject in need thereof.

27. The compound for use of Embodiment 24, the use of Embodiment 25, or the method of Embodiment 26, wherein the Compound I benzenesulfonic acid Form A of any one of Embodiments 1 to 21 is administered in combination with at least one additional CFTR modulating compound.

28 The compound, use, or method of Embodiment 27, wherein the Compound I benzenesulfonic acid Form A of any one of Embodiments 1 to 21 is administered in combination with
   a. (a) Compound III or Compound III-d;
   b. (i) Compound II and (ii) Compound III; or
   c. (i) Compound II and (ii) Compound III-d.

29. The composition of Embodiment 23 or the compound, use, or method of Embodiment 28, wherein Compound II and/or Compound III are in the form of a solid dispersion.

30. A method of preparing Compound I benzenesulfonic acid Form A of any one of Embodiments 1 to 21, comprising bead milling Compound I free acid with benzenesulfonic acid in ethanol and drying under vacuum to provide Compound I benzenesulfonic acid crystalline Form A.

31. Compound I as substantially crystalline benzenesulfonic acid Form B (i.e., wherein less than 15% of Compound I is in amorphous form, wherein less than 10% of Compound I is in amorphous form, wherein less than 5% of Compound I is in amorphous form).

32. The Compound I of Embodiment 1, wherein Compound I is 100% crystalline Compound I benzenesulfonic acid Form B.

33. Substantially pure Compound I benzenesulfonic acid Form B.

34 The Compound I benzenesulfonic acid Form B of any one of Embodiments 31 to 33, characterized by an X-ray powder diffractogram having a signal at one or more of 8.4±0.2 degrees theta, 9.4±0.2 degrees theta, 12.6±0.2 degrees theta, and 15.2±0.2 degrees theta.

35. The Compound I benzenesulfonic acid Form B of any one of Embodiments 31 to 33, characterized by an X-ray powder diffractogram having a signal at two or more of 8.4±0.2 degrees theta, 9.4±0.2 degrees theta, 12.6±0.2 degrees theta, and 15.2±0.2 degrees theta.

36. The Compound I benzenesulfonic acid Form B of any one of Embodiments 31 to 33, characterized by an X-ray powder diffractogram having a signal at two or more of 8.4±0.2 degrees theta, 9.4±0.2 degrees theta, 12.6±0.2 degrees theta, and 15.2±0.2 degrees theta.

37 The Compound I benzenesulfonic acid Form B of any one of Embodiments 31 to 33, characterized by an X-ray powder diffractogram having a signal at three or more of 8.4±0.2 degrees theta, 9.4±0.2 degrees theta, 12.6±0.2 degrees theta, and 15.2±0.2 degrees theta.

38. The Compound I benzenesulfonic acid Form B of any one of Embodiments 31 to 33, characterized by an X-ray powder diffractogram having signals at 8.4±0.2 degrees theta, 9.4±0.2 degrees theta, 12.6±0.2 degrees theta, and 15.2±0.2 degrees theta.

39. The Compound I benzenesulfonic acid Form B of any one of Embodiments 31 to 33, characterized by an X-ray powder diffractogram having (a) a signal at one or more of 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

40. The Compound I benzenesulfonic acid Form B of any one of Embodiments 31 to 33, characterized by an X-ray powder diffractogram having (a) a signal at two or more of 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

41. The Compound I benzenesulfonic acid Form B of any one of Embodiments 31 to 33, characterized by an X-ray powder diffractogram having (a) a signal at three or more of 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

42. The Compound I benzenesulfonic acid Form B of any one of Embodiments 31 to 33, characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

43. The Compound I benzenesulfonic acid Form B of any one of Embodiments 31 to 33, is characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at one or more of 3.8±0.2 degrees theta, 10.7±0.2 degrees theta, 17.1±0.2 degrees theta, and 23.2±0.2 degrees theta.

44. The Compound I benzenesulfonic acid Form B of any one of Embodiments 31 to 33, characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at two or more of 3.8±0.2 degrees theta, 10.7±0.2 degrees theta, 17.1±0.2 degrees theta, and 23.2±0.2 degrees theta.

45. The Compound I benzenesulfonic acid Form B of any one of Embodiments 31 to 33, characterized by an X-ray powder diffractogram having (a) signals at 8.4±0.2 degrees theta, 9.4±0.2 degrees theta, 12.6±0.2 degrees theta, and 15.2±0.2 degrees theta; and (b) a signal at three or more of 3.8±0.2 degrees theta, 10.7±0.2 degrees theta, 17.1±0.2 degrees theta, and 23.2±0.2 degrees theta.

46. The Compound I benzenesulfonic acid Form B of any one of Embodiments 31 to 33, characterized by an X-ray powder diffractogram having signals at 3.8±0.2 degrees theta, 8.4±0.2 degrees theta, 9.4±0.2 degrees theta, 10.7±0.2 degrees theta, 12.6±0.2 degrees theta, 15.2±0.2 degrees theta, 17.1±0.2 degrees theta, and 23.2±0.2 degrees theta.

47. The Compound I benzenesulfonic acid Form B of any one of Embodiments 31 to 33, characterized by an X-ray powder diffractogram substantially similar to FIG. 4.

Figure 5:
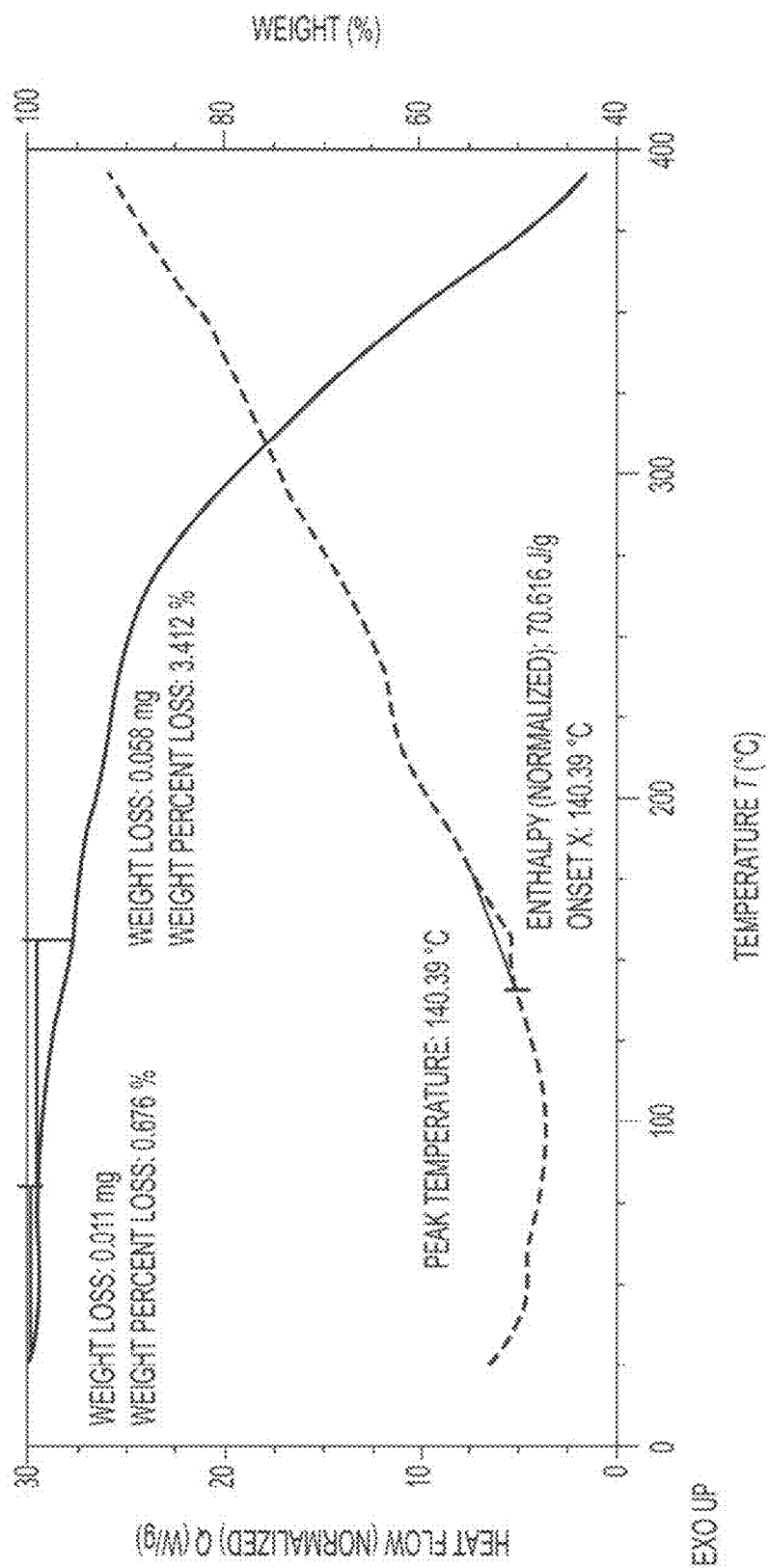
FIG. 5 provides a TGA/DSC analysis of Compound I benzenesulfonic acid Form B.

48. The Compound I benzenesulfonic acid Form B of any one of Embodiments 31 to 47, characterized by TGA/DSC data substantially similar to FIG. 5.

49. The Compound I benzenesulfonic acid Form B of any one of Embodiments 31 to 48, prepared by a process comprising bead milling Compound I free acid with benzenesulfonic acid in THF and drying under vacuum to provide Compound I benzenesulfonic acid crystalline Form B.

50. A pharmaceutical composition comprising the Compound I benzenesulfonic acid Form B of any one of Embodiments 31 to 49, and optionally further comprising one or more additional CFTR modulating compounds.

51. The pharmaceutical composition of Embodiment 50, wherein the one or more additional CFTR modulating compounds are
   a. (a) Compound III or Compound III-d; or
   b. (i) Compound II, and (ii) Compound III or Compound III-d.

52. The Compound I benzenesulfonic acid Form B of any one of Embodiments 31 to 49 or the pharmaceutical composition of Embodiment 50 or Embodiment 51 for use in the treatment of cystic fibrosis.

53. Use of the Compound I benzenesulfonic acid Form B of any one of Embodiments 31 to 49 or the compositions of Embodiment 50 or Embodiment 51 in the manufacture of a medicament for the treatment of cystic fibrosis.

54. A method of treating cystic fibrosis comprising administering the Compound I benzenesulfonic acid Form B of any one of Embodiments 31 to 49 or the pharmaceutical composition of Embodiment 50 or Embodiment 51 to a subject in need thereof.

55. The compound for use of Embodiment 52, the use of Embodiment 53, or the method of Embodiment 54, wherein the Compound I benzenesulfonic acid Form B of any one of Embodiments 31 to 49 is administered in combination with at least one additional CFTR modulating compound.

56. The compound, use, or method of Embodiment 55, wherein the Compound I benzenesulfonic acid Form B of any one of Embodiments 31 to 49 is administered in combination with
   a. (a) Compound III or Compound III-d;
   b. (i) Compound II and (ii) Compound III; or
   c. (i) Compound II and (ii) Compound III-d.

57. The composition of Embodiment 51 or the compound, use, or method of Embodiment 53, wherein Compound II and/or Compound III are in the form of a solid dispersion.

58. A method of preparing Compound I benzenesulfonic acid Form B of any one of Embodiments 31 to 49, comprising bead milling Compound I free acid with benzenesulfonic acid in THF and drying under vacuum to provide Compound I benzenesulfonic acid crystalline Form B.

59. Compound I as substantially crystalline benzenesulfonic acid Form C (i.e., wherein less than 15% of Compound I is in amorphous form, wherein less than 10% of Compound I is in amorphous form, wherein less than 5% of Compound I is in amorphous form).

60. The Compound I of Embodiment 1, wherein Compound I is 100% crystalline benzenesulfonic acid Form C.

61. Substantially pure Compound I benzenesulfonic acid Form C.

62. The Compound I benzenesulfonic acid Form C of any one of Embodiments 59 to 61, characterized by an X-ray powder diffractogram having a signal at one or more of 5.0±0.2 degrees theta, 14.6±0.2 degrees theta, 24.9±0.2 degrees theta, and 26.6±0.2 degrees theta.

63. The Compound I benzenesulfonic acid Form C of any one of Embodiments 59 to 61, characterized by an X-ray powder diffractogram having a signal at two or more of 5.0±0.2 degrees theta, 14.6±0.2 degrees theta, 24.9±0.2 degrees theta, and 26.6±0.2 degrees theta.

64. The Compound I benzenesulfonic acid Form C of any one of Embodiments 59 to 61, characterized by an X-ray powder diffractogram having a signal at two or more of 5.0±0.2 degrees theta, 14.6±0.2 degrees theta, 24.9±0.2 degrees theta, and 26.6±0.2 degrees theta.

65. The Compound I benzenesulfonic acid Form C of any one of Embodiments 59 to 61, characterized by an X-ray powder diffractogram having a signal at three or more of 5.0±0.2 degrees theta, 14.6±0.2 degrees theta, 24.9±0.2 degrees theta, and 26.6±0.2 degrees theta.

66. The Compound I benzenesulfonic acid Form C of any one of Embodiments 59 to 61, characterized by an X-ray powder diffractogram having signals at 5.0±0.2 degrees theta, 14.6±0.2 degrees theta, 24.9±0.2 degrees theta, and 26.6±0.2 degrees theta.

67. The Compound I benzenesulfonic acid Form C of any one of Embodiments 59 to 61, characterized by an X-ray powder diffractogram having (a) a signal at one or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

68 The Compound I benzenesulfonic acid Form C of any one of Embodiments 59 to 61, characterized by an X-ray powder diffractogram having (a) a signal at two or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

69. The Compound I benzenesulfonic acid Form C of any one of Embodiments 59 to 61, characterized by an X-ray powder diffractogram having (a) a signal at three or more of 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

70. The Compound I benzenesulfonic acid Form C of any one of Embodiments 59 to 61, characterized by an X-ray powder diffractogram having (a) signals at 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

71. The Compound I benzenesulfonic acid Form C of any one of Embodiments 59 to 61, is characterized by an X-ray powder diffractogram having (a) signals at 5.0±0.2 degrees theta, 14.6±0.2 degrees theta, 24.9±0.2 degrees theta, and 26.6±0.2 degrees theta; and (b) a signal at one or more of 6.8±0.2 degrees theta, 11.4±0.2 degrees theta, 16.6±0.2 degrees theta, and 27.3±0.2 degrees theta.

72. The Compound I benzenesulfonic acid Form C of any one of Embodiments 59 to 61, characterized by an X-ray powder diffractogram having (a) signals at 85.0±0.2 degrees theta, 14.6±0.2 degrees theta, 24.9±0.2 degrees theta, and 26.6±0.2 degrees theta; and (b) a signal at two or more of 6.8±0.2 degrees theta, 11.4±0.2 degrees theta, 16.6±0.2 degrees theta, and 27.3±0.2 degrees theta.

73. The Compound I benzenesulfonic acid Form C of any one of Embodiments 59 to 61, characterized by an X-ray powder diffractogram having (a) signals at 5.0±0.2 degrees theta, 14.6±0.2 degrees theta, 24.9±0.2 degrees theta, and 26.6±0.2 degrees theta; and (b) a signal at three or more of 6.8±0.2 degrees theta, 11.4±0.2 degrees theta, 16.6±0.2 degrees theta, and 27.3±0.2 degrees theta.

74. The Compound I benzenesulfonic acid Form C of any one of Embodiments 59 to 61, characterized by an X-ray powder diffractogram having signals at 5.0±0.2 degrees theta, 6.8±0.2 degrees theta, 11.4±0.2 degrees theta, 14.6±0.2 degrees theta, 16.6±0.2 degrees theta, 24.9±0.2 degrees theta, 26.6±0.2 degrees theta, and 27.3±0.2 degrees theta.

75. The Compound I benzenesulfonic acid Form C of any one of Embodiments 59 to 61, characterized by an X-ray powder diffractogram substantially similar to FIG. 6.

Figure 7:
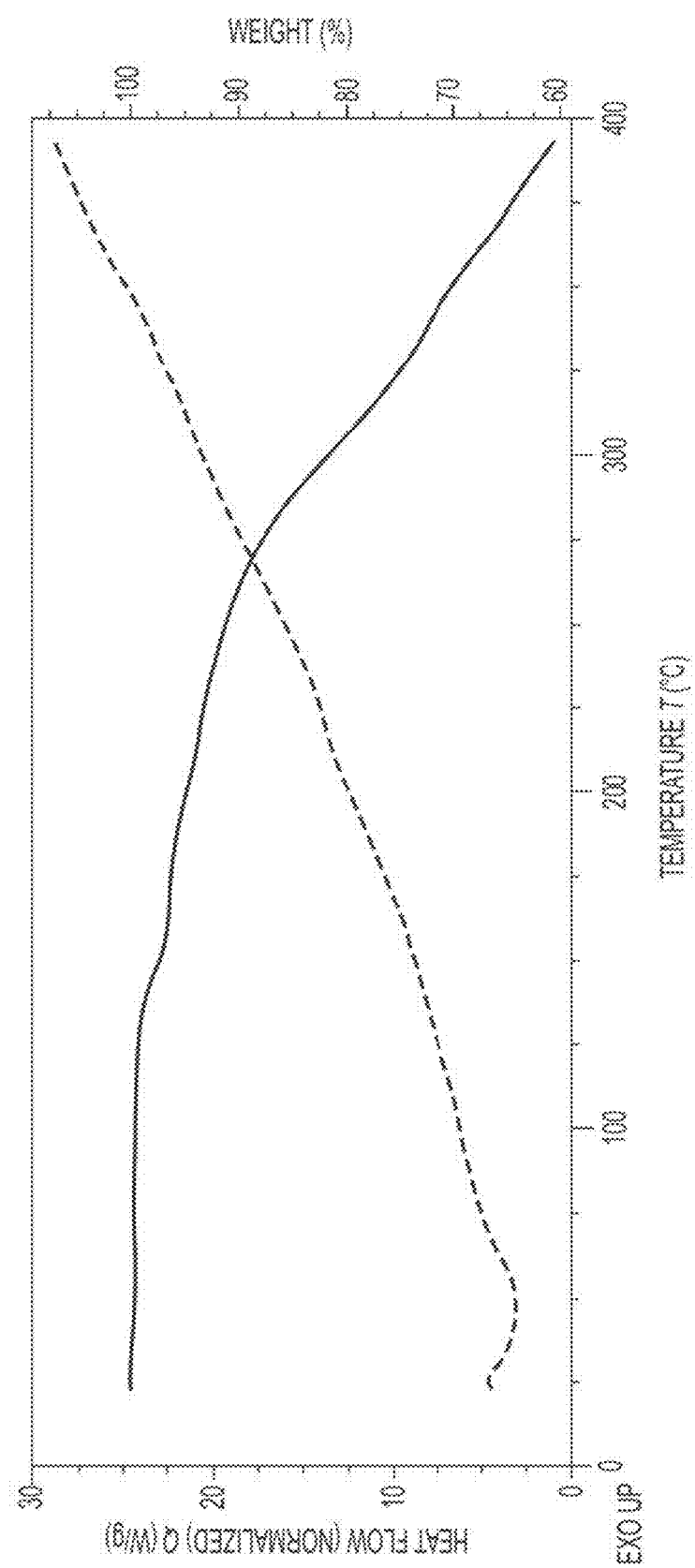
FIG. 7 provides a TGA/DSC analysis of Compound I benzenesulfonic acid Form C.

76. The Compound I benzenesulfonic acid Form C of any one of Embodiments 59 to 75, characterized by TGA/DSC data substantially similar to FIG. 7.

77. The Compound I benzenesulfonic acid Form C of any one of Embodiments 59 to 76, prepared by a process comprising bead milling Compound I free acid with benzenesulfonic acid in isopropyl acetate and drying under vacuum to provide Compound I benzenesulfonic acid crystalline Form C.

78. A pharmaceutical composition comprising the Compound I benzenesulfonic acid Form C of any one of Embodiments 59 to 77, and optionally further comprising one or more additional CFTR modulating compounds.

79. The pharmaceutical composition of Embodiment 78, wherein the one or more additional CFTR modulating compounds are
 a. (a) Compound III or Compound III-d; or
 b. (i) Compound II, and (ii) Compound III or Compound III-d.

80. The Compound I benzenesulfonic acid Form C of any one of Embodiments 59 to 77 or the pharmaceutical composition of Embodiment 78 or Embodiment 79 for use in the treatment of cystic fibrosis.

81. Use of the Compound I benzenesulfonic acid Form C of any one of Embodiments 59 to 77 or the compositions of Embodiment 78 or Embodiment 79 in the manufacture of a medicament for the treatment of cystic fibrosis.

82. A method of treating cystic fibrosis comprising administering the Compound I benzenesulfonic acid Form C of any one of Embodiments 59 to 77 or the pharmaceutical composition of Embodiment 78 or Embodiment 79 to a subject in need thereof.

83. The compound for use of Embodiment 80, the use of Embodiment 81, or the method of Embodiment 82, wherein the Compound I benzenesulfonic acid Form C of any one of Embodiments 59 to 77 is administered in combination with at least one additional CFTR modulating compound.

Figure 9:
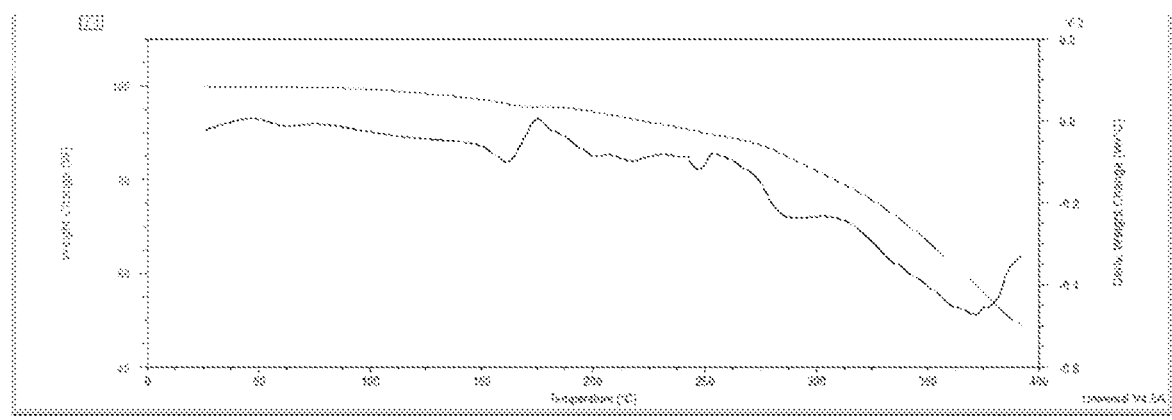
FIG. 9 provides a TGA analysis of Compound Ip-toluenesulfonic acid Form A.
Figure 10:
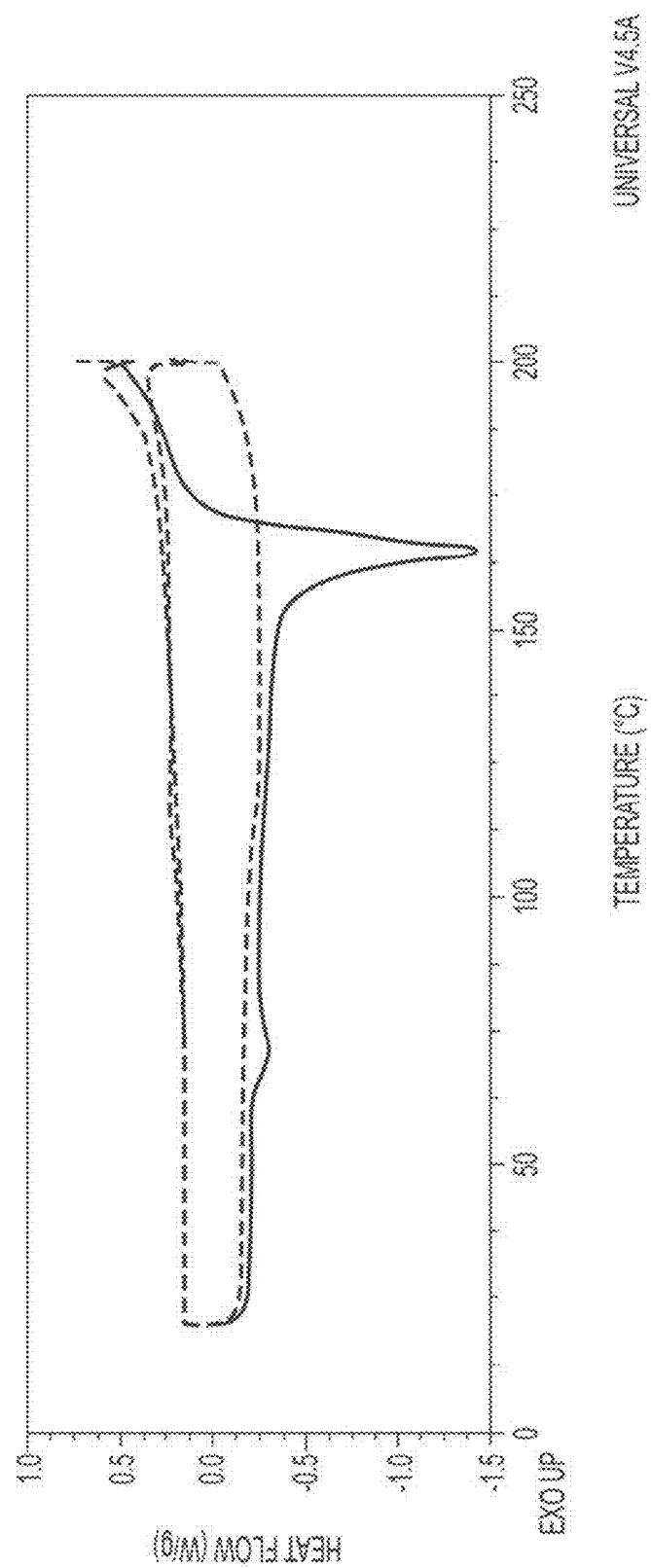
FIG. 10 provides an DSC analysis of crystalline Compound I p-toluenesulfonic acid Form A.

84. The compound, use, or method of Embodiment 83, wherein the Compound I benzenesulfonic acid Form C of any one of Embodiments 59 to 77 is administered in combination with
   a. (a) Compound III or Compound III-d;
   b. (i) Compound II and (ii) Compound III; or
   c. (i) Compound II and (ii) Compound III-d.
85. The composition of Embodiment 79 or the compound, use, or method of Embodiment 84, wherein Compound II and/or Compound III are in the form of a solid dispersion.
86 A method of preparing Compound I benzenesulfonic acid Form C of any one of Embodiments 59 to 77, comprising bead milling Compound I free acid with benzenesulfonic acid in isopropyl acetate and drying under vacuum to provide Compound I benzenesulfonic acid crystalline Form C.
87. Compound I as substantially crystalline p-toluenesulfonic acid Form A (i.e., wherein less than 15% of Compound I is in amorphous form, wherein less than 10% of Compound I is in amorphous form, wherein less than 5% of Compound I is in amorphous form).
88 The Compound I of Embodiment 1, wherein Compound I is 100% crystalline p-toluenesulfonic acid Form A.
89. Substantially pure Compound I p-toluenesulfonic acid Form A.
90 The Compound I p-toluenesulfonic acid Form A of any one of Embodiments 87 to 89, characterized by an X-ray powder diffractogram having a signal at 3.8±0.2 degrees theta, 8.4±0.2 degrees theta, and/or 10.7±0.2 degrees theta.
91. The Compound I p-toluenesulfonic acid Form A of any one of Embodiments 87 to 89, characterized by an X-ray powder diffractogram having a signal at two or more of 3.8±0.2 degrees theta, 8.4±0.2 degrees theta, and 10.7±0.2 degrees theta.
92. The Compound Ip-toluenesulfonic acid Form A of any one of Embodiments 87 to 89, characterized by an X-ray powder diffractogram having a signal at 3.8±0.2 degrees theta, 8.4±0.2 degrees theta, and 10.7±0.2 degrees theta.
93. The Compound I p-toluenesulfonic acid Form A of any one of Embodiments 87 to 89, characterized by an X-ray powder diffractogram having (a) a signal at one or more of 3.8±0.2 degrees theta, 8.4±0.2 degrees theta, and 10.7±0.2 degrees theta; and (b) a signal at one or more of 9.4±0.2 degrees theta, 18.9±0.2 degrees theta, 19.8±0.2 degrees theta, and 20.1±0.2 degrees theta.
94. The Compound I p-toluenesulfonic acid Form A of any one of Embodiments 87 to 89, characterized by an X-ray powder diffractogram having (a) a signal at two or more of 3.8±0.2 degrees theta, 8.4±0.2 degrees theta, and 10.7±0.2 degrees theta; and (b) a signal at one or more of 9.4±0.2 degrees theta, 18.9±0.2 degrees theta, 19.8±0.2 degrees theta, and 20.1±0.2 degrees theta.
95. The Compound I p-toluenesulfonic acid Form A of any one of Embodiments 87 to 89, characterized by an X-ray powder diffractogram having (a) signals at 3.8±0.2 degrees theta, 8.4±0.2 degrees theta, and 10.7±0.2 degrees theta; and (b) a signal at one or more of 9.4±0.2 degrees theta, 18.9±0.2 degrees theta, 19.8±0.2 degrees theta, and 20.1±0.2 degrees theta.
96. The Compound I p-toluenesulfonic acid Form A of any one of Embodiments 87 to 89, is characterized by an X-ray powder diffractogram having (a) signals at 3.8±0.2 degrees theta, 8.4±0.2 degrees theta, and 10.7±0.2 degrees theta; and (b) a signal at one or more of 9.4±0.2 degrees theta, 18.9±0.2 degrees theta, 19.8±0.2 degrees theta, and 20.1±0.2 degrees theta.
97. The Compound I p-toluenesulfonic acid Form A of any one of Embodiments 87 to 89, characterized by an X-ray powder diffractogram having (a) signals at 3.8±0.2 degrees theta, 8.4±0.2 degrees theta, and 10.7±0.2 degrees theta; and (b) a signal at two or more of 9.4±0.2 degrees theta, 18.9±0.2 degrees theta, 19.8±0.2 degrees theta, and 20.1±0.2 degrees theta.
98. The Compound I p-toluenesulfonic acid Form A of any one of Embodiments 87 to 89, characterized by an X-ray powder diffractogram having (a) signals at 3.8±0.2 degrees theta, 8.4±0.2 degrees theta, and 10.7±0.2 degrees theta; and (b) a signal at three or more of 9.4±0.2 degrees theta, 18.9±0.2 degrees theta, 19.8±0.2 degrees theta, and 20.1±0.2 degrees theta.
99. The Compound I p-toluenesulfonic acid Form A of any one of Embodiments 87 to 89, characterized by an X-ray powder diffractogram having signals at 3.8±0.2 degrees theta, 8.4±0.2 degrees theta, 9.4±0.2 degrees theta, 10.7±0.2 degrees theta, 18.9±0.2 degrees theta, 19.8±0.2 degrees theta, and 20.1±0.2 degrees theta.
100. The Compound I p-toluenesulfonic acid Form A of any one of Embodiments 87 to 89, characterized by an X-ray powder diffractogram substantially similar to FIG. 8.
101. The Compound I p-toluenesulfonic acid Form A of any one of Embodiments 87 to 100, characterized by TGA data substantially similar to FIG. 9.
102. The Compound I p-toluenesulfonic acid Form A of any one of Embodiments 87 to 101, characterized by a DSC analysis substantially similar to FIG. 10.
103. The Compound I p-toluenesulfonic acid Form A of any one of Embodiments 87 to 102, prepared by a process comprising bead milling Compound I free acid with p-toluenesulfonic acid in isopropyl acetate and drying under vacuum to provide Compound I p-toluenesulfonic acid crystalline Form A.
104. A pharmaceutical composition comprising the Compound I p-toluenesulfonic acid Form A of any one of Embodiments 87 to 103, and optionally further comprising one or more additional CFTR modulating compounds.
105. The pharmaceutical composition of Embodiment 104, wherein the one or more additional CFTR modulating compounds are
   a. (a) Compound III or Compound III-d; or
   b. (i) Compound II, and (ii) Compound III or Compound III-d.
106. The Compound Ip-toluenesulfonic acid Form A of any one of Embodiments 87 to 103 or the pharmaceutical composition of Embodiment 104 or Embodiment 105 for use in the treatment of cystic fibrosis.
107. Use of the Compound Ip-toluenesulfonic acid Form A of any one of Embodiments 87 to 103 or the compositions of Embodiment 104 or Embodiment 105 in the manufacture of a medicament for the treatment of cystic fibrosis.
108. A method of treating cystic fibrosis comprising administering the Compound Ip-toluenesulfonic acid Form A of any one of Embodiments 87 to 103 or the pharmaceutical composition of Embodiment 104 or Embodiment 105 to a subject in need thereof.
109. The compound for use of Embodiment 106, the use of Embodiment 107, or the method of Embodiment 108, wherein the Compound Ip-toluenesulfonic acid Form A of any one of Embodiments 87 to 103 is administered in combination with at least one additional CFTR modulating compound.

Figure 12:
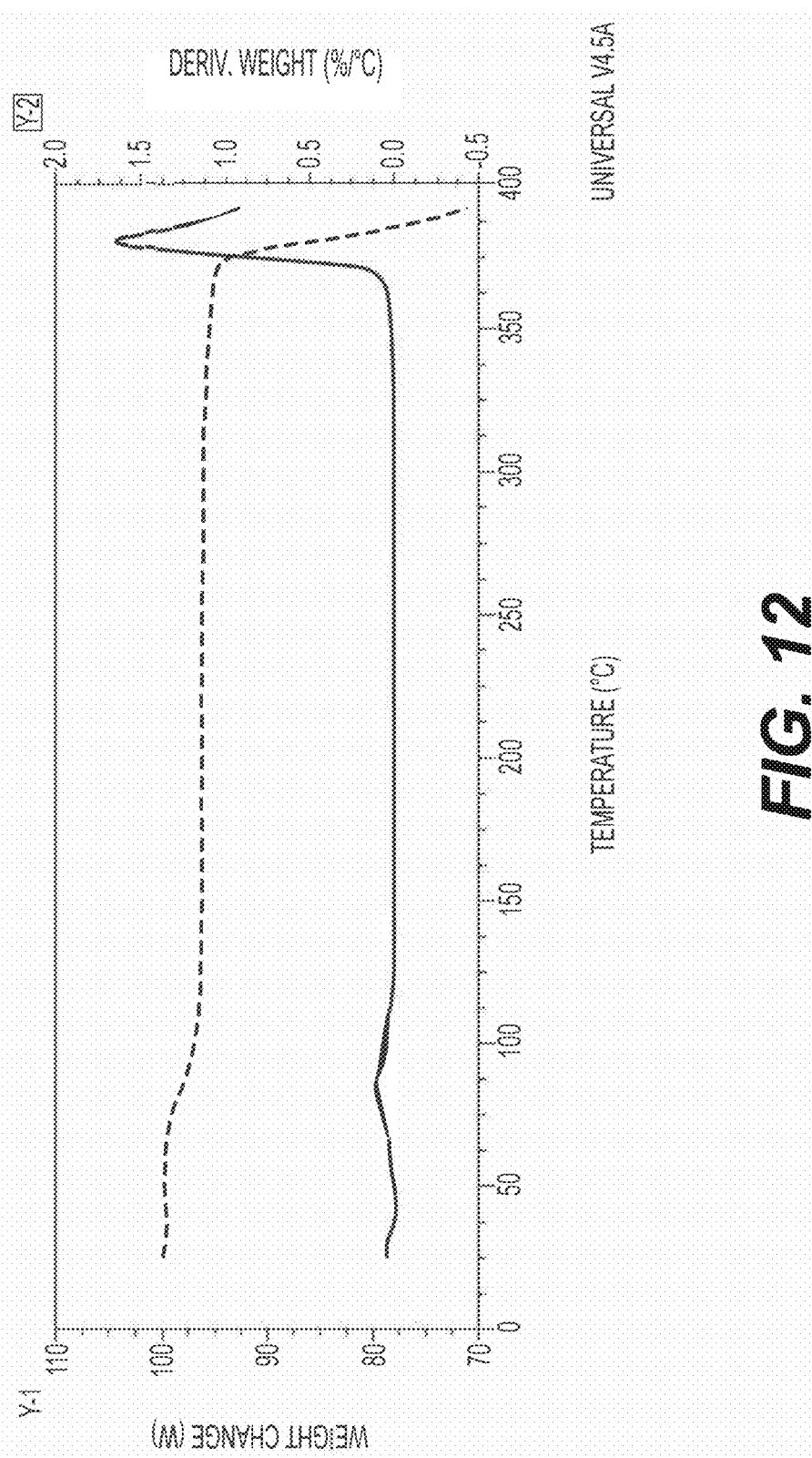
FIG. 12 provides a TGA analysis of Compound I magnesium salt Form A.
Figure 13:
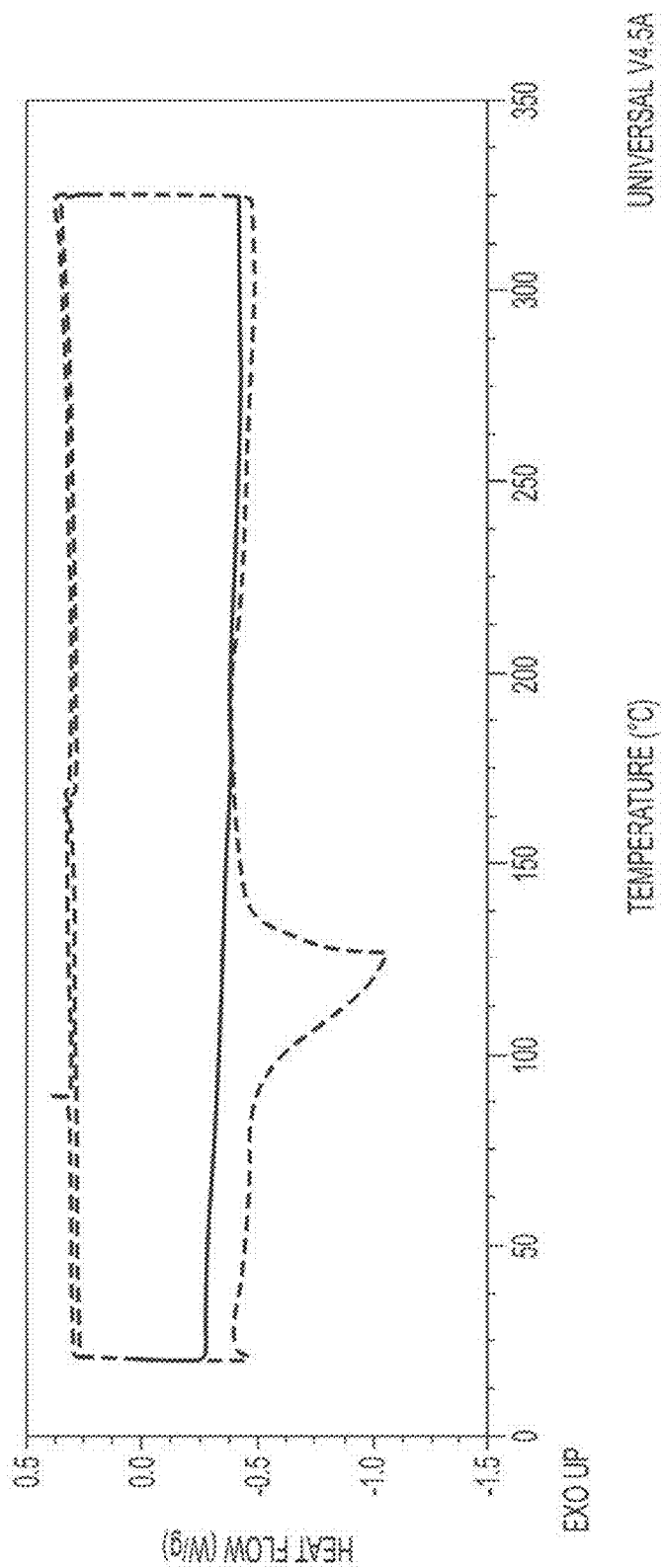
FIG. 13 provides an DSC analysis of crystalline Compound I magnesium salt Form A.

110. The compound, use, or method of Embodiment 109, wherein the Compound I benzenesulfonic acid Form A of any one of Embodiments 87 to 103 is administered in combination with
   a. (a) Compound III or Compound III-d;
   b. (i) Compound II and (ii) Compound III; or
   c. (i) Compound II and (ii) Compound III-d.
111. The composition of Embodiment 105 or the compound, use, or method of Embodiment 110, wherein Compound II and/or Compound III are in the form of a solid dispersion.
112. A method of preparing Compound I p-toluenesulfonic acid Form A of any one of
Embodiments 87 to 103, comprising bead milling Compound I free acid with p-toluenesulfonic acid in isopropyl acetate and drying under vacuum to provide Compound I p-toluenesulfonic acid crystalline Form A.
113. Compound I as substantially crystalline magnesium salt Form A (i.e., wherein less than 15% of Compound I is in amorphous form, wherein less than 10% of Compound I is in amorphous form, wherein less than 5% of Compound I is in amorphous form).
114. The Compound I of Embodiment 1, wherein Compound I is 100% crystalline magnesium salt Form A.
115. Substantially pure Compound I magnesium salt Form A.
116. The Compound I magnesium salt Form A of any one of Embodiments 113 to 115, characterized by an X-ray powder diffractogram having a signal at 4.3±0.2 degrees theta, 9.9±0.2 degrees theta, and/or 14.6±0.2 degrees theta.
117. The Compound I magnesium salt Form A of any one of Embodiments 113 to 115, characterized by an X-ray powder diffractogram having a signal at two or more of 4.3±0.2 degrees theta, 9.9±0.2 degrees theta, and 14.6±0.2 degrees theta.
118. The Compound I magnesium salt Form A of any one of Embodiments 113 to 115, characterized by an X-ray powder diffractogram having a signal at 4.3±0.2 degrees theta, 9.9±0.2 degrees theta, and 14.6±0.2 degrees theta.
119. The Compound I magnesium salt Form A of any one of Embodiments 113 to 115, characterized by an X-ray powder diffractogram having (a) a signal at one or more of 4.3±0.2 degrees theta, 9.9±0.2 degrees theta, and 14.6±0.2 degrees theta; and (b) a signal at one or more of 10.4±0.2 degrees theta, 14.3±0.2 degrees theta, 18.1±0.2 degrees theta, 19.8±0.2 degrees theta, and 20.1±0.2 degrees theta.
120. The Compound I magnesium salt Form A of any one of Embodiments 113 to 115, characterized by an X-ray powder diffractogram having (a) a signal at two or more of 4.3±0.2 degrees theta, 9.9±0.2 degrees theta, and 14.6±0.2 degrees theta; and (b) a signal at one or more of 10.4±0.2 degrees theta, 14.3±0.2 degrees theta, 18.1±0.2 degrees theta, 19.8±0.2 degrees theta, and 20.1±0.2 degrees theta.
121. The Compound I magnesium salt Form A of any one of Embodiments 113 to 115, characterized by an X-ray powder diffractogram having (a) signals at 4.3±0.2 degrees theta, 9.9±0.2 degrees theta, and 14.6±0.2 degrees theta; and (b) a signal at one or more of 10.4±0.2 degrees theta, 14.3±0.2 degrees theta, 18.1±0.2 degrees theta, 19.8±0.2 degrees theta, and 20.1±0.2 degrees theta.
122. The Compound I magnesium salt Form A of any one of Embodiments 113 to 115, is characterized by an X-ray powder diffractogram having (a) signals at 4.3±0.2 degrees theta, 9.9±0.2 degrees theta, and 14.6±0.2 degrees theta; and (b) a signal at one or more of 10.4±0.2 degrees theta, 14.3±0.2 degrees theta, 18.1±0.2 degrees theta, 19.8±0.2 degrees theta, and 20.1±0.2 degrees theta.
123. The Compound I magnesium salt Form A of any one of Embodiments 113 to 115, characterized by an X-ray powder diffractogram having (a) signals at 4.3±0.2 degrees theta, 9.9±0.2 degrees theta, and 14.6±0.2 degrees theta; and (b) a signal at two or more of 10.4±0.2 degrees theta, 14.3±0.2 degrees theta, 18.1±0.2 degrees theta, 19.8±0.2 degrees theta, and 20.1±0.2 degrees theta.
124. The Compound I magnesium salt Form A of any one of Embodiments 113 to 115, characterized by an X-ray powder diffractogram having (a) signals at 4.3±0.2 degrees theta, 9.9±0.2 degrees theta, and 14.6±0.2 degrees theta; and (b) a signal at three or more of 10.4±0.2 degrees theta, 14.3±0.2 degrees theta, 18.1±0.2 degrees theta, 19.8±0.2 degrees theta, and 20.1±0.2 degrees theta.
125. The Compound I magnesium salt Form A of any one of Embodiments 113 to 115, characterized by an X-ray powder diffractogram having (a) signals at 4.3±0.2 degrees theta, 9.9±0.2 degrees theta, and 14.6±0.2 degrees theta; and (b) a signal at four or more of 10.4±0.2 degrees theta, 14.3±0.2 degrees theta, 18.1±0.2 degrees theta, 19.8±0.2 degrees theta, and 20.1±0.2 degrees theta.
126. The Compound I magnesium salt Form A of any one of Embodiments 113 to 115, characterized by an X-ray powder diffractogram having signals at 4.3±0.2 degrees theta, 9.9±0.2 degrees theta, 10.4±0.2 degrees theta, 14.3±0.2 degrees theta, 14.6±0.2 degrees theta, 18.1±0.2 degrees theta, 19.8±0.2 degrees theta, and 20.1±0.2 degrees theta.
127. The Compound I magnesium salt Form A of any one of Embodiments 113 to 115, characterized by an X-ray powder diffractogram substantially similar to FIG. 11.
128. The Compound I magnesium salt Form A of any one of Embodiments 113 to 127, characterized by TGA data substantially similar to FIG. 12.
129. The Compound I magnesium salt Form A of any one of Embodiments 113 to 128, characterized by a DSC analysis substantially similar to FIG. 13.
130. The Compound I magnesium salt Form A of any one of Embodiments 113 to 129, prepared by a process comprising slurrying Compound I free acid with magnesium chloride and sodium hydroxide in a mixture of 1,4-dioxane and water, freeze drying the mixture, adding acetone and water, temperature cycling the mixture between ambient temperature and 40° C., filtering the solids, and drying under vacuum to provide crystalline Compound I magnesium salt Form A.
131. A pharmaceutical composition comprising the Compound I magnesium salt Form A of any one of Embodiments 113 to 130, and optionally further comprising one or more additional CFTR modulating compounds.

132. The pharmaceutical composition of Embodiment 131, wherein the one or more additional CFTR modulating compounds are
   a. (a) Compound III or Compound III-d; or
   b. (i) Compound II, and (ii) Compound III or Compound III-d.
133. The Compound I magnesium salt Form A of any one of Embodiments 113 to 130 or the pharmaceutical composition of Embodiment 131 or Embodiment 132 for use in the treatment of cystic fibrosis.
134. Use of the Compound I magnesium salt Form A of any one of Embodiments 113 to 130 or the compositions of Embodiment 131 or Embodiment 132 in the manufacture of a medicament for the treatment of cystic fibrosis.
135. A method of treating cystic fibrosis comprising administering the Compound I magnesium salt Form A of any one of Embodiments 113 to 130 or the pharmaceutical composition of Embodiment 131 or Embodiment 132 to a subject in need thereof.
136. The compound for use of Embodiment 133, the use of Embodiment 134, or the method of Embodiment 135, wherein the Compound I magnesium salt Form A of any one of Embodiments 113 to 130 is administered in combination with at least one additional CFTR modulating compound.
137. The compound, use, or method of Embodiment 136, wherein the Compound I magnesium salt Form A of any one of Embodiments 113 to 130 is administered in combination with
   a. (a) Compound III or Compound III-d;
   b. (i) Compound II and (ii) Compound III; or
   c. (i) Compound II and (ii) Compound III-d.
138. The composition of Embodiment 132 or the compound, use, or method of Embodiment 137, wherein Compound II and/or Compound III are in the form of a solid dispersion.
139. A method of preparing Compound I magnesium salt Form A of any one of Embodiments 113 to 130, comprising slurrying Compound I free acid with magnesium chloride and sodium hydroxide in a mixture of 1,4-dioxane and water, freeze drying the mixture, adding acetone and water, temperature cycling the mixture between ambient temperature and 40° C., filtering the solids, and drying under vacuum to provide crystalline Compound I magnesium salt Form A.

Methods of Preparing Compounds and Forms
General Experimental Procedures

The definitions of certain abbreviations for the Examples below are summarized below:

| Abbreviation | Chemical Name |
|---|---|
| ACN | acetonitrile |
| Boc₂O | di-tert-butyl dicarbonate; Boc anhydride |
| BuOH | butanol |
| CaCl₂ | calcium chloride |
| Ca(OCH₃)₂; Ca(OMe)₂ | calcium methoxide |
| CuI | copper iodide |
| DABCO | 1,4-diazabicyclo[2.2.2]octane |
| DCM | dichloromethane; methylene chloride |
| DMF | N,N-dimethylformamide |
| DMSO | dimethyl sulfoxide |
| EtOH | ethanol |
| H2O | water |
| IPA | isopropanol |
| IPAc | isopropyl acetate |

-continued

| Abbreviation | Chemical Name |
|---|---|
| K₂CO₃ | potassium carbonate |
| KOH | potassium hydroxide |
| MeOH | methanol |
| MgCl₂ | magnesium chloride |
| NaOH | sodium hydroxide |
| Na(OCH₃) | sodium methoxide |
| NMP | N-methylpyrrolidone |
| NPA | N-propyl alcohol |
| Raney Ni | Raney Nickel |

Compounds II, III, III-d, and IV can be prepared by any suitable method in the art, for example, PCT Publication Nos. WO 2011/133751, WO 2011/133951, WO 2015/160787 and U.S. Pat. No. 8,865,902.

Solid State NMR experimental (applies to all crystalline forms): Bruker-Biospin 400 MHz wide-bore spectrometer equipped with Bruker-Biospin 4 mm HFX probe was used. Samples were packed into 4 mm rotors and spun under Magic Angle Spinning (MAS) condition with typical spinning speed of 12.5 kHz. The proton relaxation time was estimated from $^1$H MAS $T_1$ saturation recovery relaxation experiment and used to set up proper recycle delay of the $^{13}$C cross-polarization (CP) MAS experiment. The CP contact time of CPMAS experiments was set to 2 ms. A CP proton pulse with linear ramp (from 50% to 100%) was employed. All spectra were externally referenced by adjusting the magnetic field to set carbon resonance of adamantane to 29.5 ppm. TPPM15 proton decoupling sequence was used with the field strength of approximately 100 kHz.

EXAMPLES

Example 1: Synthesis of (14S)-8-[3-(2-{dispiro [2.0.2.1]heptan-7-yl}ethoxy)-1H-pyrazol-1-yl]-12, 12-dimethyl-2λ6-thia-3,9,11,18,23-pentaazatetracyclo [17.3.1.1¹¹,¹⁴.0⁵,¹⁰]tetracosa-1(22),5,7,9,19 (23),20-hexaene-2,2,4-trione (Compound I)

Reagents and starting materials were obtained by commercial sources unless otherwise stated and were used without purification.

Proton and carbon NMR spectra (as applies to Example 1) were acquired on either of a Bruker Biospin DRX 400 MHZ FTNMR spectrometer operating at a $^1$H and $^{13}$C resonant frequency of 400 and 100 MHz respectively, or on a 300 MHz NMR spectrometer. One dimensional proton and carbon spectra were acquired using a broadband observe (BBFO) probe with 20 Hz sample rotation at 0.1834 and 0.9083 Hz/Pt digital resolution respectively. All proton and carbon spectra were acquired with temperature control at 30° C. using standard, previously published pulse sequences and routine processing parameters.

Part A: Synthesis of 2-Chloro-6-[3-(2-dispiro [2.0.2.1]heptan-7-ylethoxy)pyrazol-1-yl]pyridine-3-carboxylic acid

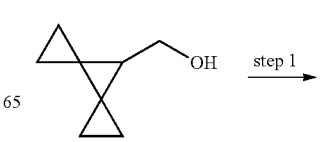

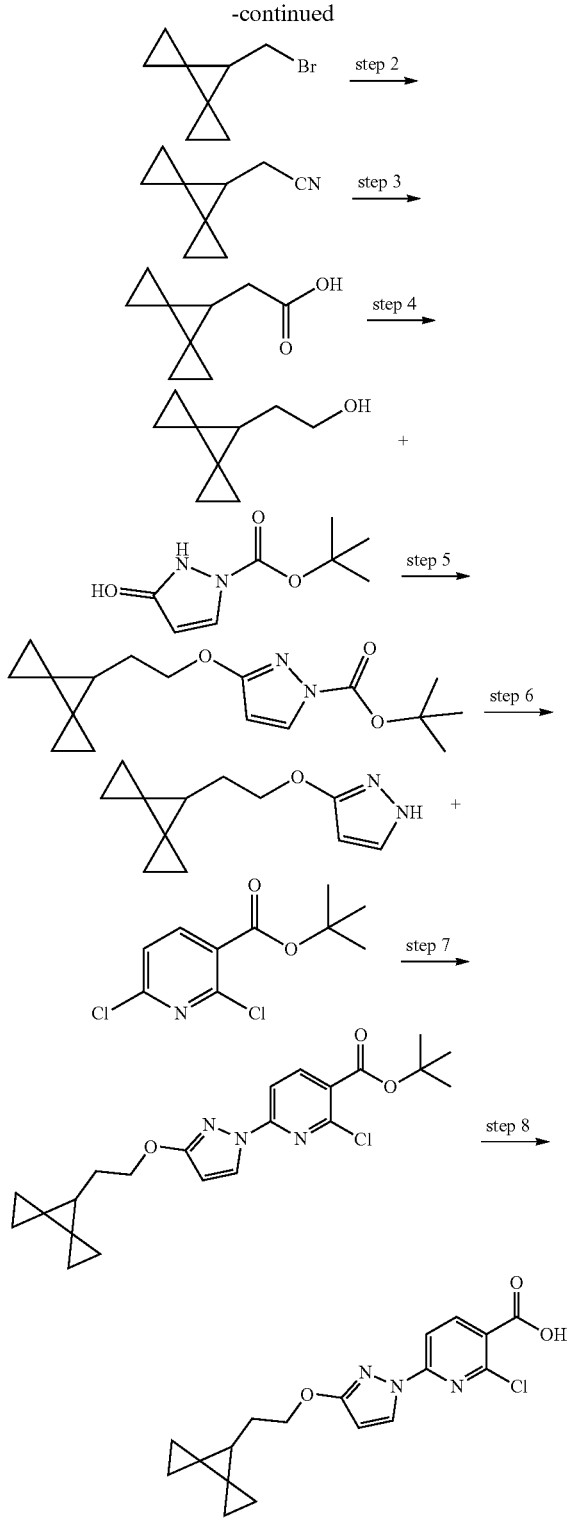

J-Kem temperature probe and a nitrogen inlet/outlet. The vessel was charged under a nitrogen atmosphere with triphenylphosphine (102.7 mL, 443.2 mmol) and dichloromethane (1 L) which provided a clear colorless solution. Stirring was commenced and the cooling bath was charged with acetone. Dry ice was added in portions to the cooling bath until a pot temperature of −15° C. was obtained. The addition funnel was charged with a solution of bromine (22.82 mL, 443.0 mmol) in dichloromethane (220 mL, 10 mL/g) which was subsequently added dropwise over 1 h. Dry ice was added in portions to the cooling bath during the addition to maintain the pot temperature at −15° C. After the addition of bromine was completed, the pale yellow suspension was continued to stir at −15° C. for 15 min at which point the suspension was cooled to −30° C. The addition funnel was charged with a solution of dispiro[2.0.2.1]heptan-7-yl methanol (50 g, 402.6 mmol), pyridine (35.82 mL, 442.9 mmol) and dichloromethane (250 mL, 5 mL/g). The clear pale yellow solution was then added dropwise over 1.5 h maintaining the pot temperature at −30° C. The resulting clear light yellow reaction mixture was allowed to gradually warm to a pot temperature of −5° C. and then continued to stir at −5° C. for 1 h. The reaction mixture then was poured into hexane (2000 mL) which resulted in the formation of a precipitate. The suspension was stirred at room temperature for 30 min and then filtered through a glass frit Buchner funnel with a 20 mm layer of celite. The clear filtrate was concentrated under reduced pressure (water bath temperature at 20° C.) to provide a yellow oil with some precipitate present. The oil was diluted with some hexane, allowed to stand at room temperature for 15 min and then filtered through a glass frit Buchner funnel with a 20 mm layer of celite. The clear filtrate was concentrated under reduced pressure (water bath temperature at 20° C.) to provide 7-(bromomethyl)dispiro[2.0.2.1]heptane (70 g, 93%) as a clear yellow oil. $^1$H NMR (400 MHZ, Chloroform-d) δ 3.49 (d, J=7.5 Hz, 2H), 1.90 (t, J=7.5 Hz, 1H), 1.06-0.84 (m, 4H), 0.71 (ddd, J=9.1, 5.1, 4.0 Hz, 2H), 0.54 (dddd, J=8.6, 4.8, 3.8, 1.0 Hz, 2H).

Step 2: 2-Dispiro[2.0.2.1]heptan-7-ylacetonitrile

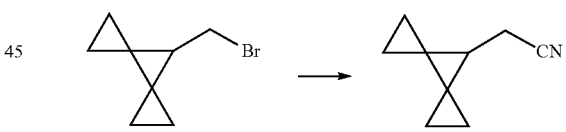

A 1000 mL, 3-neck round bottom flask was fitted with a mechanical stirrer, a cooling bath used as secondary containment, a J-Kem temperature probe and a nitrogen inlet/outlet. The vessel was charged under a nitrogen atmosphere with 7-(bromomethyl)dispiro[2.0.2.1]heptane (35 g, 187.1 mmol) and dimethyl sulfoxide (245 mL) which provided a clear amber solution. Stirring was commenced and the pot temperature was recorded at 19° C. The vessel was then charged with sodium cyanide (11.46 g, 233.8 mmol) added as a solid in one portion which resulted in a dark solution and a gradual exotherm to 49° C. over 15 min. After a few min the pot temperature began to decrease and the mixture was continued to stir at room temperature overnight (about 15 h). The dark reaction mixture was quenched with ice cold saturated sodium carbonate solution (500 mL) and then transferred to a separatory funnel and partitioned with diethyl ether (500 mL). The organic was removed and the residual aqueous was extracted with diethyl ether (2×250

Step 1: 7-(Bromomethyl)dispiro[2.0.2.1]heptane

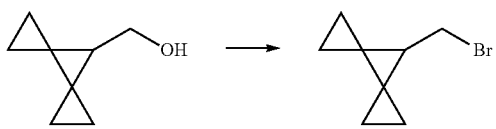

A 1000 mL, 3-neck round bottom flask was fitted with a mechanical stirrer, a cooling bath, an addition funnel, a mL). The combined organics were washed with water (500 mL), dried over sodium sulfate (200 g) and then filtered through a glass frit Buchner funnel. The clear amber filtrate was concentrated under reduced pressure (water bath temperature 20° C.) to provide 2-dispiro[2.0.2.1]heptan-7-ylacetonitrile (21 g, 84%) as a clear dark amber oil. ¹H NMR (400 MHZ, Chloroform-d) δ 2.42 (d, J=6.6 Hz, 2H), 1.69 (t, J=6.6 Hz, 1H), 1.02-0.88 (m, 4H), 0.79-0.70 (m, 2H), 0.66-0.55 (m, 2H).

Step 3: 2-Dispiro[2.0.2.1]heptan-7-ylacetic acid

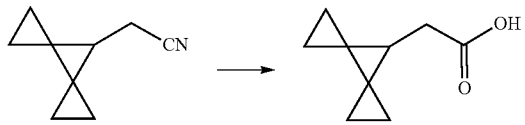

To a solution of 2-dispiro[2.0.2.1]heptan-7-ylacetonitrile (2.1 g, 14.19 mmol) in EtOH (32 mL) was added sodium hydroxide (5.12 g, 128.0 mmol) followed by water (13 mL) and the resulting solution was stirred and heated to 70° C. overnight. The mixture was then cooled to room temperature, diluted with water and extracted with diethyl ether. The aqueous phase was adjusted to pH=1 by the addition of 6 N hydrochloric acid (resulting in a cloudy precipitate) and extracted with diethyl ether (3×). The organic phases were dried (magnesium sulfate), filtered and concentrated giving 2-dispiro[2.0.2.1]heptan-7-ylacetic acid (2.19 g, 99% yield, 98% purity) as an orange solid which was used in the next step without further purification. 1H NMR (400 MHZ, Chloroform-d) δ 2.44 (d, J=6.9 Hz, 2H), 1.67 (t, J=6.9 Hz, 1H), 0.91 (ddd, J=9.0, 5.2, 3.9 Hz, 2H), 0.81 (dddd, J=8.9, 5.2, 3.9, 0.5 Hz, 2H), 0.69 (ddd, J=8.9, 5.2, 3.9 Hz, 2H), 0.56-0.44 (m, 2H).

Step 4: 2-Dispiro[2.0.2.1]heptan-7-ylethanol

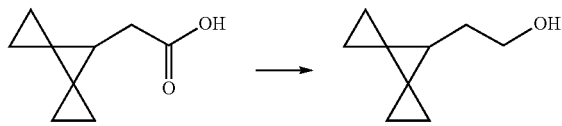

To lithium aluminum hydride (827.4 mg, 902.3 µL, 21.80 mmol) dissolved in tetrahydrofuran (33.71 mL) cooled in an ice/water bath was added 2-dispiro[2.0.2.1]heptan-7-ylacetic acid (2.552 g, 16.77 mmol) in tetrahydrofuran (7.470 mL) dropwise over 15 min keeping the reaction temperature <20° C. The mixture was allowed to stir a total of 18 h, gradually warming to ambient temperature. The mixture was cooled with an ice/water bath and sequentially quenched with slow addition of water (838.4 mg, 838.4 µL, 46.54 mmol), followed by sodium hydroxide (1.006 mL of 5 M, 5.031 mmol), then water (2.493 g, 2.493 mL, 138.4 mmol) affording a white, granular slurry which was filtered over celite. Washed the filtered solid with diethyl ether. The filtrate was concentrated in vacuo at ~300 mbar and 30° C. water bath. Diluted the residue with diethyl ether, dried (magnesium sulfate), filtered and concentrated in vacuo at ~300 mbar and 30° C. water bath followed by ~30 s under vacuum to give 2-dispiro[2.0.2.1]heptan-7-ylethanol (2.318 g, 100%) which was used directly in the ensuing step without further purification. ¹H NMR (400 MHZ, Chloroform-d) § 3.64 (s, 2H), 1.68 (d, J=6.7 Hz, 2H), 1.39 (s, 1H), 1.31 (s, 1H), 0.82 (d, J=14.0 Hz, 4H), 0.65 (s, 2H), 0.50 (d, J=3.6 Hz, 2H).

Step 5: tert-Butyl 3-(2-dispiro[2.0.2.1]heptan-7-ylethoxy)pyrazole-1-carboxylate

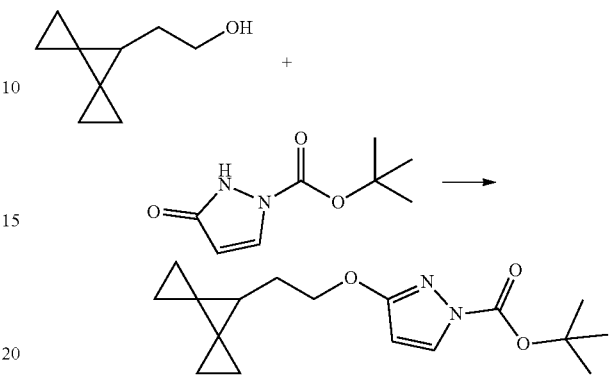

To a solution of tert-butyl 5-oxo-1H-pyrazole-2-carboxylate (2.942 g, 15.97 mmol) and 2-dispiro[2.0.2.1]heptan-7-ylethanol (2.318 g, 16.77 mmol) in tetrahydrofuran (36.78 mL) was added triphenylphosphine (4.399 g, 16.77 mmol). To the mixture was slowly added diisopropyl azodicarboxylate (3.391 g, 3.302 mL, 16.77 mmol) dropwise over 10 min (mild exotherm noted). The reaction mixture was stirred at room temperature for 30 min then at 50° C. for 30 min. The tetrahydrofuran was removed in vacuo. To the crude residue was added toluene (23.54 mL) and the mixture was stirred overnight as a precipitate gradually crystallized. Slurried with Celite then the precipitate was filtered off and washed with toluene (8.705 mL) and again with toluene (8.705 mL). The filtrate was concentrated in vacuo. The crude product was purified by silica gel chromatography using a shallow gradient from 100% hexanes to 100% ethyl acetate giving tert-butyl 3-(2-dispiro[2.0.2.1]heptan-7-ylethoxy) pyrazole-1-carboxylate (3.449 g, 71%). ESI-MS m/z calc. 304.17868, found 305.1 (M+1)⁺; Retention time: 0.82 min (LC Method A).

Step 6: 3-(2-Dispiro[2.0.2.1]heptan-7-ylethoxy)-1H-pyrazole

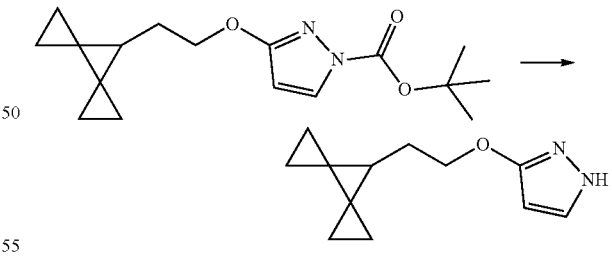

tert-Butyl 3-(2-dispiro[2.0.2.1]heptan-7-ylethoxy) pyrazole-1-carboxylate (5.304 g, 17.43 mmol) was dissolved in dichloromethane (53.04 mL) with trifluoroacetic acid (29.81 g, 20.14 mL, 261.4 mmol) and the reaction was stirred at room temperature for 120 min. The reaction was evaporated and the resulting oil was partitioned between ethyl acetate and a saturated sodium bicarbonate solution and the layers separated. The aqueous portion was extracted two additional times with ethyl acetate, then the organics were combined, washed with brine, dried over sodium sulfate, filtered and evaporated to give an oil, 3-(2-dispiro[2.0.2.1]heptan-7- ylethoxy)-1H-pyrazole (3.56 g, 100%). ESI-MS m/z calc. 204.12627, found 205.1 (M+1)⁺; Retention time: 0.59 min (LC Method A).

Step 7: tert-Butyl 2-chloro-6-[3-(2-dispiro[2.0.2.1] heptan-7-ylethoxy)pyrazol-1-yl]pyridine-3-carboxylate

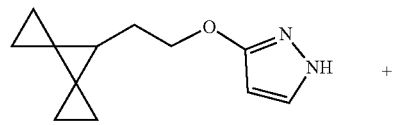

+

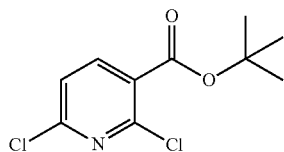

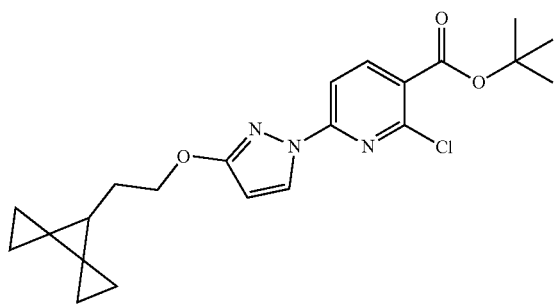

tert-Butyl 2,6-dichloropyridine-3-carboxylate (4.322 g, 17.42 mmol), 3-(2-dispiro[2.0.2.1]heptan-7-ylethoxy)-1H-pyrazole (3.559 g, 17.42 mmol) and potassium carbonate (2.891 g, 20.92 mmol) were combined in anhydrous dimethyl sulfoxide (71.18 mL). 1,4-Diazabicyclo[2.2.2]octane (391.1 mg, 3.487 mmol) was added and the mixture was stirred at room temperature under nitrogen for 16 h. The reaction mixture was diluted with water (136.9 mL) and stirred for 15 min. The resulting white solid was filtered and washed with water. The solid was dissolved in dichloromethane and dried over magnesium sulfate. The mixture was filtered and evaporated to give tert-butyl 2-chloro-6-[3-(2-dispiro[2.0.2.1]heptan-7-ylethoxy) pyrazol-1-yl]pyridine-3-carboxylate (5.69 g, 79%) as a white solid. ¹H NMR (400 MHZ, Chloroform-d) δ 8.35 (d, J=2.9 Hz, 1H), 8.18 (d, J=8.4 Hz, 1H), 7.69 (d, J=8.4 Hz, 1H), 5.94 (d, J=2.9 Hz, 1H), 4.25 (s, 2H), 1.90 (d, J=6.8 Hz, 2H), 1.62 (s, 9H), 1.49 (t, J=6.6 Hz, 1H), 0.85 (d, J=1.5 Hz, 4H), 0.65 (d, J=1.5 Hz, 2H), 0.52 (d, J=1.1 Hz, 2H). ESI-MS m/z calc. 415.16626, found 360.0 (M-tBu)+; Retention time: 2.09 min (LC Method B).

Step 8: 2-Chloro-6-[3-(2-dispiro[2.0.2.1]heptan-7-ylethoxy) pyrazol-1-yl]pyridine-3-carboxylic acid

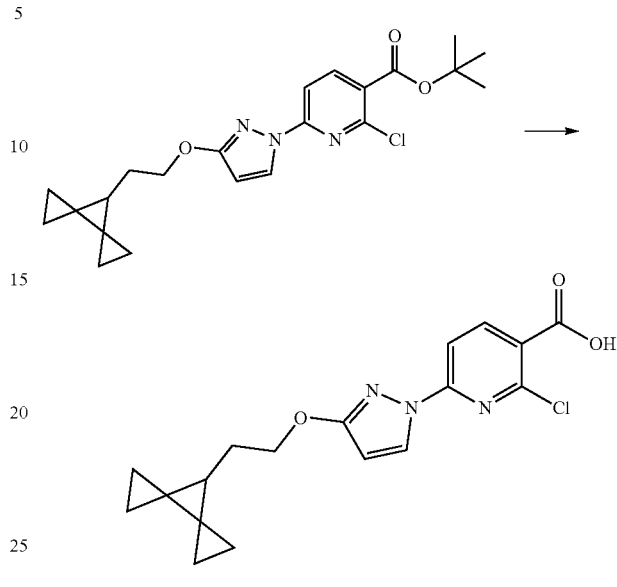

tert-Butyl 2-chloro-6-[3-(2-dispiro[2.0.2.1]heptan-7-ylethoxy) pyrazol-1-yl]pyridine-3-carboxylate (5.85 g, 14.07 mmol) was dissolved in dichloromethane (58.5 mL) with trifluoroacetic acid (16.26 mL, 211.1 mmol) and the reaction was stirred at room temperature for 16 h. The reaction was evaporated and to the resulting solid was added ether and then removed the ether under reduced pressure. This evaporation from ether was repeated twice more resulting in a white solid, 2-chloro-6-[3-(2-dispiro[2.0.2.1]heptan-7-ylethoxy) pyrazol-1-yl]pyridine-3-carboxylic acid (5.06 g, 100%). 1H NMR (400 MHZ, Chloroform-d) δ 8.41 (d, J=8.5 Hz, 1H), 8.37 (d, J=2.9 Hz, 1H), 7.75 (d, J=8.5 Hz, 1H), 5.97 (d, J=2.9 Hz, 1H), 4.27 (s, 2H), 1.91 (d, J=6.7 Hz, 2H), 1.50 (s, 1H), 0.85 (d, J=1.5 Hz, 4H), 0.71-0.62 (m, 2H), 0.52 (d, J=1.1 Hz, 2H). ESI-MS m/z calc. 359.10367, found 360.2 (M+1)⁺; Retention time: 2.16 min (LC Method B).

Part B: Synthesis of tert-Butyl (4S)-2,2-dimethyl-4-[3-[(6-sulfamoyl-2-pyridyl)amino]propyl]pyrrolidine-1-carboxylate

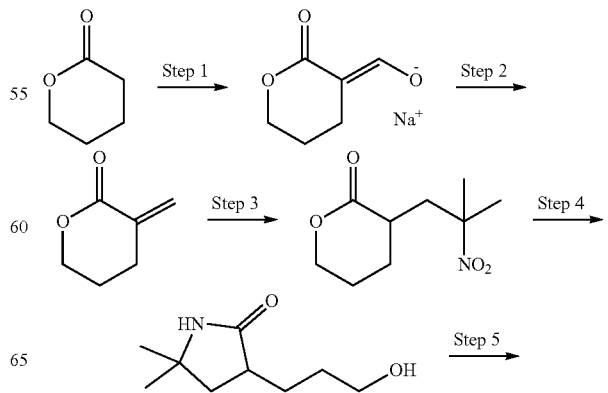

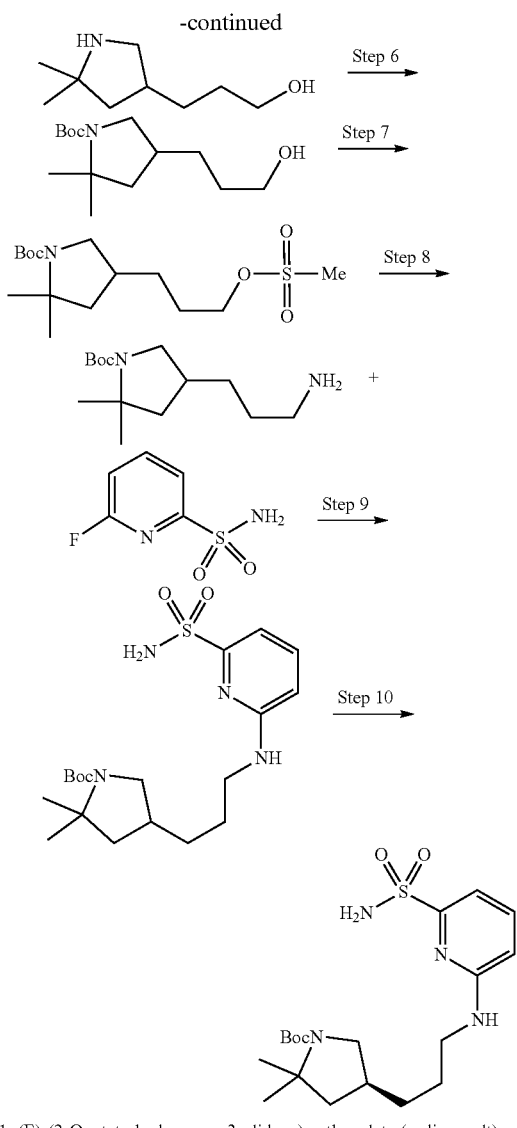

Step 1: (E)-(2-Oxotetrahydropyran-3-ylidene)methanolate (sodium salt)

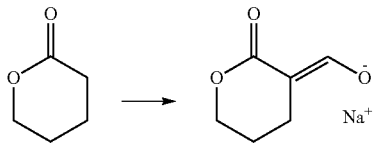

A 5 L, 3-neck round bottom flask was fitted with a mechanical stirrer, a heating mantle, an addition funnel, a J-Kem temperature probe/controller and a nitrogen inlet/outlet. The vessel was charged under a nitrogen atmosphere with sodium hydride (59.91 g of 60% w/w, 1.498 mol) followed by heptane (1.5 L) which provided a grey suspension. Stirring was commenced and the pot temperature was recorded at 19° C. The vessel was then charged with ethyl alcohol (3.451 g, 74.91 mmol) added via syringe which resulted in gas evolution. The addition funnel was charged with a clear pale yellow solution of tetrahydropyran-2-one (150 g, 1.498 mol) and ethyl formate (111 g, 1.50 mol). The solution was added dropwise over 1 h which resulted in gas evolution and a gradual exotherm to 45° C. The resulting thick white suspension was then heated to 65° C. for 2 h and then allowed to cool to room temperature. The mixture was continued to stir at room temperature overnight (about 10 h). The reaction mixture was vacuum filtered through a glass frit Buchner funnel (medium porosity) under a stream of nitrogen. The filter cake was displacement washed with heptane (2×250 mL) and pulled for a few min. The slightly heptane wet cake was transferred to a glass tray and dried in a vacuum oven at 45° C. for 15 h to provide a white solid (205 g, 1.36 mol, 91% yield) as the desired product, (E)-(2-oxotetrahydropyran-3-ylidene) methanolate (sodium salt).

Step 2: 3-Methylenetetrahydropyran-2-one

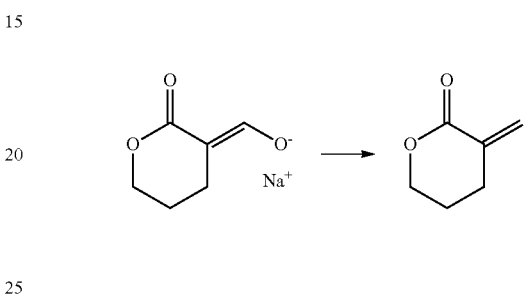

A 5 L, 3-neck round bottom flask was fitted with a mechanical stirrer, a heating mantle, an addition funnel, a J-Kem temperature probe/controller and a nitrogen inlet/outlet. The vessel was charged under a nitrogen atmosphere with (E)-(2-oxotetrahydropyran-3-ylidene) methanolate (sodium salt) (205 g, 1.366 mol) (205 g, 1.366 mol) and tetrahydrofuran (1640 mL) which provided a white suspension. Stirring was commenced and the pot temperature was recorded at 19° C. The vessel was then charged with paraformaldehyde (136.6 g, 4.549 mol) added as a solid in one portion. The resulting suspension was heated to 63° C. and the condition was maintained for 15 h. Upon heating the reaction mixture became slightly gelatinous. The white gelatinous mixture was concentrated under reduced pressure to remove most of the tetrahydrofuran. The remaining residue was partitioned with ethyl acetate (1000 mL), saturated sodium chloride (500 mL) and saturated sodium hydrogen carbonate (500 mL) in a separatory funnel. The organic was removed and the residual aqueous was extracted with ethyl acetate (5×300 mL). The combined organic was dried over sodium sulfate (500 g) and then vacuum filtered through a glass frit Buchner funnel with a 20 mm layer of celite. The filter cake was displacement washed with ethyl acetate (250 mL). The clear filtrate was concentrated under reduced pressure to provide a clear pale yellow oil (135 g) as the desired crude product. The material was purified by silica gel column flash chromatography (liquid load) eluting with a gradient of 100% hexane to 60% ethyl acetate in hexane over 1 h collecting 450 mL fractions. The product was detected by TLC analysis on silica gel eluting with 3:1 hexanes/ethyl acetate and visualized under UV. The product fractions were combined and concentrated under reduced pressure to provide a clear, colorless oil (132 g, 1.18 mol, 72% yield containing 16 wt % residual ethyl acetate by NMR) as the desired product, 3-methylenetetrahydropyran-2-one. 1H NMR (400 MHZ, dimethyl sulfoxide-$d_6$) δ 6.18 (q, J=1.9 Hz, 1H), 5.60 (q, J=1.9 Hz, 1H), 4.40-4.26 (m, 2H), 2.61 (ddt, J=7.0, 6.3, 2.0 Hz, 2H), 1.90-1.75 (m, 2H).

Step 3:
3-(2-Methyl-2-nitro-propyl)tetrahydropyran-2-one

Step 4: 3-(3-Hydroxypropyl)-5,5-dimethyl-pyrrolidin-2-one

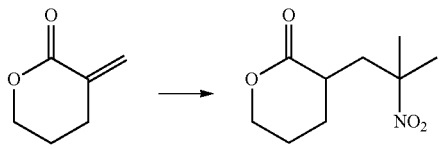

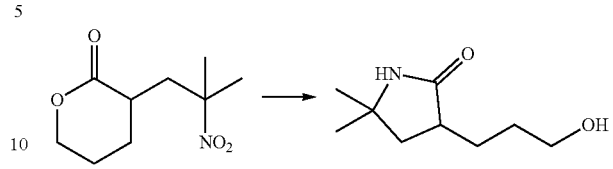

A 1000 mL, 3-neck round bottom flask was fitted with a Teflon stir bar, a heating mantle, a J-Kem temperature probe/controller and rubber septums. The vessel was charged with 3-(2-methyl-2-nitro-propyl)tetrahydropyran-2-one (25 g, 124.2 mmol) and ethyl alcohol (375 mL) which provided a white suspension. Stirring was commenced and the suspension was heated to 40° C. for 10 min which provided a clear colorless solution. The vessel was then fitted with a gas dispersion tube and the solution was degased with nitrogen for 15 min. The vessel was then charged with Raney Nickel (8.019 g of 50% w/w, 68.31 mmol) and the vessel was then fitted with the septums. The vessel was evacuated and placed under a hydrogen atmosphere. The process was repeated for three cycles. The vessel was then placed under 1 atmosphere hydrogen and the reaction mixture was gradually heated to 60° C. The reaction was continued to stir at 60° C. for 24 h. After cooling to room temperature, the vessel was fitted with a gas dispersion tube and the reaction mixture was degased with nitrogen for 15 min. The mixture was vacuum filtered through a glass frit Buchner funnel with a 20 mm layer of celite. The filter cake was displacement washed with ethanol (2×100 mL) and pulled until slightly ethyl alcohol wet, then wetted with water and the used Raney nickel catalyst was discarded under water. The clear pale amber filtrate was concentrated under reduced pressure to a clear viscous light amber oil. The oil was diluted with methyl tert-butyl ether (1500 mL) and the cloudy solution was concentrated under reduced pressure to a volume of about 150 mL which provided a suspension. The mixture was again diluted with methyl tert-butyl ether (1500 mL) and concentrated under reduced pressure to a volume of about 150 mL. The resulting suspension was allowed to stand at room temperature overnight (about 12 h). The solid was collected by vacuum filtration in a glass frit Buchner funnel and the filter cake was displacement washed with cold methyl tert-butyl ether (2×50 mL) and then pulled for 30 min. The material was further dried in a vacuum oven at 45° C. for 3 h to provide a white solid (19 g, 0.111 mol, 89% yield) as the product, 3-(3-hydroxypropyl)-5,5-dimethyl-pyrrolidin-2-one. $^1$H NMR (400 MHZ, dimethyl sulfoxide-$d_6$) δ 7.63 (s, 1H), 3.38 (t, J=6.5 Hz, 2H), 2.37 (tdd, J=9.8, 8.5, 4.4 Hz, 1H), 2.02 (dd, J=12.3, 8.6 Hz, 1H), 1.72 (tdd, J=9.6, 7.5, 4.4 Hz, 1H), 1.52-1.32 (m, 3H), 1.28-1.03 (m, 7H).

A 5000 mL, 3-neck round bottom flask was fitted with a mechanical stirrer, a cooling bath used as secondary containment, a J-Kem temperature probe, an addition funnel and a nitrogen inlet/outlet. The vessel was charged under a nitrogen atmosphere with 2-nitropropane (104.9 g, 1.177 mol). Stirring was commenced and the pot temperature was recorded at 19° C. The vessel was then charged with 1,8-diazabicyclo[5.4.0]undec-7-ene (22.41 g, 147.2 mmol) added neat in one portion which resulted in a clear light yellow solution. No exotherm was observed. The addition funnel was charged with a solution of 3-methylenetetrahydropyran-2-one (110 g, 981.0 mmol) in acetonitrile (1100 mL) which was added dropwise over 1 h which resulted in a clear light yellow solution and a gradual exotherm to 24° C. The reaction mixture was continued to stir at room temperature for 3.5 h and then concentrated under reduced pressure. The remaining residue was dissolved in dichloromethane (1000 mL) and partitioned with 500 mL of a 3:2 mixture of 1 molar citric acid solution/saturated sodium chloride solution. The resulting organic phase was a clear pale blue solution and the aqueous phase was a slightly cloudy very pale blue solution. The organic was removed and the residual aqueous was extracted with dichloromethane (300 mL). The combined organic was washed with saturated sodium chloride solution (300 mL), dried over sodium sulfate (250 g) and then filtered through a glass frit Buchner funnel. The filtrate was concentrated under reduced pressure to a volume of about 200 mL. The clear pale blue dichloromethane solution was diluted with methyl tert-butyl ether (1500 mL) and the cloudy solution was concentrated under reduced pressure to a volume of about 200 mL which provided a suspension. The mixture was again diluted with methyl tert-butyl ether (1500 mL) and concentrated under reduced pressure to a volume of about 250 mL. The resulting suspension was allowed to stand at room temperature overnight (about 12 h). The solid was collected by vacuum filtration in a glass frit Buchner funnel and the filter cake was displacement washed with cold methyl tert-butyl ether (2×150 mL) and then pulled for 30 min. The material was further dried in a vacuum oven at 45° C. for 5 h to provide (160 g, 0.795 mol, 81% yield) of a white solid as the desired product, 3-(2-methyl-2-nitro-propyl)tetrahydropyran-2-one. $^1$H NMR (400 MHZ, dimethyl sulfoxide-$d_6$) δ 4.34 (ddd, J=11.1, 9.3, 4.3 Hz, 1H), 4.20 (dt, J=11.1, 5.1 Hz, 1H), 2.75-2.62 (m, 1H), 2.56 (dd, J=14.9, 5.2 Hz, 1H), 2.01-1.89 (m, 2H), 1.89-1.67 (m, 2H), 1.55 (d, J=6.0 Hz, 6H), 1.44 (dddd, J=12.8, 11.5, 8.1, 6.6 Hz, 1H).

Step 5: 3-(5,5-Dimethylpyrrolidin-3-yl)propan-1-ol

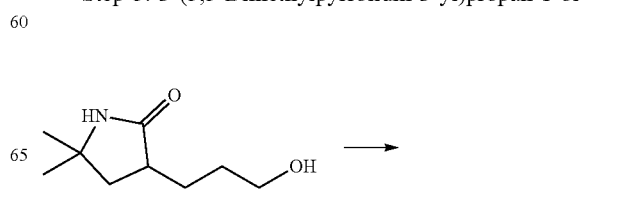

-continued

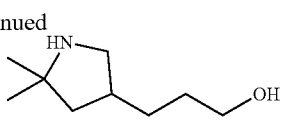

A 5 L, 3-neck round bottom flask was fitted with a mechanical stirrer, a heating mantle, an addition funnel, a J-Kem temperature probe/controller and a nitrogen inlet/outlet. The vessel was charged under a nitrogen atmosphere with lithium aluminum hydride pellets (19.39 g, 510.9 mmol). The vessel was then charged with tetrahydrofuran (500 mL, 20 mL/g). Stirring was commenced and the pot temperature was recorded at 20° C. The mixture was allowed to stir at room temperature for 0.5 h to allow the pellets to dissolve. The pot temperature of the resulting grey suspension was recorded at 24° C. The addition funnel was charged with a solution of 3-(3-hydroxypropyl)-5,5-dimethyl-pyrrolidin-2-one (25 g, 146.0 mmol) in tetrahydrofuran (500 mL) and the clear pale yellow solution was added dropwise over 90 min. Slight heating was required to achieve homogeneity. After the completed addition the pot temperature of the resulting greyish suspension was recorded at 24° C. The mixture was then heated to a pot temperature of 65° C. and the condition was maintained for 72 h. Analysis of the reaction mixture at this point indicated some residual starting material still remaining and no change in product formation. The reaction was subsequently stopped at this point. The heating mantle was removed and the vessel was fitted with a cooling bath. The suspension was cooled to 0° C. with a crushed ice/water cooling bath and then quenched by the very slow dropwise addition of water (19.93 mL), followed by 15 wt % sodium hydroxide solution (19.93 mL) and then finally with water (59.79 mL). The pot temperature of the resulting white suspension was recorded at 5° C. The cooling bath was removed and the vessel was again fitted with a heating mantle. The suspension was warmed to 60° C. and the condition was maintained for 30 min. The warm suspension was vacuum filtered through a glass frit Buchner funnel with a 20 mm layer of celite. The filter cake was then displacement washed with 60° C. tetrahydrofuran (2×250 mL) and then pulled for 30 min. The clear filtrate was concentrated under reduced pressure to provide (23.5 g, 0.149 mol, 99% yield) of a clear light yellow viscous oil as the desired product, 3-(5,5-dimethylpyrrolidin-3-yl)propan-1-ol. $^1$H NMR (400 MHZ, dimethyl sulfoxide-d$_6$) δ 3.37 (dt, J=8.3, 6.4 Hz, 3H), 2.95 (dd, J=10.6, 7.6 Hz, 1H), 2.40 (dd, J=10.7, 7.7 Hz, 1H), 2.04 (dt, J=16.1, 8.1 Hz, 1H), 1.69 (dd, J=12.2, 8.2 Hz, 1H), 1.50-1.24 (m, 5H), 1.11-0.94 (m, 7H).

Step 6: tert-Butyl 4-(3-hydroxypropyl)-2,2-dimethyl-pyrrolidine-1-carboxylate

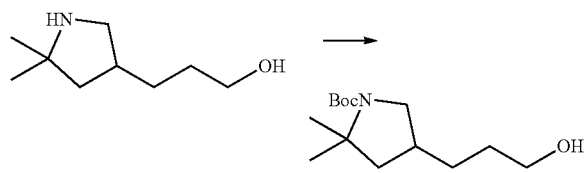

A 1 L, 3-neck round bottom flask was fitted with a mechanical stirrer, a cooling bath, an addition funnel, a J-Kem temperature probe and a nitrogen inlet/outlet. The vessel was charged under a nitrogen atmosphere with 3-(5,5-dimethylpyrrolidin-3-yl)propan-1-ol (15 g, 95.39 mmol) and dichloromethane (225 mL, 15 mL/g) which provided a clear light yellow solution. Stirring was commenced and the pot temperature was recorded at 19° C. The cooling bath was charged with crushed ice/water and the pot temperature was lowered to 0° C. The addition funnel was charged with triethylamine (12.55 g, 124.0 mmol) which was subsequently added neat dropwise over 5 min. No exotherm was observed. The addition funnel was then charged with di-tert-butyl dicarbonate (22.89 g, 104.9 mmol) dissolved in dichloromethane (225 mL). The clear pale yellow solution was then added dropwise over 30 min which resulted in gentle gas evolution. No exotherm was observed. The cooling bath was removed and the resulting clear light yellow solution was allowed to warm to room temperature and continue to stir at room temperature for 3 h. The reaction mixture was transferred to a separatory funnel and partitioned with water (75 mL). The organic was removed and washed with saturated sodium chloride solution (75 mL), dried over sodium sulfate (150 g) and then filtered through a glass frit Buchner funnel. The filtrate was concentrated under reduced pressure to provide (30 g) of a clear light yellow oil as the desired crude product. The material was purified by silica gel column flash chromatography (liquid load with dichloromethane) eluting with a gradient of 100% dichloromethane to 10% methyl alcohol in dichloromethane over 60 min collecting 50 mL fractions. The desired product fractions were combined and concentrated under reduced pressure to provide tert-butyl 4-(3-hydroxypropyl)-2,2-dimethyl-pyrrolidine-1-carboxylate (22 g, 0.0855 mol, 90% yield) as a clear pale yellow viscous oil. $^1$H NMR (400 MHZ, DMSO-d6) δ 4.38 (td, J=5.2, 1.4 Hz, 1H), 3.54 (dt, J=10.3, 6.7 Hz, 1H), 3.38 (td, J=6.6, 3.5 Hz, 2H), 2.76 (q, J=10.3 Hz, 1H), 2.07 (td, J=11.6, 5.7 Hz, 1H), 1.87 (ddd, J=16.7, 12.1, 6.0 Hz, 1H), 1.37 (dd, J=14.2, 10.4 Hz, 17H), 1.24 (s, 3H).

Step 7: tert-Butyl 2,2-dimethyl-4-(3-methylsulfonyl oxypropyl) pyrrolidine-1-carboxylate

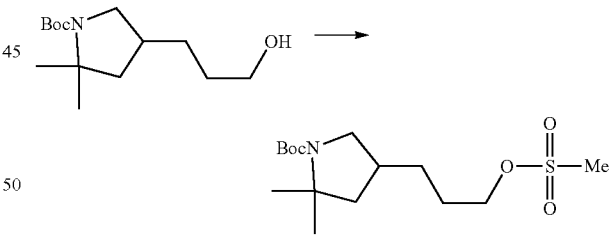

tert-Butyl 4-(3-hydroxypropyl)-2,2-dimethyl-pyrrolidine-1-carboxylate (50.5 g, 196.22 mmol) and triethylamine (39.711 g, 54.698 mL, 392.44 mmol) were dissolved in dichloromethane (500 mL) and the resulting solution was chilled in an ice water bath for 30 min. Mesyl chloride (24.725 g, 16.706 mL, 215.84 mmol) was added dropwise over a 30 min period, then the ice bath was removed and the mixture stirred at room temperature for one h. The reaction was then quenched with saturated sodium bicarbonate solution (200 mL). The phases were separated and the organic phase was extracted with saturated sodium bicarbonate (200 mL) and water (2×100 mL). The aqueous phases were discarded and the organic phase was dried over sodium sulfate, filtered and concentrated in vacuo to obtain tert-butyl 2,2-dimethyl-4-(3-methylsulfonyl oxypropyl) pyrrolidine-1-carboxylate (64.2 g, 93%) as a pale yellow oil. ESI-MS m/z calc. 335.1766, found 336.4 (M+1)⁺; Retention time: 5.54 min (LC Method Q).

Step 8: tert-Butyl 4-(3-aminopropyl)-2,2-dimethyl-pyrrolidine-1-carboxylate

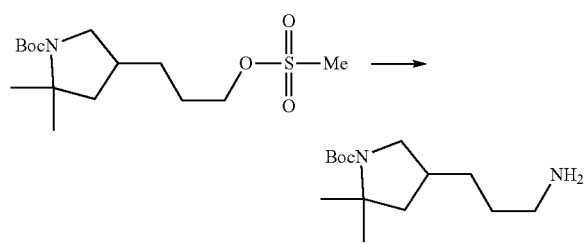

tert-Butyl 2,2-dimethyl-4-(3-methylsulfonyloxypropyl) pyrrolidine-1-carboxylate (64.2 g, 191.38 mmol) was dissolved in dioxane (650 mL) and then ammonium hydroxide (650 mL) was added and the resulting mixture heated to 45° C. for 18 h. After 18 h, the reaction was cooled to room temperature. The solution was diluted with 1M sodium hydroxide (200 mL) and then extracted with diethyl ether (3×650 mL). The aqueous phase was discarded and the combined organic phases were extracted with water (2×200 mL). The aqueous phases were discarded and the organic phase was dried over sodium sulfate, filtered and concentrated in vacuo to afford tert-butyl 4-(3-aminopropyl)-2,2-dimethyl-pyrrolidine-1-carboxylate (48.9 g, 95%) as a pale yellow oil. ESI-MS m/z calc. 256.2151, found 257.3 (M+1)⁺; Retention time: 3.70 min (LC Method Q).

Step 9: tert-Butyl 2,2-dimethyl-4-[3-[(6-sulfamoyl-2-pyridyl)amino]propyl]pyrrolidine-1-carboxylate

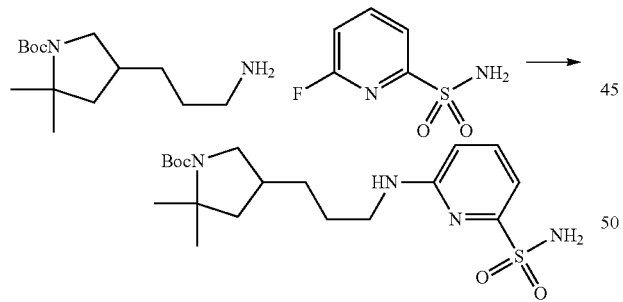

To ter-butyl 4-(3-aminopropyl)-2,2-dimethyl-pyrrolidine-1-carboxylate (8.91 g, 34.8 mmol) and 6-fluoropyridine-2-sulfonamide (6.13 g, 34.8 mmol) in dimethyl sulfoxide (75 mL) was added potassium carbonate (4.91 g, 35.5 mmol) and the mixture stirred at 100° C. for 12 h and then allowed to cool to ambient temperature and stirred for an additional 4 h (16 h total). The reaction mixture was slowly poured into hydrochloric acid (35 mL of 1 M, 35.00 mmol) in water (200 mL) (some foaming) and diluted with ethyl acetate (250 mL). The organic phase was separated and washed with 100 mL of brine. The organic phase was dried over magnesium sulfate, filtered over celite, and concentrated in vacuo to afford a dark yellow oil. The crude product was purified by silica gel chromatography eluting with 0%-100% ethyl acetate in hexanes. Collected both pure (9.0 g) and impure (3 g) fractions. Purified the impure fractions by silica gel chromatography eluting with 0%-100% ethyl acetate in hexanes affording, in total, tert-butyl 2,2-dimethyl-4-[3-[(6-sulfamoyl-2-pyridyl)amino]propyl]pyrrolidine-1-carboxylate (10.0 g, 69%). 1H NMR (400 MHZ, dimethyl sulfoxide-d₆) δ 7.52 (dd, J=8.5, 7.2 Hz, 1H), 7.07 (s, 2H), 6.95 (dd, J=7.2, 0.7 Hz, 2H), 6.61 (d, J=8.5 Hz, 1H), 3.55 (q, J=9.1 Hz, 1H), 3.32-3.24 (m, 2H), 2.79 (q, J=10.0 Hz, 1H), 2.13 (d, J=16.1 Hz, 1H), 1.96-1.82 (m, 1H), 1.51 (dt, J=18.0, 9.3 Hz, 2H), 1.37 (dd, J=12.9, 10.6 Hz, 15H), 1.24 (s, 3H). ESI-MS m/z calc. 412.21442, found 413.1 (M+1)⁺; Retention time: 2.34 min (LC Method D).

Step 10: tert-Butyl (4S)-2,2-dimethyl-4-[3-[(6-sulfamoyl-2-pyridyl)amino]propyl]pyrrolidine-1-carboxylate

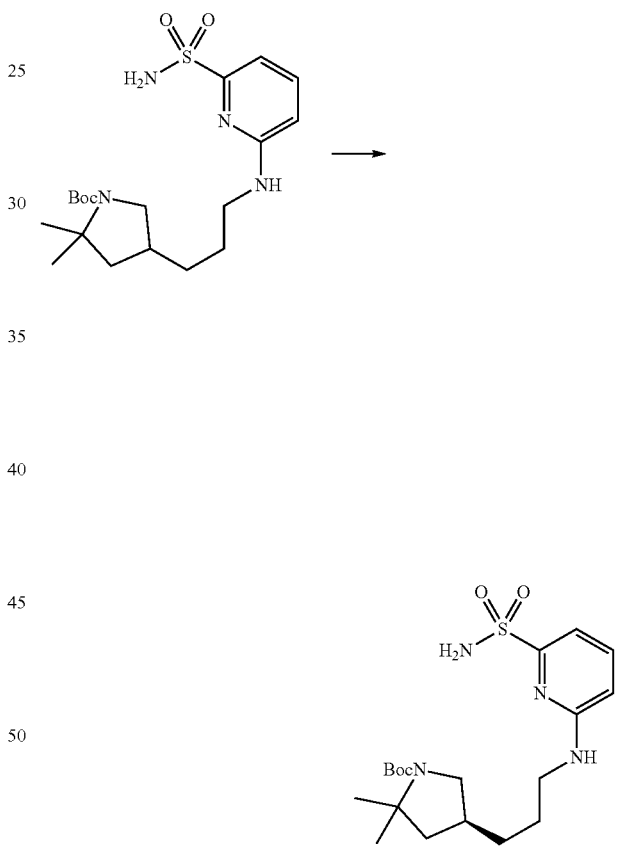

Subjected racemic tert-butyl 2,2-dimethyl-4-[3-[(6-sulfamoyl-2-pyridyl)amino]propyl]pyrrolidine-1-carboxylate (7 g, 16.97 mmol) to chiral separation by SFC chromatography using a ChiralPak IG (250×21.2 mm column, 5 μm particle size) with 40% methanol/60% carbon dioxide mobile phase at 70 mL/min over 11.0 min (injection volume=500 μL of 32 mg/mL solution in methanol) giving as the first peak to elute, tert-butyl (4S)-2,2-dimethyl-4-[3-[(6-sulfamoyl-2-pyridyl) amino]propyl]pyrrolidine-1-carboxylate (3.4481 g, 99%). ESI-MS m/z calc. 412.21442, found 413.2 (M+1)⁺; Retention time: 0.63 min (LC Method A).

Part C: Synthesis of (14S)-8-[3-(2-{dispiro[2.0.2.1] heptan-7-yl}ethoxy)-1H-pyrazol-1-yl]-12,12-dimethyl-2λ6-thia-3,9,11,18,23-pentaazatetracyclo [17.3.1.111,14.05,10]tetracosa-1(22),5,7,9,19 (23), 20-hexaene-2,2,4-trione (Compound I)

Step 1: tert-Butyl (4S)-4-[3-[[6-[[2-chloro-6-[3-(2-dispiro[2.0.2.1]heptan-7-ylethoxy)pyrazol-1-yl]pyridine-3-carbonyl]sulfamoyl]-2-pyridyl]amino]propyl]-2,2-dimethyl-pyrrolidine-1-carboxylate

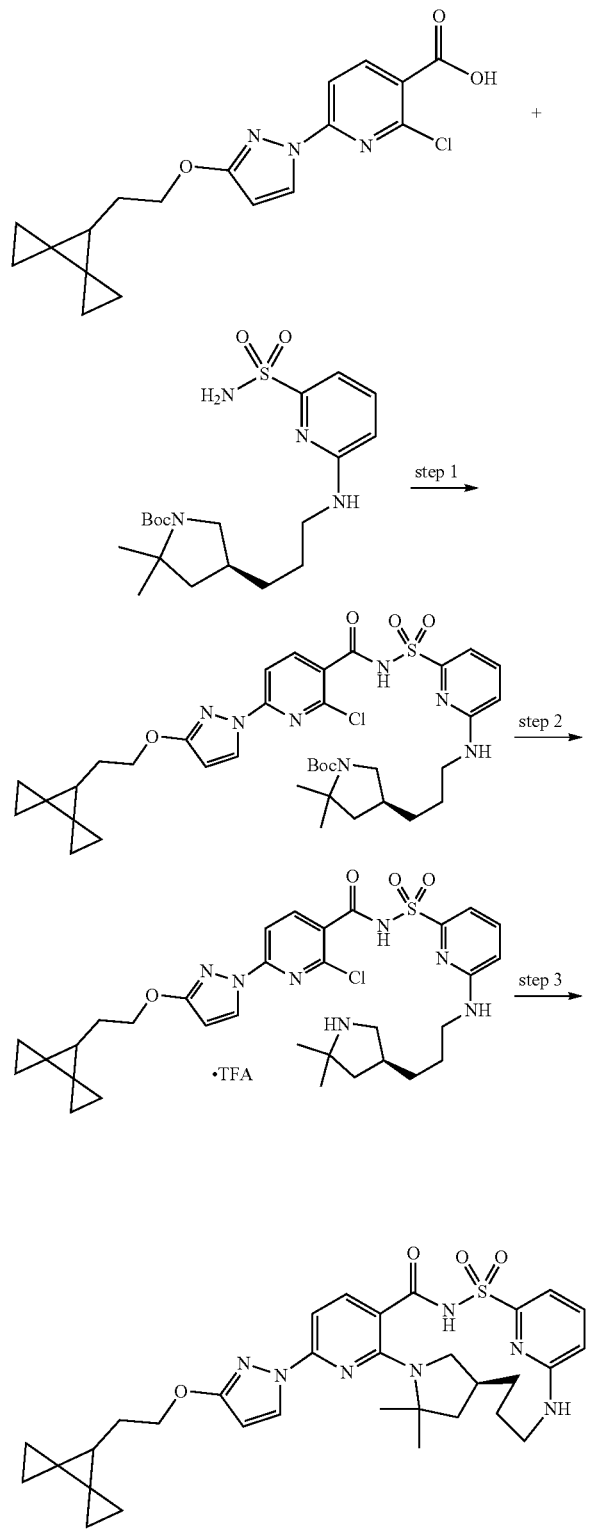

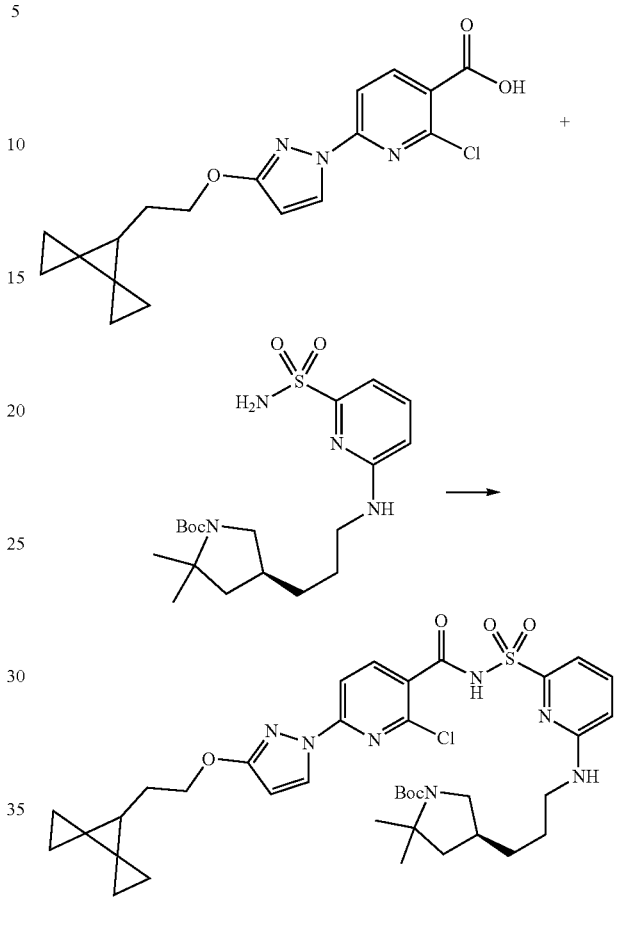

To a solution of 2-chloro-6-[3-(2-dispiro[2.0.2.1]heptan-7-ylethoxy) pyrazol-1-yl] pyridine-3-carboxylic acid (5.2 g, 14.45 mmol) in tetrahydrofuran (100 mL) was added carbonyl diimidazole (2.8 g, 16.51 mmol) and the mixture stirred at ambient temperature for 1 h. To this mixture was added tert-butyl (4S)-2,2-dimethyl-4-[3-[(6-sulfamoyl-2-pyridyl)amino]propyl]pyrrolidine-1-carboxylate (6.0 g, 14.54 mmol) in tetrahydrofuran (15 mL) followed by 1,8-diazabicyclo[5.4.0]undec-7-ene (6.5 mL, 43.47 mmol) and the mixture was stirred at ambient temperature for 16 h. The reaction was diluted with water (150 mL) and the mixture acidified with aqueous hydrochloric acid (15 mL of 6 M, 90.00 mmol). The mixture was extracted with ethyl acetate (300 mL) and the organic phase separated. The organic phase was washed with brine, dried over magnesium sulfate, filtered over Celite and concentrated in vacuo affording a white precipitate. The precipitate was slurried with acetonitrile and the solid collected by filtration using a medium glass frit and washed with acetonitrile. The filtrate was concentrated in vacuo affording a yellow oil. The crude oil was diluted with acetonitrile and some N-methyl-2-pyrrolidone and chromatographed on a 415 g reverse phase $C_{18}$ column eluting with 50%-100% acetonitrile in water giving tert-butyl (4S)-4-[3-[[6-[[2-chloro-6-[3-(2-dispiro[2.0.2.1] heptan-7-ylethoxy) pyrazol-1-yl]pyridine-3-carbonyl]sulfamoyl]-2-pyridyl]amino]propyl]-2,2-dimethyl-pyrrolidine-1- carboxylate (4.5 g, 41%). ESI-MS m/z calc. 753.30756, found 754.4 (M+1)⁺; Retention time: 3.79 min (LC Method D).

Step 2: 2-Chloro-N-[[6-[3-[(3S)-5,5-dimethylpyrrolidin-3-yl]propylamino]-2-pyridyl]sulfonyl]-6-[3-(2-dispiro[2.0.2.1]heptan-7-ylethoxy) pyrazol-1-yl] pyridine-3-carboxamide (trifluoroacetate salt)

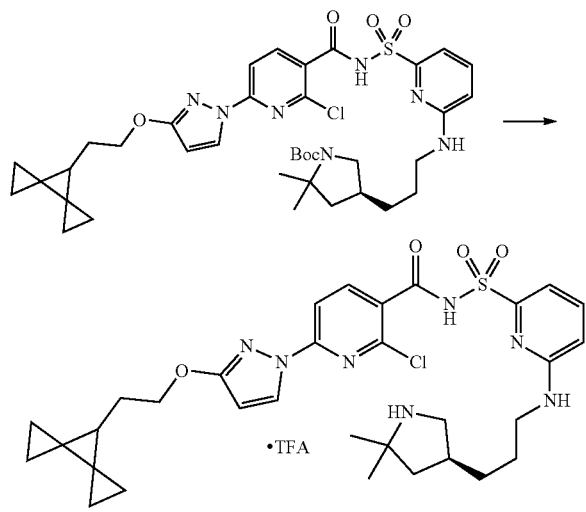

To a solution of tert-butyl (4S)-4-[3-[[6-[[2-chloro-6-[3-(2-dispiro[2.0.2.1]heptan-7-ylethoxy) pyrazol-1-yl]pyridine-3-carbonyl]sulfamoyl]-2-pyridyl]amino]propyl]-2,2-dimethyl-pyrrolidine-1-carboxylate (5.9 g, 7.821 mmol) in dichloromethane (30 mL) and toluene (15 mL) was added trifluoroacetic acid (6.0 mL, 77.88 mmol) and the mixture stirred at ambient temperature for 18 h. The solvent was removed in vacuo with the bath temp set at 45° C. affording a thick, yellow oil. The oil was diluted with toluene (125 mL) and the solvent removed in vacuo with the bath temp set at 45° C. The oil was diluted with toluene and the solvent removed in vacuo affording a thick, viscous yellow oil, 2-chloro-N-[[6-[3-[(3S)-5,5-dimethylpyrrolidin-3-yl]propylamino]-2-pyridyl] sulfonyl]-6-[3-(2-dispiro[2.0.2.1]heptan-7-ylethoxy) pyrazol-1-yl]pyridine-3-carboxamide (trifluoroacetate salt) (6.0 g, 100%) which was used in the next step without further purification. ESI-MS m/z calc. 653.2551, found 654.3 (M+1)⁺; Retention time: 2.6 min (LC Method B).

Step 3: (14S)-8-[3-(2-{Dispiro[2.0.2.1]heptan-7-yl}ethoxy)-1H-pyrazol-1-yl]-12,12-dimethyl-2λ6-thia-3,9,11,18,23-pentaazatetracyclo [17.3.1.111,14.05,10]tetracosa-1 (22),5,7,9,19 (23),20-hexaene-2,2,4-trione (Compound I)

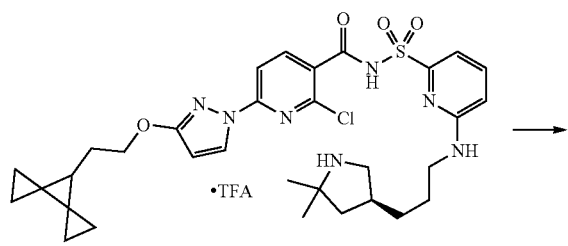

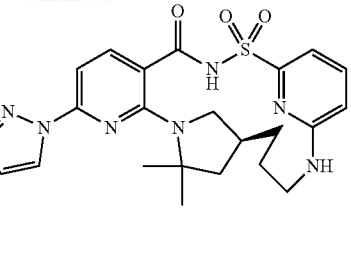

To a solution of 2-chloro-N-[[6-[3-[(3S)-5,5-dimethylpyrrolidin-3-yl]propylamino]-2-pyridyl]sulfonyl]-6-[3-(2-dispiro[2.0.2.1]heptan-7-ylethoxy) pyrazol-1-yl]pyridine-3-carboxamide (trifluoroacetate salt) (6.0 g, 7.810 mmol) in NMP (140 mL) was added potassium carbonate (5.3 g, 38.35 mmol). The mixture was purged with nitrogen for 5 min. The mixture was then heated at 150° C. for 22 h. The reaction mixture was cooled to room temperature and added to water (300 mL) affording an off-white solid precipitate. The mixture was carefully acidified with aqueous hydrochloric acid (12 mL of 6 M, 72.00 mmol) affording a foamy slurry. The solid was collected by filtration using a medium glass frit. The wet filter cake was dissolved in ethyl acetate (500 mL) and washed with 200 mL of brine. The aqueous phase was slightly cloudy so it was acidified with a small amount of 6N hydrochloric acid and returned to the organic phase. The aqueous phase was separated and the organic phase was dried over magnesium sulfate, filtered and concentrated in vacuo affording a light yellow oil. This crude product was diluted with acetonitrile and chromatographed on a 415 g C₁₈ reverse phase column eluting with 50%-100% acetonitrile in water. The product was isolated as a cream colored foam. The foam was dried in vacuo at 45° C. for 48 h giving (14S)-8-[3-(2-{dispiro[2.0.2.1]heptan-7-yl}ethoxy)-1H-pyrazol-1-yl]-12,12-dimethyl-2λ6-thia-3,9,11,18,23-pentaazatetracyclo[17.3.1.111,14.05,10]tetracosa-1(22),5,7,9, 19 (23),20-hexaene-2,2,4-trione (Compound I) (3.32 g, 68%). 1H NMR (400 MHz, dimethyl sulfoxide-d₆) δ 12.48 (s, 1H), 8.20 (d, J=2.8 Hz, 1H), 7.81 (d, J=8.2 Hz, 1H), 7.57 (dd, J=8.5, 7.2 Hz, 1H), 7.05 (d, J=7.1 Hz, 1H), 6.97 (d, J=8.5 Hz, 1H), 6.91 (d, J=8.2 Hz, 1H), 6.71 (d, J=8.5 Hz, 1H), 6.08 (d, J=2.7 Hz, 1H), 4.21 (td, J=6.7, 1.3 Hz, 2H), 3.92 (d, J=12.0 Hz, 1H), 3.16 (s, 1H), 2.95 (d, J=13.3 Hz, 1H), 2.78-2.66 (m, 1H), 2.07 (s, 1H), 1.92-1.72 (m, 4H), 1.60 (s, 6H), 1.51 (s, 3H), 1.47 (t, J=6.5 Hz, 1H), 1.31 (q, J=12.2 Hz, 1H), 0.89-0.77 (m, 4H), 0.69-0.61 (m, 2H), 0.53-0.45 (m, 2H). ESI-MS m/z calc. 617.27844, found 618.4 (M+1)⁺; Retention time: 10.29 min (LC Method F).

Example 2: Compound I Benzenesulfonic Acid Form A

Approximately 500 mg of Compound I (free acid) was weighed into a 15 mL bead mill vial. One equivalent of benzenesulfonic acid and 214 µL of ethanol were added. The preparation was milled at 5000 rpm for 10×60s with a 10 s pause between each interval. The preparation was then milled as above for a total of six cycles and analyzed by XRPD and TGA/DSC. The solids were then dried under vacuum for approximately 23 hours under ambient conditions to provide Compound I benzenesulfonic acid Form A.

A. X-Ray Powder Diffraction

XRPD analysis was carried out on a PANalytical X'pert pro with PIXcel detector (128 channels), scanning the samples between 3 and 35° 2θ. The material was gently ground to release any agglomerates and loaded onto a multi-well plate with Kapton or Mylar polymer film to support the sample. The multi-well plate was then placed into the diffractometer and analyzed using Cu K radiation (α1 λ=1.54060 Å; α2-1.54443 Å; β=1.39225 Å; α1: α2 ratio=0.5) running in transmission mode (step size 0.0130° 2θ, step time 18.87s) using 40 kV/40 mA generator settings. Data were visualized and images generated using the HighScore Plus 4.7 desktop application (PANalytical, 2017).

The XRPD diffractogram for Compound I benzenesulfonic acid Form A is provided in FIG. 1 and the XRPD data are summarized below in Table 2.

TABLE 2

XRPD signals for crystalline Compound I benzenesulfonic acid Form A

| XRPD Peaks | Angle (degrees 2-Theta ± 0.2) | Intensity % |
|---|---|---|
| 1 | 6.6 | 100.0 |
| 2 | 11.0 | 60.0 |
| 3 | 12.1 | 32.7 |
| 4 | 21.3 | 31.6 |
| 5 | 16.4 | 29.5 |
| 6 | 21.4 | 28.1 |
| 7 | 11.9 | 27.8 |
| 8 | 12.1 | 25.0 |
| 9 | 18.4 | 24.5 |
| 10 | 25.7 | 20.8 |
| 11 | 17.9 | 18.8 |
| 12 | 20.4 | 18.8 |
| 13 | 6.1 | 15.2 |
| 14 | 22.9 | 13.4 |
| 15 | 19.9 | 13.4 |
| 16 | 17.8 | 13.4 |
| 17 | 13.1 | 13.0 |
| 18 | 13.7 | 11.9 |
| 19 | 22.4 | 11.9 |
| 20 | 18.1 | 11.6 |
| 21 | 20.8 | 11.0 |
| 22 | 17.5 | 11.0 |
| 23 | 10.3 | 10.7 |

B. Thermogravimetric Analysis (TGA)

Approximately 5-10 mg of Compound I benzenesulfonic acid Form A was added into a pre-tared open aluminium pan and loaded into a TA Instruments Discovery SDT 650 Auto-Simultaneous DSC and held at room temperature. The sample was then heated at a rate of 10° C./min from 30° C. to 400° C., during which time the change in sample weight was recorded along with the heat flow response (DSC). Nitrogen was used as the sample purge gas, at a flow rate of 200 cm³/min.

Figure 2:
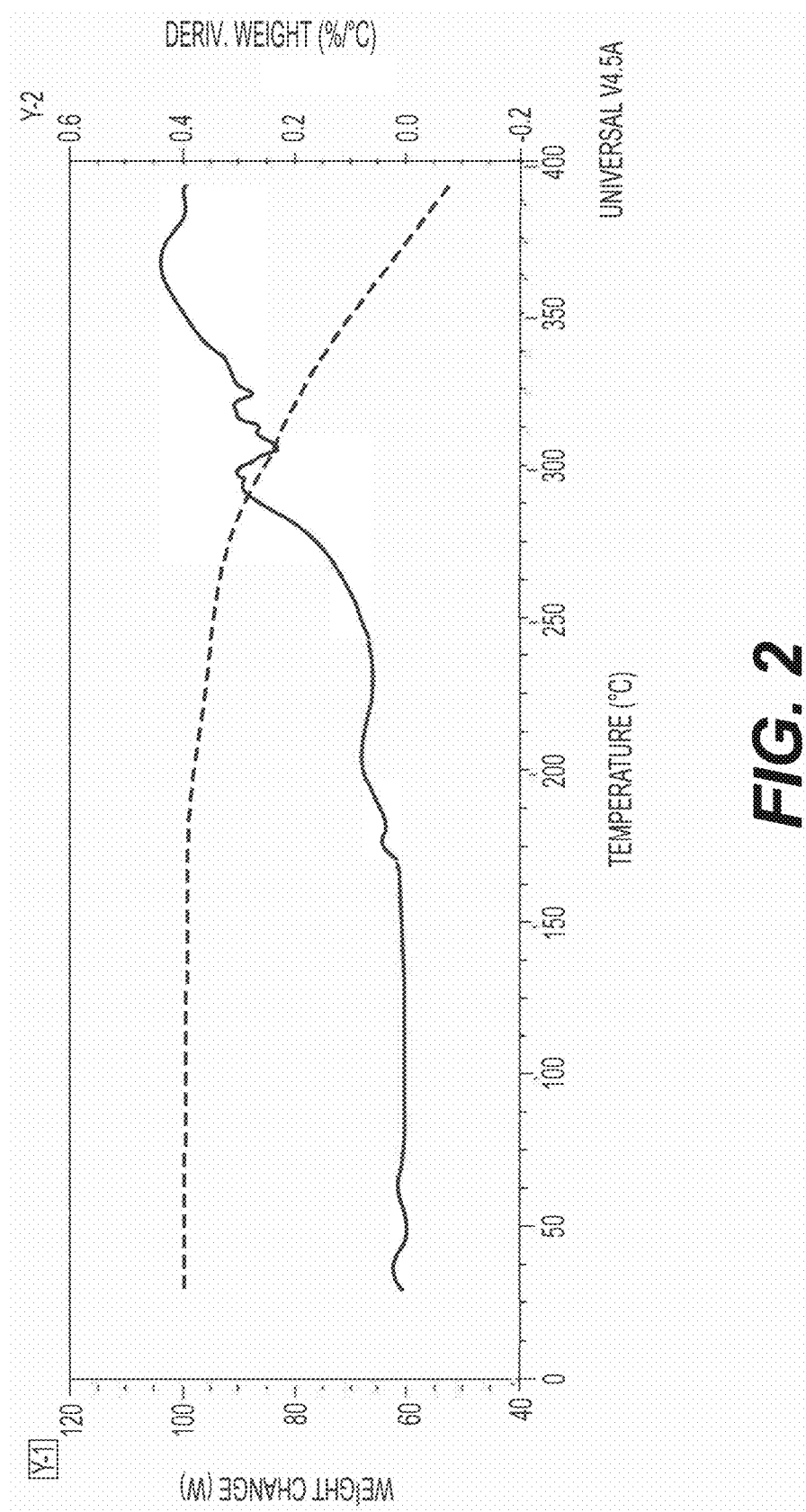
FIG. 2 provides a TGA analysis of Compound I benzenesulfonic acid Form A.

The TGA data for Compound I benzenesulfonic acid Form A is provided in FIG. 2 and shows ~2% weight loss from ambient to 200° C.

C. Differential Scanning Calorimetry Analysis (DSC)

Approximately 1-5 mg of Compound I benzenesulfonic acid Form A was weighed into an aluminium DSC pan and sealed non-hermetically with an aluminium lid. The sample pan was then loaded into a TA Instruments Discovery DSC 2500 differential scanning calorimeter equipped with a RC90 cooler. The sample and reference were heated to 300° C. at a scan rate of 10° C./min and the resulting heat flow response monitored. The sample was re-cooled to 20° C. and then reheated again to 205° C. all at 10° C./min. Nitrogen was used as the purge gas, at a flow rate of 50 cm³/min.

Figure 3:
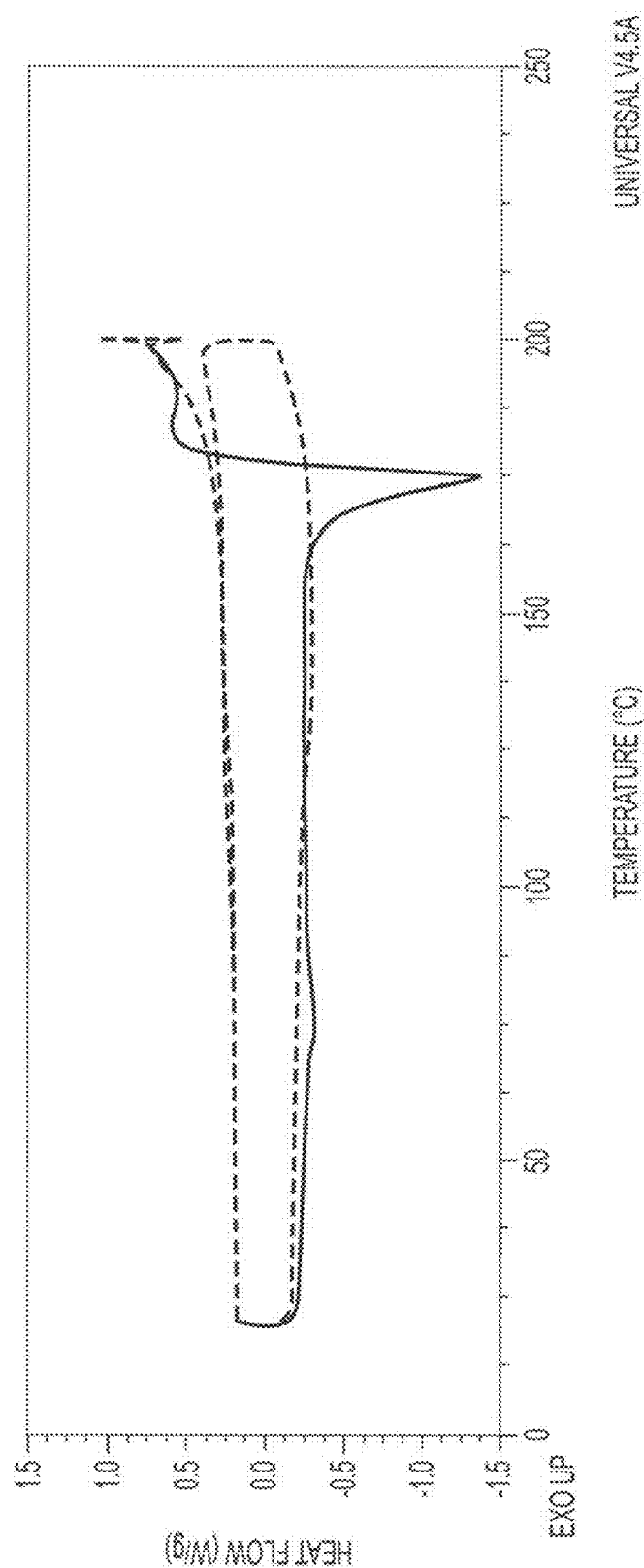
FIG. 3 provides an DSC analysis of crystalline Compound I benzenesulfonic acid Form A.

The DSC data for Compound I benzenesulfonic acid Form A is provided in FIG. 3 and shows endotherms at 75 and 175° C.

Example 3: Compound I Benzenesulfonic Acid Form B

Approximately 15 mg of Compound I free acid/benzenesulfonic acid (1.05 equivalents) was weighed into a 2 mL bead mill vial. 5 µL of THF and 2-3 metal beads were added. The preparation was milled at 7500 rpm for 5×60s with a 10s pause between each interval. The solids were isolated to provide Compound I benzenesulfonic acid Form B.

A. X-Ray Powder Diffraction

XRPD analysis was carried following the same procedure described for Compound I benzenesulfonic acid Form A. The XRPD diffractogram for Compound I benzenesulfonic acid Form B is provided in FIG. 4 and the XRPD data are summarized below in Table 3.

TABLE 3

XRPD signals for crystalline Compound I benzenesulfonic acid Form B

| XRPD Peaks | Angle (Degrees 2-Theta ± 0.2) | Intensity % |
|---|---|---|
| 1 | 3.8 | 100.0 |
| 2 | 10.7 | 42.1 |
| 3 | 9.4 | 29.5 |
| 4 | 8.4 | 28.8 |
| 5 | 15.2 | 25.2 |
| 6 | 12.6 | 24.3 |
| 7 | 17.1 | 17.2 |
| 8 | 21.8 | 16.7 |
| 9 | 19.8 | 16.1 |
| 10 | 13.1 | 15.3 |
| 11 | 20.4 | 14.5 |
| 12 | 23.2 | 14.3 |
| 13 | 13.5 | 12.5 |
| 14 | 18.3 | 11.7 |

B. Thermogravimetric/Differential Scanning calorimetry Analysis

TGA/DSC was carried out following the same procedure described above for Compound I benzenesulfonic acid Form A. The TGA data for Compound I benzenesulfonic acid Form B is provided in FIG. 5 and shows approximately 4% weight loss from ambient to 150° C. and an endotherm at approximately 140° C.

Example 4: Compound I Benzenesulfonic Acid Form C

Approximately 15 mg of Compound I free acid/benzenesulfonic acid (1.05 equivalents) was weighed into a 2 mL bead mill vial. 5 µL of isopropyl acetate and 2-3 metal beads were added. The preparation was milled at 7500 rpm for 5×60s with a 10s pause between each interval to provide Compound I benzenesulfonic acid Form C.

A. X-Ray Powder Diffraction

XRPD analysis was carried following the same procedure described for Compound I benzenesulfonic acid Form A. The XRPD diffractogram for Compound I benzenesulfonic acid Form C is provided in FIG. 6 and the XRPD data are summarized below in Table 4.

TABLE 4

XRPD signals for crystalline Compound I benzenesulfonic acid Form C

| XRPD Peaks | Angle (Degrees 2-Theta ± 0.2) | Intensity % |
|---|---|---|
| 1 | 6.2 | 100.0 |
| 2 | 21.3 | 88.7 |
| 3 | 11.4 | 71.6 |

TABLE 4-continued

XRPD signals for crystalline Compound I benzenesulfonic acid Form C

| XRPD Peaks | Angle (Degrees 2-Theta ± 0.2) | Intensity % |
|---|---|---|
| 4 | 17.8 | 70.5 |
| 5 | 6.8 | 52.1 |
| 6 | 11.9 | 46.8 |
| 7 | 20.4 | 46.5 |
| 8 | 16.6 | 33.8 |
| 9 | 16.0 | 33.3 |
| 10 | 5.0 | 26.8 |
| 11 | 13.5 | 23.8 |
| 12 | 14.6 | 18.7 |
| 13 | 25.4 | 17.2 |
| 14 | 19.8 | 15.3 |
| 15 | 27.3 | 14.3 |
| 16 | 23.0 | 11.4 |
| 17 | 24.9 | 11.3 |
| 18 | 26.6 | 10.2 |

B. Thermogravimetric/Differential Scanning Calorimetry Analysis

TGA/DSC was carried out following the same procedure described above for Compound I benzenesulfonic acid Form A. The TGA data for Compound I benzenesulfonic acid Form C is provided in FIG. 7 and shows approximately 4% weight loss from ambient to 162° C. and shows an endotherm at approximately 50° C.

Example 5: Compound I p-Toluenesulfonic Acid Form A

Approximately 500 mg of Compound I free acid was weighed into a 15 mL bead mill vial. 1.05 equivalents of p-toluenesulfonic acid was added. 221 μL of isopropyl acetate was added. The preparation was milled at 5000 rpm for 10×60 s with a 10 s pause between each interval. 3 cycles were carried out the the preparation was then milled as above for 3 further cycles. The solids were then dried under vacuum for approximately 23 hours at ambient temperature to provide Compound Ip-toluenesulfonic acid Form A.

A. X-Ray Powder Diffraction

XRPD analysis was carried following the same procedure described for Compound I benzenesulfonic acid Form A. The XRPD diffractogram for Compound I p-toluenesulfonic acid Form A is provided in FIG. 8 and the XRPD data are summarized below in Table 5.

TABLE 5

XRPD signals for crystalline Compound I p-toluenesulfonic acid Form A

| XRPD Peaks | Angle (Degrees 2-Theta ± 0.2) | Intensity % |
|---|---|---|
| 1 | 3.8 | 100.0 |
| 2 | 10.7 | 32.5 |
| 3 | 8.4 | 31.8 |
| 4 | 9.4 | 26.7 |
| 5 | 19.8 | 26.5 |
| 6 | 19.7 | 26.1 |
| 7 | 21.8 | 22.2 |
| 8 | 15.2 | 21.8 |
| 9 | 13.1 | 18.4 |
| 10 | 12.6 | 17.0 |
| 11 | 20.1 | 15.4 |
| 12 | 20.5 | 15.1 |
| 13 | 17.0 | 12.8 |
| 14 | 18.9 | 12.7 |
| 15 | 16.8 | 12.6 |
| 16 | 23.3 | 12.0 |
| 17 | 13.5 | 12.0 |

B. Thermogravimetric Analysis

TGA was carried out following the same procedure described above for Compound I benzenesulfonic acid Form A. The TGA data for Compound I p-toluenesulfonic acid Form A is provided in FIG. 9 and shows approximately 6% weight loss from ambient to 200° C.

C. Differential Scanning Calorimetry Analysis

DSC was carried out following the procedure described above for Compound I benzenesulfonic acid Form A. The DSC data for Compound Ip-toluenesulfonic acid Form A is provided in FIG. 10 and shows endotherms at 71 and 165° C.

Example 6: Compound I Magnesium Salt Form A

Approximately 1 g of Compound I free acid was weighed into a 20 vial. Water (10 mL) was added to create a slurry. Magnesium chloride (0.53 equivalents) and sodium hydroxide (1.05 equivalents) were added as solutions in 1 mL of water each. 50 mL of water was added (and transferred into a Duran bottle). Dissolution was not obtained. 75 mL of 1,4-dioxane was added to obtain dissolution and give 1,4-dioane:water 59:41 v/v. The solution was frozen in the chamber of the freeze drier and freeze dried for about 71 hours. An XRPD analysis was carried out on the solids obtained. 2 mL of acetone and 2 drops of water were added to create a slurry. The slurry was initially mobile; then it was observed to become immobile. 1 mL further acetone was added to create a mobile slurry. After about 3 hours of temperature cycling, 2 mL of acetone was added to maintain a mobile slurry. The preparation was temperature cycled between ambient and 40° C. in 4 hour cycles for about 48 hours. The preparation was isolated via Buchner filtration using grade 1 filter paper and dried under vacuum at ambient for about 70 hours to provide Compound I magnesium salt Form A.

A. X-Ray Powder Diffraction

XRPD analysis was carried following the same procedure described for Compound I benzenesulfonic acid Form A. The XRPD diffractogram for Compound I magnesium salt Form A is provided in FIG. 11 and the XRPD data are summarized below in Table 6.

TABLE 6

XRPD signals for crystalline Compound I magnesium salt Form A

| XRPD Peaks | Angle (Degrees 2-Theta ± 0.2) | Intensity % |
|---|---|---|
| 1 | 4.3 | 100.0 |
| 2 | 9.9 | 48.8 |
| 3 | 14.6 | 25.3 |
| 4 | 10.4 | 19.6 |
| 5 | 18.1 | 14.8 |
| 6 | 20.1 | 14.2 |
| 7 | 14.3 | 12.5 |
| 8 | 19.8 | 10.6 |

B. Thermogravimetric Analysis

TGA was carried out following the same procedure described above for Compound I benzenesulfonic acid Form A. The TGA data for Compound I magnesium salt Form A is provided in FIG. 12 and shows approximately 4% weight loss from ambient to 115° C.

C. Differential Scanning Calorimetry Analysis

DSC was carried out following the procedure described above for Compound I benzenesulfonic acid Form A. The DSC data for Compound I magnesium salt Form A is provided in FIG. 13 and shows an endotherm at 125° C.

Example 7: Preparation of a Tablet Containing 5 mg of Compound I

Microcrystalline cellulose was passed through a stainless steel screen (30 mesh) and 210.1 g was charged into a 10 L Bohle Bin. Compound I was passed through a stainless steel screen (30 mesh) and 210.0 g was charged into the 10 L Bohle Bin. The bin was sealed and the components are blended for 2 min at a speed of 32 RPM to yield a microcrystalline cellulose/Compound I blend. The microcrystalline cellulose/Compound I blend was discharged into a stainless steel container. The following materials are sieved through a stainless steel 30 mesh screen and added to the 10 L Bohle bin in this order: lactose (approximately half of 1022.2 g), microcrystalline cellulose (approximately half of 812 g), microcrystalline cellulose/Compound I blend, polyvinylpyrrolidone/vinyl acetate (210.1 g), croscarmellose sodium (133 g), microcrystalline cellulose (the remaining half portion from the 812 g amount), and lactose (the remaining half portion from the 1022.2 g amount). The bin was sealed and the components were blended for 18.5 min at a speed of 32 rpm. Sodium stearyl fumarate Pruv® was passed through a 60 mesh stainless steel and 53.1 g was charged into the Bohle bin. The bin was sealed and the components were blended for 4 min at a speed of 32 rpm. The bin was tested for homogeneity. The blend was added to a Piccola Tablet press and compressed into tablets weighing 67.0 mg.

TABLE 7

Compound I tablet composition

| Component | % w/w tablet (approx.) | Tablet quantity (approx.) |
|---|---|---|
| Compound I (Ca salt hydrate Form A) | 8 | 5 mg |
| Microcrystalline cellulose (pre-blend) | 8 | 5 mg |
| Polyvinylpyrrolidone/vinyl acetate | 8 | 5 mg |
| Microcrystalline cellulose (tablet-blend) | 31 | 21 mg |
| Lactose monohydrate | 38 | 26 mg |
| Croscarmellose sodium | 5 | 3 mg |
| Sodium stearyl fumarate pruv ® | 2 | 1 mg |

Example 8: Bioactivity Assay

Solutions

Base medium (ADF+++) consisted of Advanced DMEM/Ham's F12, 2 mM Glutamax, 10 mM HEPES, 1u/ml penicillin/streptomycin.

Intestinal enteroid maintenance medium (IEMM) consisted of ADF+++, 1×B27 supplement, 1×$N_2$ supplement, 1.25 mM N-acetyl cysteine, 10 mM Nicotinamide, 50 ng/ml hEGF, 10 nM Gastrin, 1 µg/mL hR-spondin-1, 100 ng/ml hNoggin, TGF-b type 1 inhibitor A-83-01, 100 µg/mL Primocin, 10 µM P38 MAPK inhibitor SB202190.

Bath 1 Buffer consisted of 1 mM $MgCl_2$, 160 mM NaCl, 4.5 mM KCl, 10 mM HEPES, 10 mM Glucose, 2 mM $CaCl_2$).

Chloride Free Buffer consisted of 1 mM Magnesium Gluconate, 2 mM Calcium Gluconate, 4.5 mM Potassium Gluconate, 160 mM Sodium Gluconate, 10 mM HEPES, 10 mM Glucose.

Bath1 Dye Solution consisted of Bath 1 Buffer, 0.04% Pluronic F127, 20 µM Methyl Oxonol, 30 µM CaCCinh-A01, 30 µM Chicago Sky Blue.

Chloride Free Dye Solution consisted of Chloride Free Buffer, 0.04% Pluronic F127, 20 µM Methyl Oxonol, 30 µM CaCCinh-A01, 30 M Chicago Sky Blue.

Chloride Free Dye Stimulation Solution consisted of Chloride Free Dye Solution, 10 µM forskolin, 100 µM IBMX, and 300 nM Compound III.

Cell Culture

Human intestinal epithelial enteroid cells were obtained from the Hubrecht Institute for Developmental Biology and Stem Cell Research, Utrecht, The Netherlands and expanded in T-Flasks as previously described (Dekkers J F, Wiegerinck C L, de Jonge H R, Bronsveld I, Janssens H M, de Winter-de Groot K M, Brandsma A M, de Jong N W M, Bijvelds M J C, Scholte B J, Nieuwenhuis E E S, van den Brink S, Clevers H, van der Ent C K, Middendorp S and M Beekman J M. A functional CFTR assay using primary cystic fibrosis intestinal organoids is described in Nat Med. 2013 July; 19 (7): 939-45.

Enteroid Cell Harvesting and Seeding

Cells were recovered in cell recovery solution, collected by centrifugation at 650 rpm for 5 min at 4° C., resuspended in TryPLE and incubated for 5 min at 37° C. Cells were then collected by centrifugation at 650 rpm for 5 min at 4° C. and resuspended in IEMM containing 10 µM ROCK inhibitor (RI). The cell suspension was passed through a 40 µm cell strainer and resuspended at 1×106 cells/mL in IEMM containing 10 µM RI. Cells were seeded at 5000 cells/well into multi-well plates and incubated for overnight at 37° C., 95% humidity and 5% $CO_2$ prior to assay.

Membrane Potential Dye Assay

Enteroid cells were incubated with test compound in IEMM for 18-24 h at 37° C., 95% humidity and 5% $CO_2$. Following compound incubations, a membrane potential dye assay was employed using a FLIPR Tetra to directly measure the potency and efficacy of the test compound on CFTR-mediated chloride transport following acute addition of 10 µM forskolin and 300 nM Compound III. Briefly, cells were washed 5 times in Bath 1 Buffer. Bath 1 Dye Solution was added and the cells were incubated for 25 min at room temperature. Following dye incubation, cells were washed 3 times in Chloride Free Dye Solution. Chloride transport was initiated by addition of Chloride Free Dye Stimulation Solution and the fluorescence signal was read for 15 min. The CFTR-mediated chloride transport for each condition was determined from the AUC of the fluorescence response to acute forskolin and 300 nM Compound III stimulation. Chloride transport was then expressed as a percentage of the chloride transport following treatment with 3 µM Compound I, 3 µM Compound II, and 300 nM acute Compound III triple combination control (% Activity).

The following represents the data in Table 8:

Max Activity: +++ is >60%; ++ is 30-60%; + is <30%. $EC_{50}$: +++ is <1 µM; ++ is 1-3 µM; + is >3 µM; and ND is "not determined."

TABLE 8

Assay Data for Compound I

| Molecule | Max. Activity | $EC_{50}$ |
|---|---|---|
| Compound I | +++ | +++ |

Example 9: Compound I Increases Chloride Transport Alone and in Combination With Compound II and/or Compound III in F508del/F508del HBE and F508del/MF HBE Using chamber studies were conducted to measure F508del CFTR-mediated chloride transport in HBE cells derived from 3 F508del homozygous donors and 5 F508del/MF donors (G542X, 3 donors; E585X, 1 donor; 3905InsT, 1 donor). As a positive control, maximally effective concentrations of N-(benzenesulfonyl)-6-[3-[2-[1-(trifluoromethyl)cyclopropyl] ethoxy] pyrazol-1-yl]-2-[(4S)-2,2,4-trimethylpyrrolidin-1-yl] pyridine-3-carboxamide (see WO 2018/064632) and N-[(6-amino-2-pyridyl) sulfonyl]-6-(3-fluoro-5-isobutoxy-phenyl)-2-[(4S)-2,2,4-trimethylpyrrolidin-1-yl]pyridine-3-carboxamide (see WO 2016/057572) in combination with Compound II/Compound III were included in each experiment.

In these CF cell lines, CFTR-mediated chloride transport was low in the absence of CFTR modulators, which is consistent with little-to-no CFTR at the cell surface. Treatment with Compound I alone for 16 to 24 h caused a modest increase in chloride transport in both F508del/F508del HBE and F508del/MF HBE cells. The combination of Compound I and Compound II further increased chloride transport when compared to Compound I alone and was similar to Compound II/Compound III. Addition of Compound III strongly potentiated chloride transport in the presence of Compound I or in combination with Compound I/Compound II. Synergy analyses showed that the effect of Compound I was highly synergistic with a fixed concentration of Compound III or Compound II/Compound III and was modestly synergistic with a fixed combination of Compound II. At most Compound I concentrations, Compound I/Compound II/Compound III increased chloride transport more than Compound I/Compound II or Compound I/Compound III. However, the efficacy of Compound I/Compound III and Compound I/Compound II/Compound III was similar at their respective $EC_{90}$ values. The respective $EC_{90}$ values under conditions that maximally activate CFTR for Compound I/Compound III and Compound I/Compound II/Compound III were 0.848 µM and 0.152 µM in F508del/F508del HBE and 1.15 µM and 0.122 µM in F508del/MF HBE.

Following a single oral administration of Compound I in male animals, Compound I mean $t_{max}$ values were 9 h in rats, 4 h in dogs, and 3 h in monkeys. Mean oral bioavailability (F) was low to moderate in rats (76.9%), dogs (49.7%), and monkeys (12.9%).

Compound I Pharmacokinetic Parameters Following a Single Oral Administration of Compound I in Male Rats, Dogs, and Monkeys

| Species | Nominal Dose (mg/kg) | $AUC_{0-\infty}$ (µg · h/mL) | $C_{max}$ (µg/mL) | $t_{max}$ (h) | $t_{1/2}$ (h) | F (%) |
|---|---|---|---|---|---|---|
| Rat | 3 | 31.9 ± 11.1 | 1.10 ± 0.337 | 9.33 ± 2.31 | 22.6 ± 2.83 | 76.9 |
| Dog | 1 | 38.5 ± 4.70 | 2.44 ± 0.178 | 4.00 ± 0.00 | 11.1 ± 1.09 | 49.7 |
| Monkey | 1 | 0.795 ± 0.233 | 0.102 ± 0.0132 | 3.33 ± 1.15 | 3.07 ± 1.16 | 12.9 |

Note:
Data are presented as mean ± SD (n = 3).

As the dose increased, systemic exposure of Compound I increased in a more than doseproportional manner in rats and dogs. Dosenormalized exposure was higher in female rats than male rats. In dogs, systemic exposures to Compound I were similar in both sexes. Following repeated oral administration of Compound I for 28 d in rats and dogs, accumulation of Compound I exposure was observed. Systemic exposure to Compound I on Day 28 was higher than on Day 1 (Day 28/Day 1 $AUC_{024h}$ ratio ranged from 1.63 to 2.70 in male rats, 5.01 to 8.26 in female rats, 1.73 to 2.64 in male dogs, and 1.82 to 2.23 in female dogs).

Example 10: Safety and Efficacy Study of Compound I

A safety analysis of an ongoing clinical study was performed for 37 subjects in Cohorts A1 to A5, 33 subjects in Cohort B, and 17 subjects in Cohort C, who were exposed to at least 1 dose of study drug (Compound I or placebo) as a monotherapy and as part of a triple combination with Compound II or Compound III. Compound I was generally safe and well-tolerated up to a dose of 60 mg qd in monotherapy and 20 mg qd in triple combination with Compound II and Compound III.

The invention claimed is:
1. A substantially crystalline Compound I

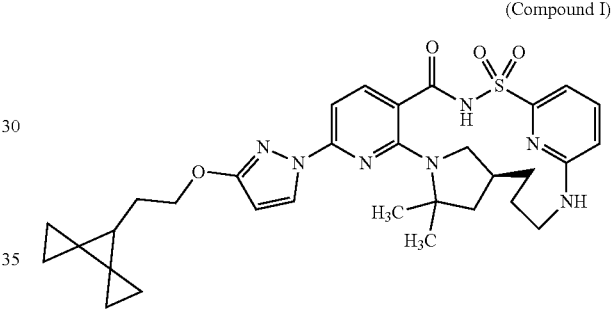

(Compound I)

wherein the crystalline Compound I is selected from substantially pure Compound I benzenesulfonic acid Form A, Compound I benzenesulfonic acid Form B, Compound I benzenesulfonic acid Form C, Compound I p-toluenesulfonic acid Form A, and Compound I magnesium salt Form A, wherein less than 15% of Compound I is in amorphous form.

2. The substantially crystalline Compound I according to claim 1, wherein less than 10% of Compound I is in amorphous form.

3. The substantially crystalline Compound I according to claim 1, wherein less than 5% of Compound I is in amorphous form.

4. The substantially crystalline Compound I according to claim 1, wherein 100% of Compound I is crystalline.

5. A pharmaceutical composition comprising the substantially crystalline Compound I according to claim 1.

6. The pharmaceutical composition according to claim 5, further comprising one or more additional CFTR modulating compounds.

7. The pharmaceutical composition according to claim 6, wherein at least one additional CFTR modulating compound is a CFTR potentiator.

8. The pharmaceutical composition according to claim 6, wherein at least one additional CFTR modulating compound is a CFTR corrector.

9. The pharmaceutical composition according to claim 6, wherein the one or more additional CFTR modulating compounds are selected from (a) Compound II (b) Compound III or Compound III-d 10. A method of treating cystic fibrosis comprising administering an effective amount of the substantially crystalline Compound I according to claim 1 to a subject in need thereof.

11. The method of treating cystic fibrosis according to claim 10, wherein the substantially crystalline Compound I is administered with one or more additional CFTR modulating compounds.

12. The method of treating cystic fibrosis according to claim 11, wherein the one or more additional CFTR modulating compound are selected from (a) Compound II and (b) Compound III or Compound III-d 13. A method of preparing a substantially crystalline Compound I according to claim 1, comprising:
  (a) bead milling Compound I free acid with benzenesulfonic acid in ethanol and drying under vacuum to provide crystalline Compound I benzenesulfonic acid Form A;
  (b) bead milling Compound I free acid with benzenesulfonic acid in THF and drying under vacuum to provide crystalline Compound I benzenesulfonic acid Form B;
  (c) bead milling Compound I free acid with benzenesulfonic acid in isopropyl acetate and drying under vacuum to provide crystalline Compound I benzenesulfonic acid Form C;
  (d) bead milling Compound I free acid with p-toluenesulfonic acid in isopropyl acetate and drying under vacuum to provide crystalline Compound I p-toluenesulfonic acid Form A; or
  (e) slurrying Compound I free acid with magnesium chloride and sodium hydroxide in a mixture of 1,4-dioxane and water, freeze drying the mixture, adding acetone and water, temperature cycling the mixture between ambient temperature and 40° C., filtering the solids, and drying under vacuum to provide substantially crystalline Compound I magnesium salt Form A.

* * * * *